United States Patent
Kim et al.

(10) Patent No.: US 9,554,149 B2
(45) Date of Patent: Jan. 24, 2017

(54) INTER-LAYER PREDICTION METHOD AND APPARATUS USING SAME

(71) Applicant: LG ELECTRONICS INC., Seoul (KR)

(72) Inventors: Chulkeun Kim, Seoul (KR); Seungwook Park, Seoul (KR); Jaehyun Lim, Seoul (KR); Yongjoon Jeon, Seoul (KR); Joonyoung Park, Seoul (KR); Naeri Park, Seoul (KR); Byeongmoon Jeon, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 81 days.

(21) Appl. No.: 14/381,802

(22) PCT Filed: Feb. 28, 2013

(86) PCT No.: PCT/KR2013/001659
§ 371 (c)(1),
(2) Date: Aug. 28, 2014

(87) PCT Pub. No.: WO2013/129878
PCT Pub. Date: Sep. 6, 2013

(65) Prior Publication Data
US 2015/0071356 A1    Mar. 12, 2015

Related U.S. Application Data

(60) Provisional application No. 61/604,538, filed on Feb. 29, 2012.

(51) Int. Cl.
*H04N 19/70* (2014.01)
*H04N 19/51* (2014.01)
(Continued)

(52) U.S. Cl.
CPC .......... *H04N 19/513* (2014.11); *H04N 19/105* (2014.11); *H04N 19/187* (2014.11);
(Continued)

(58) Field of Classification Search
None
See application file for complete search history.

(56) References Cited

U.S. PATENT DOCUMENTS

| 7,627,037 B2 * | 12/2009 | Li | H04N 19/52 |
| | | | 375/240.16 |
| 2005/0190979 A1 | 9/2005 | Li et al. | |

(Continued)

FOREIGN PATENT DOCUMENTS

| EP | 1694074 | 8/2006 |
| JP | 2006-121701 A | 5/2006 |

(Continued)

OTHER PUBLICATIONS

XP030110667: "Simplification and improvement of additional merge candidate," Joint collaborative team on video Coding (JCT-VC) of ITU-T SG16 WP3 and ISO/IEC JTC1/SC29/WG11, 7th meeting: Geneva, CH, Nov. 21-30, 2011.

(Continued)

*Primary Examiner* — Reza Aghevli
(74) *Attorney, Agent, or Firm* — Dentons US LLP

(57) ABSTRACT

The present invention relates to an inter-layer prediction method and an apparatus using same. The inter-layer prediction method comprises: a step of inducing inter-layer motion information from a reference layer; and a step of performing a prediction on the current block in the current layer using the inter-layer motion information. The inter-layer motion information may include an inter-layer motion vector induced from the reference layer.

9 Claims, 21 Drawing Sheets

(51) Int. Cl.
*H04N 19/463* (2014.01)
*H04N 19/513* (2014.01)
*H04N 19/30* (2014.01)
*H04N 19/187* (2014.01)
*H04N 19/105* (2014.01)

(52) U.S. Cl.
CPC ........... *H04N 19/30* (2014.11); *H04N 19/463* (2014.11); *H04N 19/51* (2014.11); *H04N 19/70* (2014.11)

(56) References Cited

U.S. PATENT DOCUMENTS

| | | | |
|---|---|---|---|
| 2006/0133503 A1* | 6/2006 | Park | H04N 19/56 375/240.16 |
| 2007/0230566 A1* | 10/2007 | Eleftheriadis | H04N 19/30 375/240.1 |
| 2008/0267291 A1* | 10/2008 | Vieron | H04N 19/139 375/240.16 |
| 2009/0028245 A1* | 1/2009 | Vieron | H04N 19/105 375/240.16 |
| 2009/0103613 A1* | 4/2009 | Jeon | H04N 19/105 375/240.12 |
| 2009/0129474 A1* | 5/2009 | Pandit | H04N 19/00721 375/240.16 |
| 2011/0038421 A1* | 2/2011 | Schwarz | H04N 19/0003 375/240.16 |
| 2012/0008690 A1 | 1/2012 | Lee et al. | |
| 2012/0043254 A1 | 2/2012 | Inoue | |
| 2013/0188719 A1* | 7/2013 | Chen | H04N 19/00684 375/240.16 |

FOREIGN PATENT DOCUMENTS

| | | |
|---|---|---|
| JP | 2008-530927 A | 8/2008 |
| JP | 2009-522890 A | 6/2009 |
| JP | 2013-021629 A | 1/2013 |
| JP | 2014-523694 A | 9/2014 |
| KR | 10-2009-0012986 | 2/2009 |
| WO | 2013-003143 A2 | 1/2013 |

OTHER PUBLICATIONS

Wolf, Koen De et al. "Adaptive Residual Interpolation : a Tool for Efficient Spatial Scalability in Digital Video Coding." Proceedings of the 2006 International Conference on Image Processing, Computer Vision & Pattern Recognition. Las Vegas, Nevada, USA. Jun. 26-29, 2006, vol. 1.

Joint Collaborative Team on Video Coding (JCT-VC-F290rl) 6th Meeting: Torino, IT, Jul. 14-22, 2011; "Scalability Support in HEVC" by Danny Hong et al.

* cited by examiner

INTER-LAYER PREDICTION METHOD AND APPARATUS USING SAME

This application is a 35 USC §371 National Stage entry of International Application No. PCT/KR2013/001659 filed on Feb. 28, 2013, and claims priority to US Provisional Application No. 61/604,538 filed on Feb. 29, 2012, which are hereby incorporated by reference in their entireties as if fully set forth herein.

TECHNICAL FIELD

The present invention relates to a video compression technique, and more particularly, to a method and an apparatus for performing scalable video coding.

BACKGROUND ART

In recent years, demands for high-resolution and high-quality videos have increased more and more in various fields of applications. With improvement in resolution and quality of a video, an amount of data of the video also increases.

With the increase in the amount of data, apparatuses having a variety of performance and networks having various environments have been developed.

With the development of the apparatuses having a variety of performance and the networks having various environments, the same contents can be used with a variety of quality.

Specifically, since video quality which can be supported by terminals diversifies and the constructed network environments diversify, videos with general quality can be used in some environments but videos with higher quality can be used in other environments.

For example, a user having purchased video contents with a mobile terminal can enjoy the video contents with a larger screen and a higher resolution using a large-screen display at his or her home.

With recent broadcast services with a high definition (HD) resolution, users have got accustomed to high-resolution and high-quality videos and service providers and users have been interested in ultra-high definition (UHD) services with a resolution of four or more times that of HDTV as well as HDTV.

Therefore, in order to provide video services requested by users in various environments depending on the quality, it is possible to provide scalability to video quality such as image quality of a video, a resolution of a video, a size of a video, and a frame rate of a video on the basis of high-efficiency encoding/decoding methods for high-capacity videos.

SUMMARY OF THE INVENTION

Technical Problems

An object of the invention is to provide method and apparatus capable of enhancing a scalable video coding effect and reducing an amount of information to be duplicately transmitted by layers.

Another object of the invention is to provide method and apparatus capable of enhancing encoding/decoding effects for an enhancement layer using information of a base layer.

Still another object of the invention is to provide method and apparatus capable of utilizing information of a base layer depending on various scalabilities.

Still another object of the invention is to provide method and apparatus capable of improving coding efficiency using various inter-layer prediction methods.

Still another object of the invention is to provide method and apparatus capable of enhancing coding efficiency for an enhancement layer using at least one of texture information, motion information, syntax information, unit information, parameter information, residual information, and differential information of a base layer.

Solution to Problems

According to an aspect of the invention, there is provided an inter-layer prediction method. The method includes deriving inter-layer motion information from a reference layer and predicting a current block in a current layer using the inter-layer motion information. The inter-layer motion information includes an inter-layer motion vector derived from the reference layer. Here, the inter-layer motion vector is derived by scaling a motion vector of the reference layer on the basis of a resolution ratio of the reference layer and the current layer.

According to another aspect of the invention, there is provided a scalable video decoder. The scalable video decoder includes a first prediction module that predicts a reference layer and a second prediction module that predicts a current block in a current layer using inter-layer motion information based on the prediction of the first prediction module. Here, the inter-layer motion information includes an inter-layer motion vector derived from the reference layer, and the second prediction module scales a motion vector of the reference layer on the basis of a resolution ratio between the reference layer and the current layer.

Advantageous Effects

According to the invention, it is possible to enhance a scalable video coding effect and to reduce an amount of information to be duplicately transmitted by layers.

According to the invention, it is possible to enhance encoding/decoding effects for an enhancement layer using information of a base layer.

According to the invention, it is possible to utilize information of a base layer depending on various scalabilities.

According to the invention, it is possible to improve coding efficiency using various inter-layer prediction methods.

DESCRIPTION OF EMBODIMENTS

Figure 1:
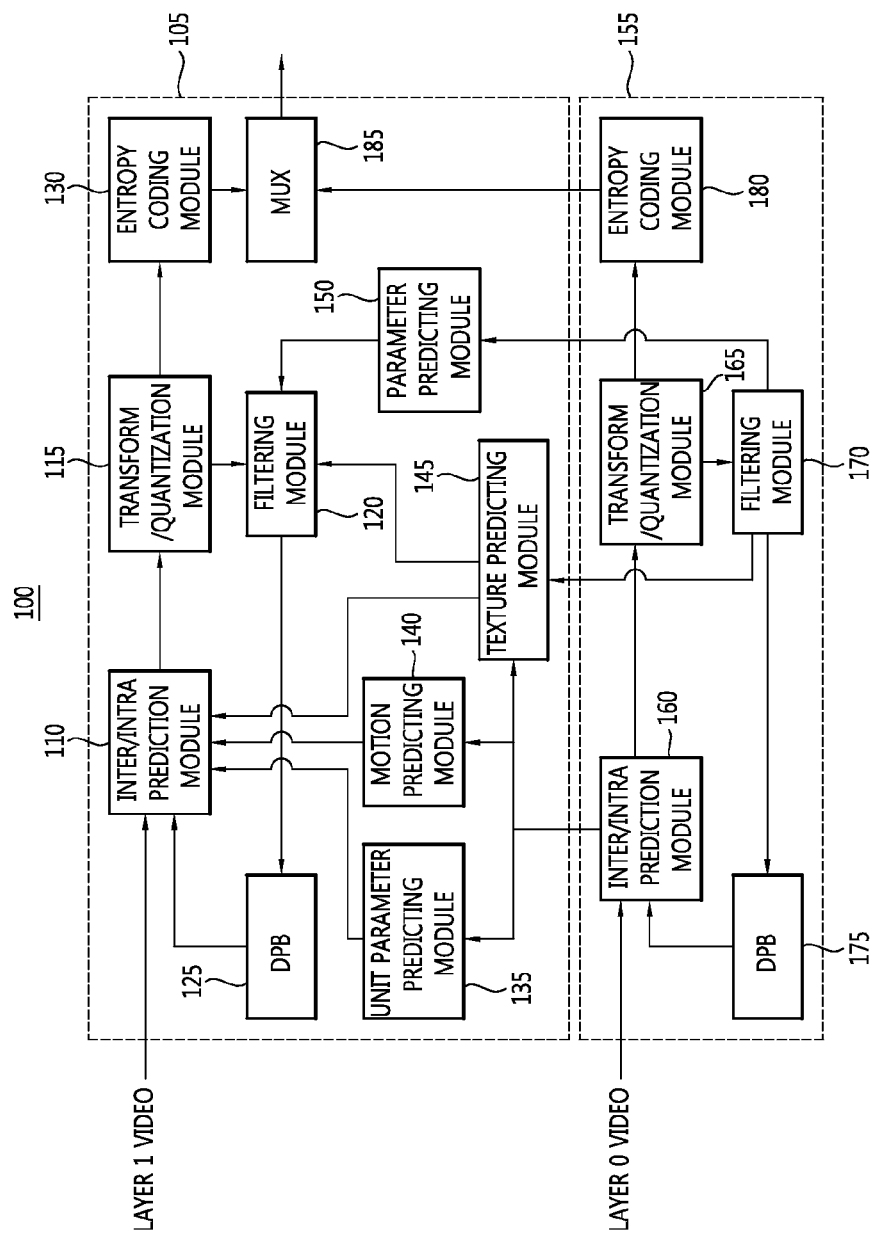
FIG. 1 is a block diagram schematically illustrating a video encoder that supports scalability according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

In a video coding method that supports scalability (hereinafter, referred to as "scalable coding"), input signals can be processed by layers. Depending on the layers, the input signals (input videos) may be different from each other in at least one of a resolution, a frame rate, a bit depth, a color format, and an aspect ratio.

In this description, scalable coding includes scalable encoding and scalable decoding.

In scalable encoding/decoding, it is possible to reduce duplicate transmission/processing of information and to enhance compression efficiency by performing inter-layer prediction using a difference between layers, that is, on the basis of scalability.

FIG. 1 is a block diagram schematically illustrating a video encoder that supports scalability according to an embodiment of the invention.

Referring to FIG. 1, the video encoder 100 includes an encoding module 105 for layer 1 and an encoding module 155 for layer 0.

Layer 0 may be a base layer, a reference layer, or a lower layer and layer 1 may be an enhancement layer, a current layer, or an upper layer.

The encoding module 105 for layer 1 includes an inter/intra prediction module 110, a transform/quantization module 115, a filtering module 120, a decoded picture buffer (DPB) 125, an entropy coding module 130, a unit parameter predicting module 135, a motion prediction/rescaling module 140, a texture predicting/rescaling module 145, a parameter predicting module 150, and a multiplexer (MUX) 185.

The encoding module 155 for layer 0 includes an inter/intra prediction module 160, a transform/quantization module 165, a filtering module 170, a DPB 175, and an entropy coding module 180.

The inter/intra prediction modules 110 and 160 may perform inter prediction and intra prediction on an input video, respectively. The inter/intra prediction modules 110 and 160 may perform the prediction by predetermined process units. The process unit for prediction may be a coding unit (CU), a prediction unit (PU), or may be a transform unit (TU).

For example, the inter/intra prediction modules 110 and 160 may determine which of inter prediction or intra prediction to apply in the units of CU, may determine the prediction mode in the units of PU, and may perform prediction in the units of PU or TU. The prediction to be performed includes construction of a predicted block and construction of a residual block (residual signal).

In the inter prediction, the prediction may be performed on the basis of information of at least one of a previous picture and/or a subsequent picture of a current picture to construct a predicted block. In the intra prediction, the prediction may be performed on the basis of pixel information in a current picture to construct a predicted block.

Examples of the inter prediction mode or method include a skip mode, a merge mode, a motion vector prediction (MVP) method. In the inter prediction, a reference picture for a current PU to be predicted may be selected and a reference block corresponding to the current PU can be selected from the reference picture. The inter/intra prediction module 160 may construct a predicted block on the basis of the reference block.

The predicted block may be constructed in the unit of integer pixel samples or in the unit of pixel samples less than an integer pixel. Here, the motion vector may also be expressed in the unit of integer pixel samples or in the unit of pixel samples less than an integer pixel.

Motion information in the inter prediction, that is, information such as a reference picture index, a motion vector, and a residual signal is entropy-encoded and is transmitted to a video decoder. When a skip mode is applied, the residual signal may not be generated, transformed, quantized, and transmitted at all.

The prediction modes in the intra prediction may include 33 directional prediction modes and at least two non-directional modes. The non-directional modes may include a DC prediction mode and a planar mode. In the intra prediction, a predicted block may be constructed after a filter is applied to a reference sample.

A PU may be a block having various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N may be set to be applied to only a specific case. For example, the PU with a size of N×N may be set to be used for only a smallest CU or may be set to be used for only the intra prediction. In addition to the PUs with the above-mentioned sizes, PUs such as an N×mN block, an mN×N block, a 2N×mN block, and an mN×2N block (where m<1) may be additionally defined and used.

The transform/quantization modules 115 and 165 perform a transform process on the residual block in the units of TU to generate transform coefficients and quantizes the transform coefficients.

A transform block is a rectangular block of samples and is a block to which the same transform is applied. The transform block may be a TU and may have a quad-tree structure.

The transform/quantization modules 115 and 165 may perform the transform process depending on the prediction mode applied to the residual block and the size of the transform block to generate a two-dimensional array of transform coefficients. For example, when the intra prediction is applied to a residual block and the residual block has a 4×4 array, the residual block may be transformed using discrete sine transform (DST). Otherwise, the residual block may be transformed using discrete cosine transform (DCT).

The transform/quantization modules 115 and 165 may fixedly use a specific transform regardless of the prediction mode and the size of the transform block. For example, the transform/quantization modules 115 and 165 may apply only the DST to all the transform blocks. The transform/quantization modules 115 and 165 may apply only the DCT to all the transform blocks.

The transform/quantization modules 115 and 165 may quantize the transform coefficients to generate the quantized transform coefficients.

The transform/quantization modules 115 and 165 may transmit the quantized transform coefficients to the entropy coding modules 130 and 180. At this time, the transform/quantization modules 115 and 165 may rearrange the two-dimensional array of the quantized transform coefficients into a one-dimensional array in a predetermined scan order and may transmit the rearranged one-dimensional array to the entropy coding modules 130 and 180. The transform/quantization modules 115 and 165 may transmit the reconstructed block generated on the basis of the residual block and the predicted block to the filtering modules 120 and 170 for the inter prediction without being transformed/quantized.

On the other hand, the transform/quantization modules 115 and 165 may skip the transform and perform only the quantization or may skip both the transform and the quantization, if necessary. For example, the transform/quantization modules 115 and 165 may skip the transform for a block having a specific prediction method applied thereto or having a specific size or a block having a specific prediction block applied thereto and having a specific size.

The entropy coding modules 130 and 180 may perform entropy encoding on the quantized transform coefficients. An encoding method such as an exponential Golomb method and a context-adaptive binary arithmetic coding (CABAC) may be used for the entropy encoding.

The filtering modules 120 and 170 may apply a deblocking filter, an adaptive loop filter (ALF), or a sample adaptive offset (SAO) to a reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The SAO reconstructs offset differences between the residual blocks having the deblocking filter applied thereto and the original picture and is applied in the form of a band offset, an edge offset, or the like.

The filtering modules 120 and 170 may not apply all of the deblocking filter, the ALF, and the SAO but may apply only the deblocking filter or may apply only the deblocking filter and the ALF or may apply only the deblocking filter and the SAO.

The DPBs 125 and 175 may receive and store the reconstructed block or the reconstructed picture from the filtering units 125 and 170. The DPB 125 and 175 may supply the reconstructed bloc or picture to the inter/intra prediction modules 110 and 160 that perform the inter prediction.

Information output from the entropy coding module 180 for layer 0 and information output from the entropy coding module 130 for layer 1 may be multiplexed by MUX 185 and may be output as a bitstream.

On the other hand, the encoding module 105 for layer 1 may include a unit parameter predicting module 135, a motion predicting/rescaling module 140, a texture predicting/rescaling module 145, and a parameter predicting module 150 for inter-layer prediction predicting a video of layer 1 using the information of layer 0.

The inter parameter predicting module 135 may derive unit (CU, PU, and/or TU) information of a base layer for use as unit information of an enhancement layer or may determine the unit information of the enhancement layer on the basis of the unit information of the base layer.

The motion predicting module 140 performs inter-layer motion prediction. The inter-layer motion prediction is also referred to as inter-layer inter prediction. The motion predicting module 140 may predict a current block of a current layer (enhancement layer) using the motion information of a reference layer (base layer).

The motion predicting module 140 may scale the motion information of the reference layer, if necessary.

The texture predicting module 145 may perform inter-layer texture prediction on the basis of the information of layer 0. The inter-layer texture prediction is also referred to as inter-layer intra prediction or intra BL (Base Layer) prediction. The texture prediction may be used when a reference block of a reference layer is reconstructed. In the inter-layer texture prediction, a texture of a reference block in a reference layer may be used as a predicted value of a current block in an enhancement layer. Here, the texture of the reference block may be scaled by upsampling.

The parameter predicting module 150 may derive a parameter used in the base layer for reuse in the enhancement layer or may predict a parameter for the enhancement layer on the basis of the parameter used in the base layer.

On the other hand, it is described for the purpose of convenience of explanation that the encoding module 105 for layer 1 includes the MUX 185, but the MUX may be a device or module independent of the encoding module 105 for layer 1 and the encoding module 155 for layer 0.

Figure 2:
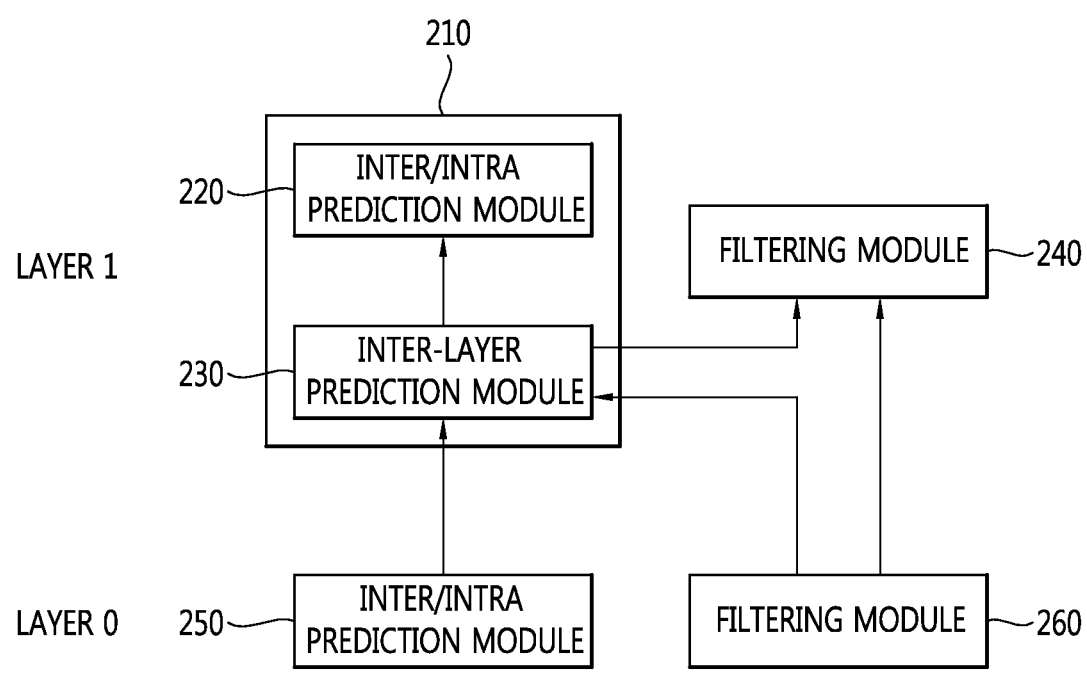
FIG. 2 is a block diagram illustrating an example of inter-layer prediction in the video encoder that performs scalable coding according to the invention.

FIG. 2 is a block diagram illustrating an example of inter-layer prediction in the video encoder that performs scalable coding according to the invention.

Referring to FIG. 2, a prediction module 210 for layer 1 includes an inter/intra prediction module 220 and an inter-layer prediction module 230.

The prediction module 210 for layer 1 may perform inter-layer prediction necessary for predicting layer 1 from the information of layer 0.

For example, the inter-layer prediction module 230 may receive the information of layer 0 from the inter/intra prediction module 250 and/or the filtering module 260 for layer 0 and may perform the inter-layer prediction necessary for predicting layer 1.

The inter/intra prediction module 220 for layer 1 may perform inter prediction or intra prediction using the information of layer 1.

The inter/intra prediction module 220 for layer 1 may perform prediction based on the information of layer 0 using the information transmitted from the inter-layer prediction module 230.

In addition, the filtering module 240 for layer 1 may perform a filtering operation on the basis of the information of layer 0 or may perform a filtering operation on the basis of the information of layer 1. The information of layer 0 may be transmitted from the filtering module 260 for layer 0 to the filtering module 240 for layer 1 or may be transmitted from the inter-layer prediction module 230 for layer 1 to the filtering module 240 for layer 1.

On the other hand, the information transmitted from layer 0 to the inter-layer predicting module 230 may be at least one of information on unit parameters of layer 0, motion information of layer 0, texture information of layer 0, and filter parameter information of layer 0.

Accordingly, the inter-layer predicting module 230 may include a part or all of the unit parameter predicting module 135, the motion predicting module 140, the texture predicting module 145, and the parameter predicting module 150 that perform the inter-layer prediction in FIG. 1.

In layer 1, the inter/intra prediction module 220 may correspond to the inter/intra prediction module 110 in FIG. 1, and the filtering module 240 may correspond to the filtering module 120 in FIG. 1. In layer 0, the inter/intra prediction module 250 may correspond to the inter/intra prediction module 160 in FIG. 1, and the filtering module 260 may correspond to the filtering module 170 in FIG. 1.

Figure 3:
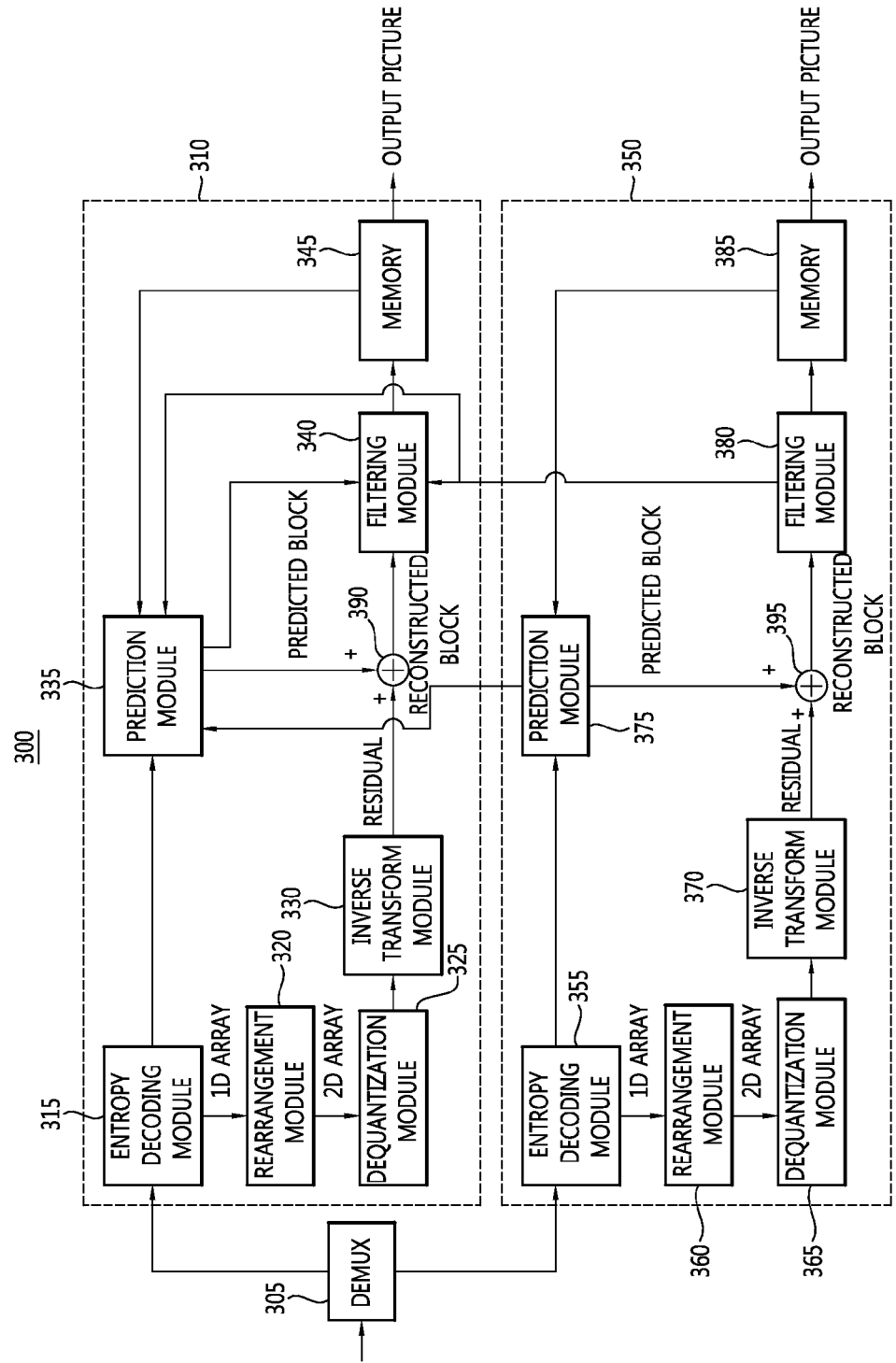
FIG. 3 is a block diagram schematically illustrating a video decoder that supports scalability according to an embodiment of the invention.

FIG. 3 is a block diagram schematically illustrating a video decoder that supports scalability according to an embodiment of the invention.

Referring to FIG. 3, the video decoder 300 includes a decoding module 310 for layer 1 and a decoding module 350 for layer 0.

Layer 0 may be a base layer, a reference layer, or a lower layer and layer 1 may be an enhancement layer, a current layer, or an upper layer.

The decoding module 310 for layer 1 may include an entropy decoding module 315, a rearrangement module 320, a dequantization module 325, an inverse transform module 330, a prediction module 335, a filtering module 340, and a memory 345.

The decoding module 350 for layer 0 may include an entropy decoding module 355, a rearrangement module 360, a dequantization module 365, an inverse transform module 370, a prediction module 375, a filtering module 380, and a memory 385.

When a bitstream including video information is transmitted from the video encoder, a DEMUX 305 may demultiplex the information by layers and may transmit the information to decoders by layers.

The entropy decoding modules 315 and 355 may perform entropy decoding to correspond to the entropy coding method used in the video encoder. For example, when the CABAC is used in the video encoder, the entropy decoding modules 315 and 355 may perform the entropy decoding using the CABAC.

The information for constructing a predicted block out of the information decoded by the entropy decoding modules 315 and 355 may be supplied to the prediction modules 335 and 375 and the residual values, that is, the quantized transform coefficients, subjected to the entropy decoding by the entropy decoding modules 315 and 355 may be input to the rearrangement modules 320 and 360.

The rearrangement modules 320 and 360 may rearrange the information of the bitstream, that is, the quantized transform coefficients, subjected to the entropy decoding by the entropy decoding modules 315 and 355 on the basis of the rearrangement method used by the video encoder.

For example, the rearrangement modules 320 and 360 may rearrange the quantized transform coefficients in a one-dimensional array into the coefficients in a two-dimensional array again. The rearrangement modules 320 and 360 may perform a scanning operation on the basis of the prediction mode applied to the current block (transform block) and/or the size of the transform block to construct a two-dimensional array of coefficients (quantized transform coefficients).

The dequantization modules 325 and 365 may perform a dequantization operation on the basis of the quantization parameter transmitted from the video encoder and the rearranged coefficient values of the block to generate transform coefficients.

The dequantization modules 325 and 365 may not dequantize the entropy-decoded residuals but may transmit the residuals to the inverse transform modules 330 and 370 depending on a predetermined condition or depending on the quantization method used by the video encoder.

The inverse transform modules 330 and 370 may perform inverse transform of the transform performed by the transform module of the video encoder on the transform coefficients. The inverse transform modules 330 and 370 may perform inverse DCT and/or inverse DST of the DCT and the DST performed by the video encoder.

The DCT and/or the DST in the video encoder may be selectively performed depending on multiple information pieces such as the prediction method, the size of the current block, and the prediction direction, and the inverse transform modules 330 and 370 of the video decoder may perform the inverse transform on the basis of the transform information used by the video encoder.

For example, the inverse transform modules 330 and 370 may perform the inverse DCT and the inverse DST depending on the prediction mode/block size. For example, the inverse transform modules 330 and 370 may perform the inverse DST on a 4×4 luma block to which the intra prediction has been applied.

The inverse transform modules 330 and 370 may fixedly use a specific inverse transform method regardless of the prediction mode/block size. For example, the inverse transform modules 330 and 370 may perform only the inverse DST on all the transform blocks. The inverse transform modules 330 and 370 may perform only the inverse DCT on all the transform blocks.

The inverse transform modules 330 and 370 may inversely transform the transform coefficients or a block of the transform coefficients to construct a residual signal or a residual block.

The inverse transform modules 330 and 370 may skip the transform if necessary or depending on the encoding method used by the video encoder. For example, the inverse transform modules 330 and 370 may skip the transform for a block having a specific prediction method applied thereto or having a specific size, or a block having a specific prediction method and having a specific size.

The prediction modules 335 and 375 may construct a predicted block of the current block on the basis of predicted block construction information supplied from the entropy decoding modules 315 and 355 and the previously-decoded block and/or picture information supplied from the memories 345 and 385.

When the prediction mode of the current block is an intra prediction mode, the prediction modules 335 and 375 may perform the intra prediction on the current block on the basis of pixel information of the current picture.

When the prediction mode for the current block is an inter prediction mode, the prediction modules 335 and 375 may perform the inter prediction on the current block on the basis of information included in at least one of a previous picture and a subsequent picture of the current picture. A part or all of the motion information necessary for the inter prediction may be derived depending on the information received from the video encoder.

When the skip mode is used as the inter prediction mode, the residual may not be transmitted from the video encoder and the predicted block may be used as the reconstructed block.

On the other hand, the prediction module 335 for layer 1 may perform the inter prediction or the intra prediction using only the information in layer 1 and may perform the inter-layer prediction using information of another layer (layer 0).

For example, the prediction module 335 for layer 1 may predict the current block using one of motion information of layer 1, texture information of layer 1, unit information of layer 1, and parameter information of layer 1. The prediction module 335 for layer 1 may predict the current block using multiple information pieces of the motion information of layer 1, the texture information of layer 1, the unit information of layer 1, and the parameter information of layer 1.

The prediction module 335 for layer 1 may receive the motion information of layer 1 from the prediction module 375 for layer 0 and may perform the motion prediction. The inter-layer motion prediction is also referred to as inter-layer inter prediction. By the inter-layer motion prediction, the current block of the current layer (enhancement layer) may be predicted using the motion information of the reference layer (base layer). The prediction module 335 may scale and use the motion information of the reference layer if necessary.

The prediction module 335 for layer 1 may receive the texture information of layer 1 from the prediction module 375 for layer 0 and may perform inter-layer texture prediction. The inter-layer texture prediction is also referred to as inter-layer intra prediction or intra base layer (BL) prediction. The inter-layer texture prediction may be used when a reference block of a reference layer is reconstructed. In the inter-layer texture prediction, a texture of a reference block in a reference layer may be used as predicted values of a current block in an enhancement layer. Here, the texture of the reference block may be scaled by upsampling.

The prediction module 335 for layer 1 may receive the unit parameter information of layer 1 from the prediction module 375 for layer 0 and may perform unit parameter prediction. By the unit parameter prediction, unit (CU, PU, and/or TU) information of a base layer may be used as the unit information of the enhancement layer or the unit information of the enhancement layer may be determined on the basis of the unit information of the base layer.

The prediction module 335 for layer 1 may receive the filtering parameter information of layer 1 from the prediction module 375 for layer 0 and may perform parameter prediction. By the parameter prediction, the parameter used for the base layer may be derived and reused for the enhancement layer or the parameter of the enhancement layer may be predicted on the basis of the parameter used for the base layer.

Adders 390 and 395 may construct a reconstructed block using the predicted block constructed by the prediction modules 335 and 375 and the residual block constructed by the inverse transform modules 330 and 370. In this case, the adders 390 and 395 may be considered as particular modules (reconstructed block constructing module) that constructing a reconstructed block.

The block and/or picture reconstructed by the adders 390 and 395 may be supplied to the filtering modules 340 and 380.

The filtering modules 340 and 380 may apply the deblocking filter, the SAO, and/or the ALF to the reconstructed block and/or picture.

The filtering modules 340 and 380 may not apply all of the deblocking filter, the ALF, and the SAO but may apply only the deblocking filter or may apply only the deblocking filter and the ALF or may apply only the deblocking filter and the SAO.

Referring to the example illustrated in FIG. 3, the filtering module 340 for layer 1 may perform a filtering operation on the reconstructed picture using the parameter information transmitted from the prediction module 335 for layer 1 and/or the filtering module 380 for layer 1. For example, the filtering module 340 for layer 1 may perform a filtering operation on layer 1 or an inter-layer filtering operation using the parameters predicted from the filtering parameters applied to layer 0.

The memories 345 and 385 may store the reconstructed block or picture for use as a reference picture or reference block. The memories 345 and 385 may output the reconstructed picture stored in the memories 345 and 385 via a predetermined output module (not illustrated) or a display (not illustrated).

In the example illustrated in FIG. 3, the rearrangement module, the dequantization module, the inverse transform module, and the like have been described to be independent modules, but the video decoder may be constructed so as to cause one module of the dequantization/inverse transform module to sequentially perform the rearrangement, the dequantization, and the inverse transform like the video encoder illustrated in FIG. 1.

On the other hand, the prediction module has been described with reference to FIG. 3, but the prediction module for layer 1 may include an inter-layer prediction module that performs a prediction process using information of another layer (layer 0) and an inter/intra prediction module that performs a prediction process not using information of another layer (layer 0) as illustrated in FIG. 1.

Figure 4:
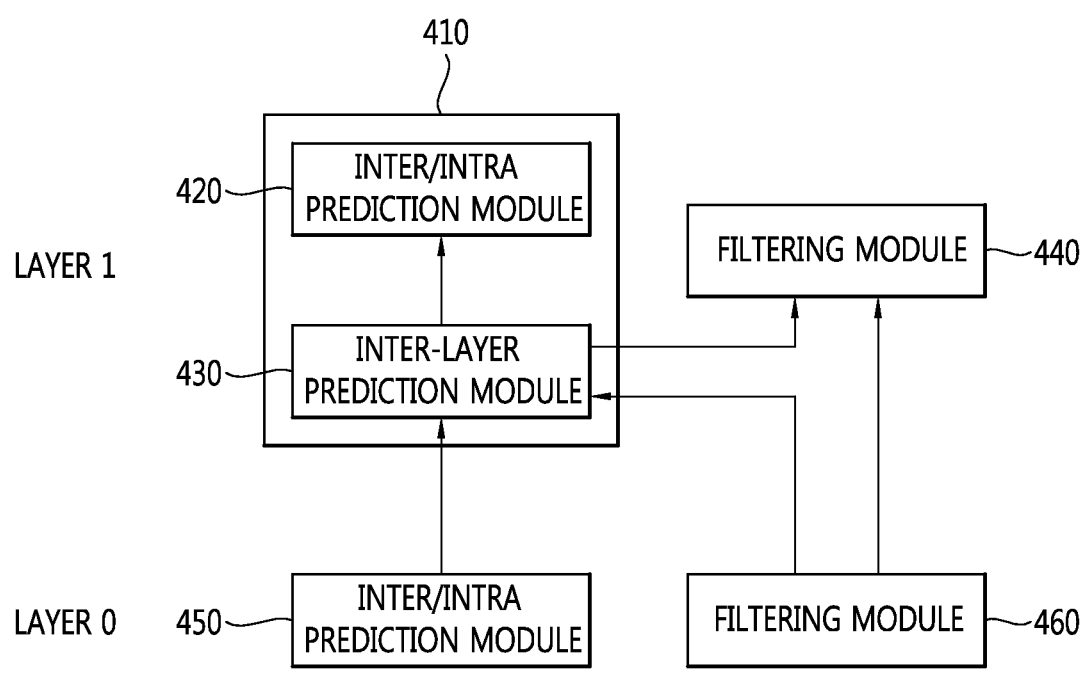
FIG. 4 is a block diagram illustrating an example of inter-layer prediction in the video decoder that performs scalable coding according to the invention.

FIG. 4 is a block diagram illustrating an example of inter-layer prediction in the video decoder that performs scalable coding according to the invention.

Referring to FIG. 4, a prediction module 410 for layer 1 includes an inter/intra prediction module 420 and an inter-layer prediction module 430.

The prediction module 410 for layer 1 may perform inter-layer prediction necessary for predicting layer 1 from the information of layer 0.

For example, the inter-layer prediction module 430 may receive the information of layer 0 from the inter/intra prediction module 450 and/or the filtering module 460 for layer 0 and may perform the inter-layer prediction necessary for predicting layer 1.

The inter/intra prediction module 420 for layer 1 may perform the inter prediction or the intra prediction using the information of layer 1.

The inter/intra prediction module 420 for layer 1 may perform prediction based on the information of layer 0 using the information transmitted from the inter-layer prediction module 430.

The filtering module 440 for layer 1 may perform filtering on the basis of the information of layer 0 or may perform filtering on the basis of the information of layer 1. The information of layer 0 may be transmitted from the filtering module 460 for layer 0 to the filtering module 440 for layer 1 or may be transmitted from the inter-layer prediction module 430 for layer 1 to the filtering module 440 for layer 1.

On the other hand, the information transmitted from layer 0 to the inter-layer predicting module 430 may be at least one of information on unit parameters of layer 0, motion information of layer 0, texture information of layer 0, and filter parameter information of layer 0.

In layer 1, the prediction module 410 may correspond to the prediction module 355 in FIG. 3, and the filtering module 440 may correspond to the filtering module 340 in FIG. 3. In layer 0, the prediction module 450 may correspond to the prediction module 375 in FIG. 3, and the filtering module 460 may correspond to the filtering module 380 in FIG. 3.

Although not illustrated, the inter-layer predicting module 430 may include a motion predicting module, a texture predicting module, a unit parameter predicting module, a parameter predicting module depending on the types of the inter-layer prediction to be performed (for example, motion prediction, texture prediction, unit parameter prediction, and parameter prediction).

In the scalable video coding, inter-layer prediction of predicting information of a current layer using information of another layer may be performed. As described with reference to FIGS. 1 to 4, the motion prediction, the texture prediction, the unit prediction, and the parameter prediction may be considered as examples of the inter-layer prediction.

The respective types of inter-layer prediction will be specifically described below with reference to the accompanying drawings.

Inter-Layer Intra Prediction

The inter-layer intra prediction is also referred to as inter-layer texture prediction or intra BL (Base Layer) prediction. In this description, for the purpose of convenience of explanation, the terms of the inter-layer intra prediction, the texture prediction, and the intra BL prediction may be mixed.

At this time, in order to match the reconstructed picture of a base layer and a picture of an enhancement layer with each other in picture size or resolution, the reconstructed picture of the base layer may be subjected to upsampling.

For example, the upsampling may be performed using a DCTIF (DCT based Interpolation Filter). For example, luma samples may be subjected to the upsampling using an 8-tap DCTIF and chroma samples may be subjected to the upsampling using a 4-tap DCTIF.

The upsampling may be performed using interpolation.

On the other hand, the inter-layer intra prediction according to the invention exhibits features other than in the related art depending on the encoding/decoding units. For example, at the coding block (for example, CU) level, the inter-layer intra prediction may be applied depending on an independent CU partition regardless of the block size of a base layer.

At the prediction block (for example PU) level, the cost of the inter-layer intra prediction may be compared with the cost of the intra prediction in the current layer (enhancement layer). Here, the inter-layer intra prediction is compared in rate-distortion optimization (RDO) with the intra prediction using the reconstructed picture of the base layer (reference layer) as a reference picture without using the intra prediction mode.

In order to apply the inter-layer intra prediction, whether to apply the inter-layer intra prediction may be signaled in the form of a flag at an upper level without creating a new mode for the PU. For example, information indicating whether to use the inter-layer intra prediction may be transmitted in the form of a flag at a position subsequent to a split flag (split_flag) before performing parsing on a block mode or partitioning.

At the transform block (for example, TU) level, the inter-layer intra prediction may be applied to perform the transform with the quad tree structure of the HEVC maintained.

Figure 5:
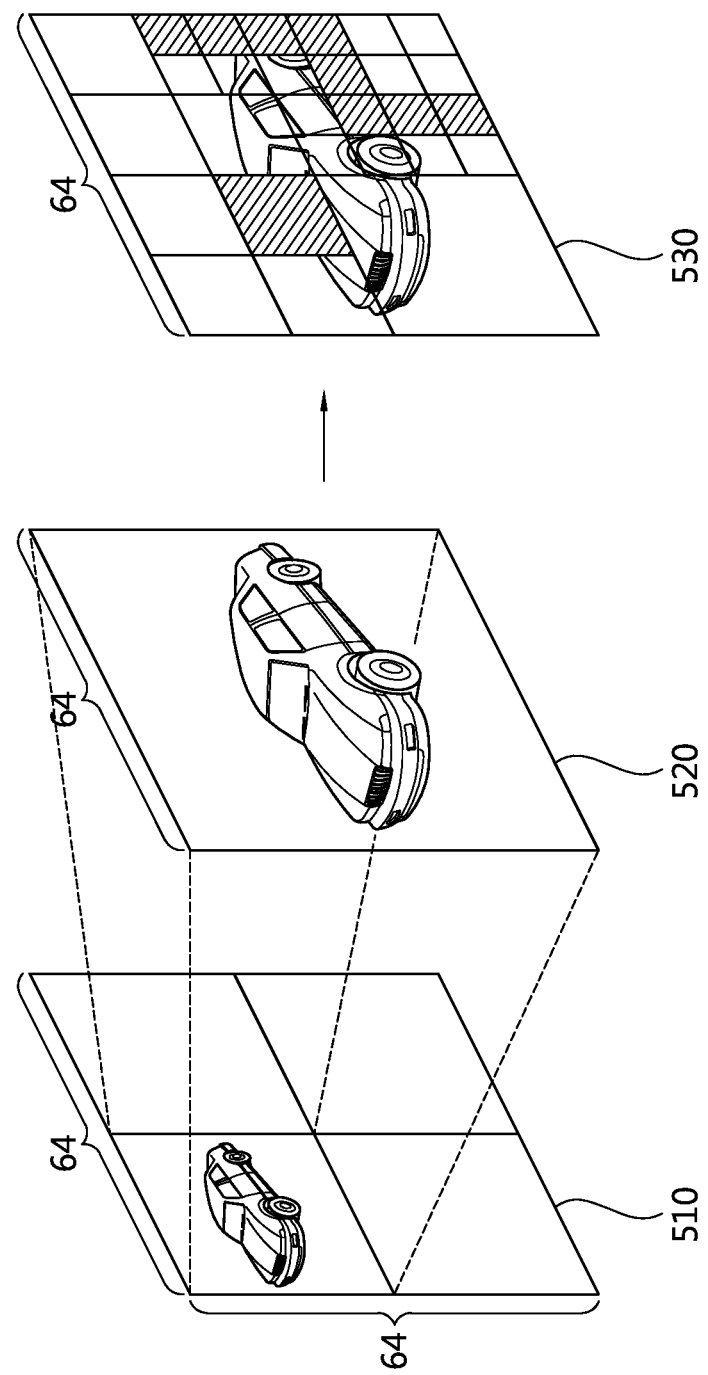
FIG. 5 is a diagram schematically illustrating an example of inter-layer intra prediction according to the invention.

FIG. 5 is a diagram schematically illustrating an example where the inter-layer intra prediction is performed according to the invention.

In the example illustrated in FIG. 5, a picture 510 of a base layer and a picture 530 of an enhancement layer have the same size of 64×64, but the picture 530 of the enhancement layer has a resolution which is four times the resolution of the picture 510 of the base layer.

Accordingly, in order to refer to the picture 510 of the base layer at the time of predicting the picture 530 of the enhancement layer, a reference picture 520 is constructed by upsampling the picture 510 of the base layer reconstructed in the intra prediction mode and is then used to predict the enhancement layer.

The shaded parts in the picture 530 of the enhancement layer indicates blocks to which the inter-layer intra prediction is not applied.

When the inter-layer intra prediction is applied in this way, the picture of the base layer may be subjected to rescaling.

Specifically, the video encoder may perform a process of downsampling an input picture so as to encode/decode the input picture by plural layers having different resolutions. The video encoder/video decoder may upsample a reconstructed picture of a lower layer so as to use the picture of the lower layer as a reference picture in the course of encoding/decoding.

When the downsampling and the upsampling are performed, mismatch in phase characteristics may cause loss in the encoding/decoding process and may have a direct influence to coding performance.

Figure 6:
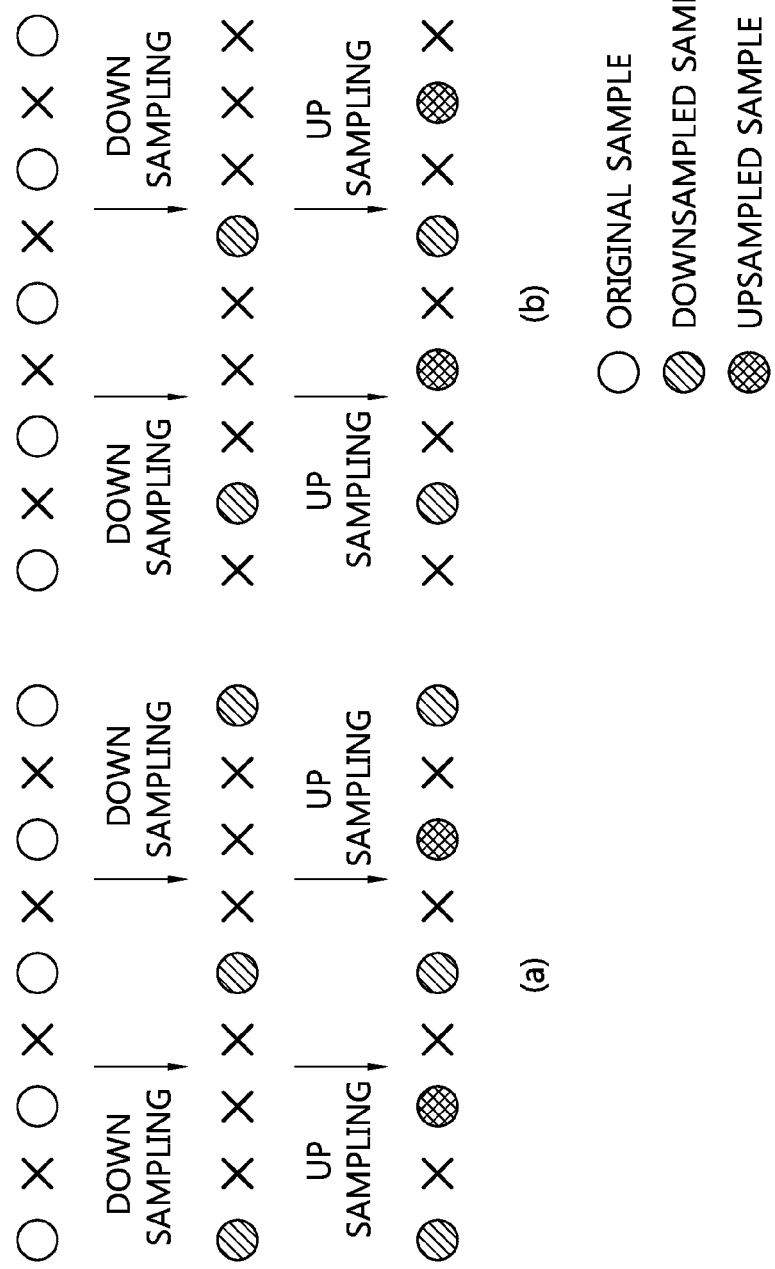
FIG. 6 is a diagram schematically illustrating an example of rescaling (downsampling/upsampling) which is applied in the course of the inter-layer intra prediction according to the invention.

FIG. 6 is a diagram schematically illustrating an example of rescaling (downsampling/upsampling) which is applied in the course of the inter-layer intra prediction according to the invention.

FIG. 6(a) illustrates an example where a col-located integer sample is used as a downsampled sample. FIG. 6(b) illustrates an example where a col-located integer sample is not used but a sample departing by ½ phase is used.

As illustrated in FIG. 6(a) and FIG. 6(b), when a half-pel upsampling filter is applied to samples obtained by downsampling original samples, samples may be generated at positions departing by ½ phase from the downsampled sample positions.

In FIG. 6(a) in which a phase is not shifted at the time of downsampling, samples are generated at the same positions as the original samples by upsampling. On the contrary, in FIG. 6(b) in which a phase is shifted at the time of downsampling, samples are generated at positions (positions departing by ½ phase) other than the positions of the original samples. Accordingly, in FIG. 6(b), a loss may occur between the original samples and the upsampled samples due to the phase mismatch.

Figure 7:
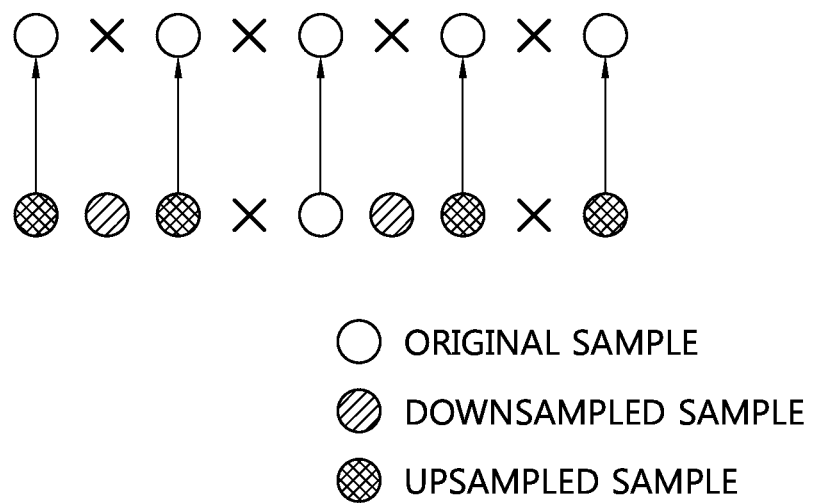
FIG. 7 is a diagram schematically illustrating an example of phase-shifted upsampling according to the invention.

In order to solve this problem, it may be considered that phase-shifted upsampling of matching the original samples (original picture) in phase is performed in the upsampling process FIG. 7 is a diagram schematically illustrating an example of the phase-shifted upsampling according to the invention.

The lower samples in FIG. 7 indicate together downsampled samples with a shift of ½ phase from the original samples and samples upsampled from the downsampled samples.

In the example illustrated in FIG. 7, in order to compensate for the phase shift in the downsampling process, the upsampling is performed at positions of ¼ phase and ¾ phase on the downsampled samples in the upsampling process.

By interpolating the downsampled samples using the samples of ¼ phase and ¾ phase, it is possible to remove the phase mismatch. Referring to FIG. 7, it can be seen that the samples upsampled at the positions of ¼ phase and ¾ phase from the downsampled samples has no phase mismatch with the original samples.

At the time of applying the upsampling filtering, by what phase shift to match the original samples in phase may be determined depending on the phase shift used at the time of downsampling.

For example, in order to apply the upsampling filtering in the video decoder so as not to cause a phase mismatch between the original samples and the upsampled samples, it is necessary to transmit the information on the downsampling filter applied by the video encoder or the information on the upsampling filter to be used by the video decoder from the video encoder to the video decoder.

Table 1 shows an example of downsampling/upsampling filter information transmitted for phase match according to the invention.

TABLE 1 filter length: tap size of used filter
Filter coefficient: coefficient value applied to each tap
Shifted phase: phase of downsampled/upsampled picture A lool-up table may be used instead of explicitly transmitting the filter information from the video encoder to the video decoder.

At this time, the video encoder may transmit an index indicating the filter information in the look-up table to the video decoder. The transmitted index may be an index indicating the information of the downsampling filter used by the video encoder or may be an index indicating the information of the upsampling filter to be used by the video decoder.

Table 2 shows an example of the look-up table used to transmit the filter information according to the invention.

TABLE 2

| filter index | description |
| --- | --- |
| 00 | 8-tap/Half-pel interpolation filter |
| 01 | 4-tap/Half-pel interpolation filter |
| 10 | 8-tap/¼, ¾ phase interpolation filter |
| 11 | 4-tap/¼, ¾ phase interpolation filter |

The information of the upsampling/downsampling filter may be stored/transmitted at a predetermined level of the encoding/decoding process. For example, the filter information may be transmitted through the use of a sequence parameter set. In this case, the same filters may be used for the same sequence as long as not differently signaled. The filter information may be transmitted through the use of a picture parameter set and the same filters may be used for the same picture as long as not differently signaled. Alternatively, by storing and transmitting the filter information through the use of a slice header, the same filters may be used for the same slice as long as not differently signaled.

Table 3 briefly shows an example where the filter information is transmitted through the use of a sequence parameter set.

TABLE 3

| | Descriptor |
| --- | --- |
| seq_parameter_set_rbsp( ) { | |
|     profile_idc | u(8) |
|     reserved_zero_8bits /* equal to 0 */ | u(8) |
|     level_idc | u(8) |
|     ... | |
|     adaptive_loop_filter_enabled_flag | u(1) |
|     Interpolation_filter_indicator | u(2) |
|     pcm_loop_filter_disable_flag | u(1) |
|     cu_qp_delta_enabled_flag | u(1) |
|     temporal_id_nesting_flag | u(1) |
|     rbsp_trailing_bits( ) | |
| } | |

In Table 3, Interpolation_filter_indicator indicates the type of an interpolation filter to be used.

Table 3 shows a syntax structure when the filter information is stored in the sequence parameter set, but this is only an example of the invention. Interpolation_filter_indicator may be transmitted through the use of a picture parameter set or a slice header as described above.

The type of the filter indicated by Interpolation_filter_indicator is information indicating the feature of the filter and includes phase, tap size, tap coefficient, and the like as shown in Table 1.

That is, Interpolation_filter_indicator may indicate an index of the look-up table as shown in Table 4. Table 4 shows an example of a table used to indicate the filter information applied to rescaling using Interpolation_filter_indicator.

TABLE 4

| Interpolation_filter_indicator | description |
|---|---|
| 00 | 8-tap/Half-pel interpolation filter |
| 01 | 4-tap/Half-pel interpolation filter |
| 10 | 8-tap/¼, ¾ phase interpolation filter |
| 11 | 4-tap/¼, ¾ phase interpolation filter |

Figure 8:
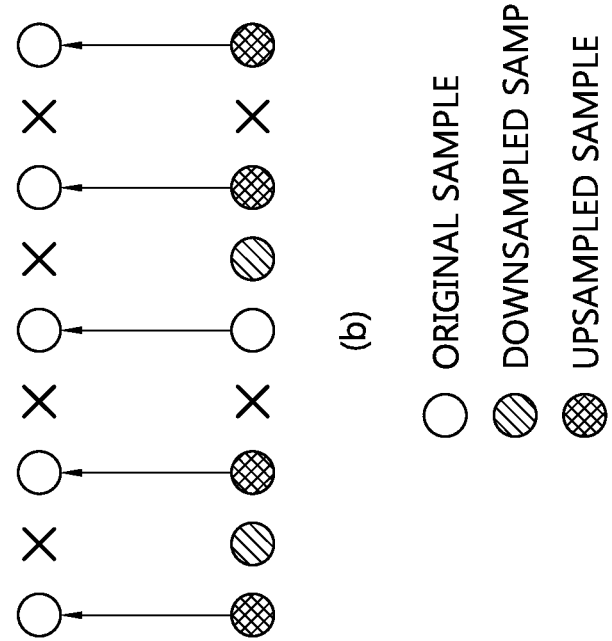
FIG. 8 is a diagram illustrating an example of a method using Interpolation_filter_indicator according to the invention, that is, a sampling method when the value of Interpolation_filter_indicator is 10.
Figure 8:
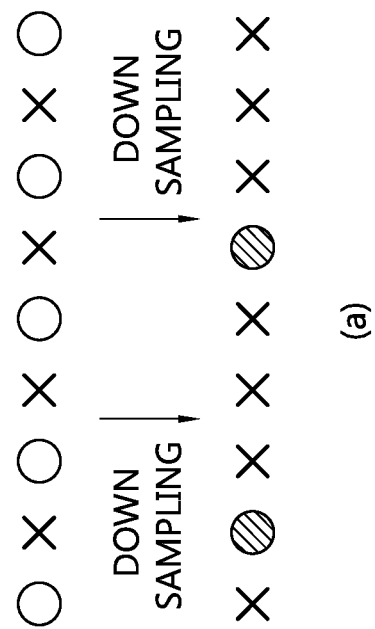

FIG. 8 is a diagram illustrating an example of a method using Interpolation_filter_indicator according to the invention, that is, a sampling method when the value of Interpolation_filter_indicator is 10.

FIG. 8(a) illustrates an example of downsampling with ½ phase shift applied thereto and FIG. 8(b) illustrates an example where upsampling is performed on the samples downsampled in FIG. 8(a).

In FIG. 8(b), in order to match the phases between the original samples and the upsampled samples, an 8-tap/¼ and ¾ phase interpolation filter is used to perform the upsampling as indicated by Interpolation_filter_indicator.

In other words, Interpolation_filter_indicator indicates the upsampling filter to be used by the video decoder and indicates that the "8-tap/¼ and ¾ phase interpolation filter" will be used to match the phase, for example, when the value of Interpolation_filter_indicator is 10. The using of the 8-tap/¼ and ¾ phase interpolation filter to match the phase means that the downsampling with ½ phase shift applied thereto has been performed by the video encoder.

The inter-layer intra prediction described hitherto may be performed by the inter-layer prediction module (for example, the texture predicting module) described with reference to FIGS. 1 to 4. In the inter-layer intra prediction, the texture of the reference block in the reference layer may be used as the predicted values of the current block of the enhancement layer. Here, the texture of the reference block may be scaled by upsampling.

Whether to apply the inter-layer intra prediction may be signaled in the form of a flag subsequent to a flag indicating whether to partition a CU. When the scaling is used in the inter-layer intra prediction, the filter information may be encoded and transmitted. At this time, the information to be transmitted is as described above.

Inter-Layer Motion Prediction

The inter-layer motion prediction is also referred to as inter-layer inter prediction and the inter-layer motion prediction and the inter-layer inter prediction may be mixed, if necessary, for the purpose of easy understanding of the invention in this description.

In the inter-layer motion prediction, the current block of a current layer (enhancement layer) may be predicted using the motion information of a reference layer (base layer).

The inter-layer motion prediction may be performed by the prediction module or the inter-layer prediction module illustrated in FIGS. 1 to 4. Hereinafter, it is assumed for the purpose of convenience of explanation that the inter-layer motion prediction is performed by the prediction module.

Figure 9:
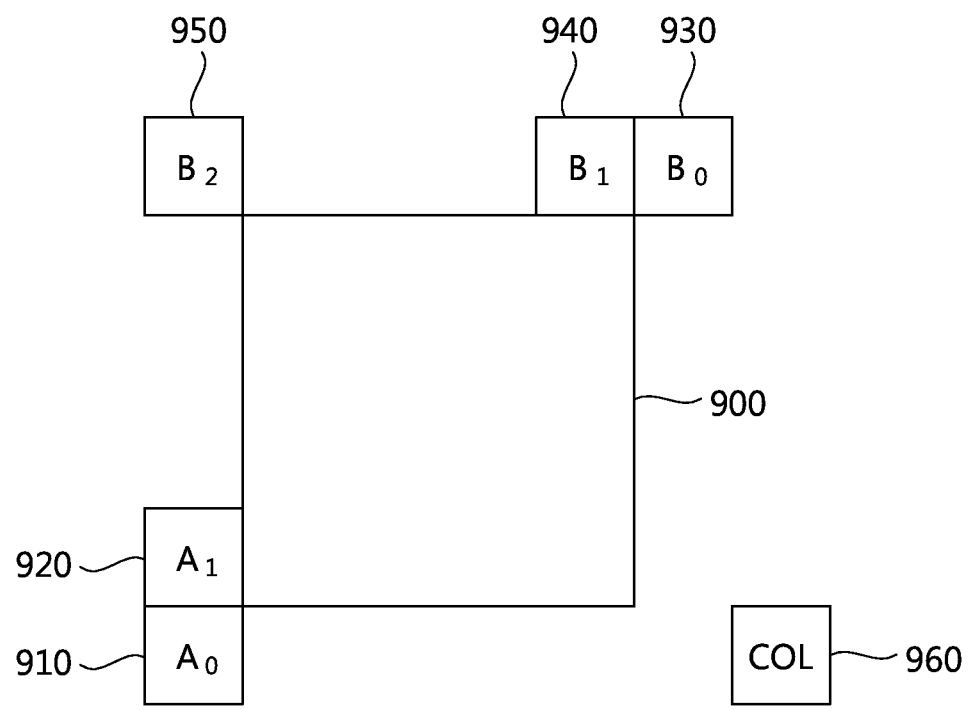
FIG. 9 is a diagram briefly illustrating an example of candidates of motion information which is used to perform inter prediction in a layer without referring to another layer.

FIG. 9 is a diagram briefly illustrating an example of candidates of motion information which is used to perform the inter prediction in a layer without referring to another layer (hereinafter, referred to as "inter prediction").

In FIG. 9, $A_0$, $A_1$, $B_0$, $B_1$, $B_2$, and COL may denote the corresponding blocks or may denote motion information of the corresponding blocks. Here, the motion information of the corresponding blocks may be a motion vector or may be a motion vector and a reference picture index.

Here, the inter prediction method will be described using a base layer as an example.

The inter prediction in a base layer may be performed by the prediction module or the inter/intra prediction module illustrated in FIGS. 1 to 4. Hereinafter, it is assumed for the purpose of convenience of explanation that the inter prediction is performed by the prediction module.

The inter prediction modes include a merge mode, a skip mode, and a mode using a motion vector predictor (MVP). The mode using an MVP is also referred to as an AMVP (advanced MVP) mode for the purpose of convenience of explanation.

In the merge mode, the motion information selected out of the motion information (hereinafter, referred to as motion information candidates) of neighboring blocks illustrated in FIG. 9 may be used as the motion information of the current block. Information indicating the selected motion information candidate may be transmitted from the video encoder to the video decoder.

In the skip mode, the motion information of the motion information candidate selected in the same way as in the merge mode is used as the motion information of the current block, but the residual is not generated/transmitted.

When the merge mode or the skip mode is applied, the prediction module may determine availability of spatial candidates $A_0$, $A_1$, $B_0$, $B_1$, and $B_2$ around the current block. The availability determination may be carried out in a predetermined order. For example, the availability determination may be performed in the order of $A_1 \rightarrow B_1 \rightarrow B_0 \rightarrow A_1 \rightarrow B_2$.

Here, the availability determination of each candidate may include equality determination to the previous candidate. For example, the availability of $B_1$ may be performed in consideration of whether the motion information is identical to that of $A_1$. Specifically, when $A_1$ is available and $A_1$ and $B_1$ have the same motion information, it may be determined that $B_1$ is not available.

Similarly, the availability of $B_0$ may be performed in consideration of whether the motion information is identical to that of $B_1$, and the availability of $A_0$ may be performed in consideration of whether the motion information is identical to that of $A_1$.

The availability determination of $B_2$ may be performed in consideration of both whether $B_2$ has the same motion information as $A_1$ and whether $B_2$ has the same motion information as $B_1$. At this time, when the previous four candidates $A_0$, $A_1$, $B_0$, $B_1$ are all available, it may be determined that $B_2$ is not available.

When the COL candidate is used, a COL picture including the COL candidate may be specified using a reference picture list. The motion information of a prediction block including a predetermined position in the COL block in the same LCU as the current block may be used as the COL candidate. At this time, the motion vector of the COL candidate may be scaled in consideration of the COL picture and the reference pictures of the current picture. The reference index of the COL candidate may be set to a predetermined value (for example, 0).

A merge candidate list may be constructed according to the availability determination order from the candidates determined to be available and including the COL candidate. At this time, when the slice type of the current block is B (that is, a slice to which bidirectional prediction is applied) and the number of candidates included in the merge candidate list is smaller than the maximum number, candidates (combined bi-prediction candidates) may be added to the merge candidate list.

When the number of candidates in the merge candidate list is smaller than the maximum number even after the merge candidate list is constructed as described above, a predetermined candidate (for example, a zero merge candidate) may be added to the merge candidate list.

The prediction module may perform the inter prediction using the motion information of the candidate indicated by the information (for example, merge index merge_idx) transmitted from the video encoder in the merge candidate list as the motion information of the current block. For example, the prediction module may use samples indicated by the motion information of the candidates selected by the merge index as predicted samples of the current block.

On the other hand, when the AMVP mode is applied, the prediction module may also construct an AMVP list including MVP candidates.

In the AMVP mode, the prediction module determines the availability of the candidates in the order of $A_0 \rightarrow A_1$, and determines the availability of candidates in the order of $B_0 \rightarrow B_1 \rightarrow B_2$.

At the time of determining the availability of candidates in the order of $A_0 \rightarrow A_1$, the prediction module may add the corresponding candidate to the AMVP list (1) when a candidate having the same reference picture as the current block is present as an available candidate. When there is no candidate satisfying (1), the prediction module may scale the motion vector of a candidate previously determined to be available (2) on the basis of a POC (Picture Order Count) difference between a current picture and a reference picture of the current picture and a POC difference between the current picture and a reference picture of the candidate. The prediction module may add the scaled motion vector to the AMVP list.

When the availability of candidate is determined in the order of $B_0 \rightarrow B_1 \rightarrow B_2$, the prediction module adds the corresponding candidate to the AMVP list (1) when the candidate having the same reference picture as the current block is present as an available candidate. When there is no candidate satisfying (1) and any of $A_0$ and $A_1$ is not available, the prediction module may scale the motion vector of a candidate previously determined to be available (2) on the basis of a POC difference between a current picture and a reference picture of the current picture and a POC difference between the current picture and a reference picture of the candidate. The prediction module may add the scaled motion vector to the AMVP list.

When the COL candidate (temporal candidate) is used, the COL picture including the COL candidate may be specified using the reference picture list. The motion information of a prediction block including a predetermined position in the COL block in the same LCU as the current block can be used as the COL candidate. At this time, the motion vector of the COL candidate may be scaled in consideration of the COL picture and the reference pictures of the current picture.

When an MVP candidate determined by the availability determination of candidates in the order of $A_0 \rightarrow A_1$ is A, an MVP candidate determined by the availability determination of candidates in the order of $B_0 \rightarrow B_1 \rightarrow B_2$ is B, and an MVP candidate determined by the availability determination of temporal candidates is COL, the AMVP list may be constructed in the order of [A B COL].

At this time, the prediction module may delete one of A and B from the AMVP list when A and B are the same.

The prediction module may adjust the number of MVP candidates in the AMVP list to 2 when all of A, B, and COL are available. For example, the prediction module may construct the AMVP list to include A and B and may remove COL from the AMVP list.

The prediction module may add a zero (0) motion vector as a candidate when the number of candidates in the AMVP list is smaller than 2.

The video encoder may transmit an MVP index indicating an MVP to be used in the inter prediction of the current block in the AMVP list, a motion vector difference mvd, and a reference index indicating a reference picture for the current block in the reference picture list to the video decoder. The reference picture list is a list of reference pictures to be used in the inter prediction and is classified into L0 for forward prediction and L1 for backward prediction.

The prediction module may construct a predicted block of the current block on the basis of the MVP indicated by the MVP index, the motion vector derived from mvd, and the reference picture indicated by the reference index.

When the merge mode/skip mode or the AMVP mode is applied to construct a predicted block, the prediction module may construct a reconstructed block of the current block on the basis of the predicted block and a residual. When the skip mode is applied, the residual is not transmitted and thus the prediction module may use the predicted block as the reconstructed block.

The inter prediction method has been described using a base layer as an example, but the inter prediction may be performed in the same method as described above when the inter prediction is performed on the enhancement layer without using information of another layer.

When the inter prediction is performed on the base layer as described above, the inter-layer motion prediction may be performed on the enhancement layer using the motion information of the base layer.

The inter-layer motion prediction may be performed by the prediction modules of the video encoder and the video decoder.

Figure 10:
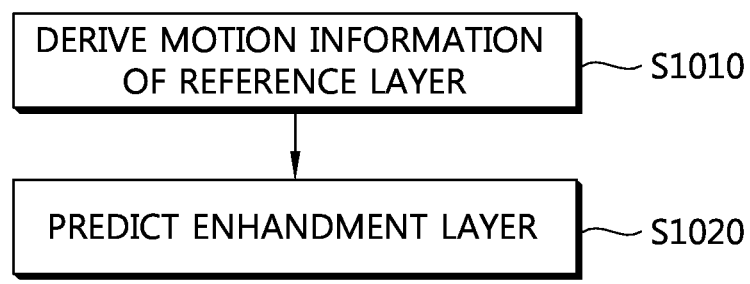
FIG. 10 is a flowchart illustrating an example of a method of performing inter-layer motion prediction according to the invention.

FIG. 10 is a flowchart schematically illustrating an example of a method of performing the inter-layer motion prediction according to the invention.

Referring to FIG. 10, the prediction module for an enhancement layer may derive the motion information of a reference layer (S1010). For example, the inter-layer prediction module for the enhancement layer may derive the motion information of the reference layer on the basis of the information transmitted from the prediction module for the reference layer. Alternatively, the prediction module for the enhancement layer may derive the motion information of the reference layer on the basis of information transmitted from the video encoder.

At this time, the prediction module for the enhancement layer may scale the derived motion information of the reference layer, for example, the derived motion vector of the reference layer.

The prediction module of the enhancement layer may perform the inter-layer inter prediction on the current block using the motion information of the reference layer (S1020). For example, the inter/intra prediction module for the enhancement layer may predict the current block using the motion information of the reference layer derived by the inter-layer prediction module as a candidate of the merge mode/skip mode or the AMVP mode.

The inter-layer intra prediction according to the invention will be specifically described with reference to the accompanying drawings.

1. Deriving of Motion Information of Reference Layer

Figure 11:
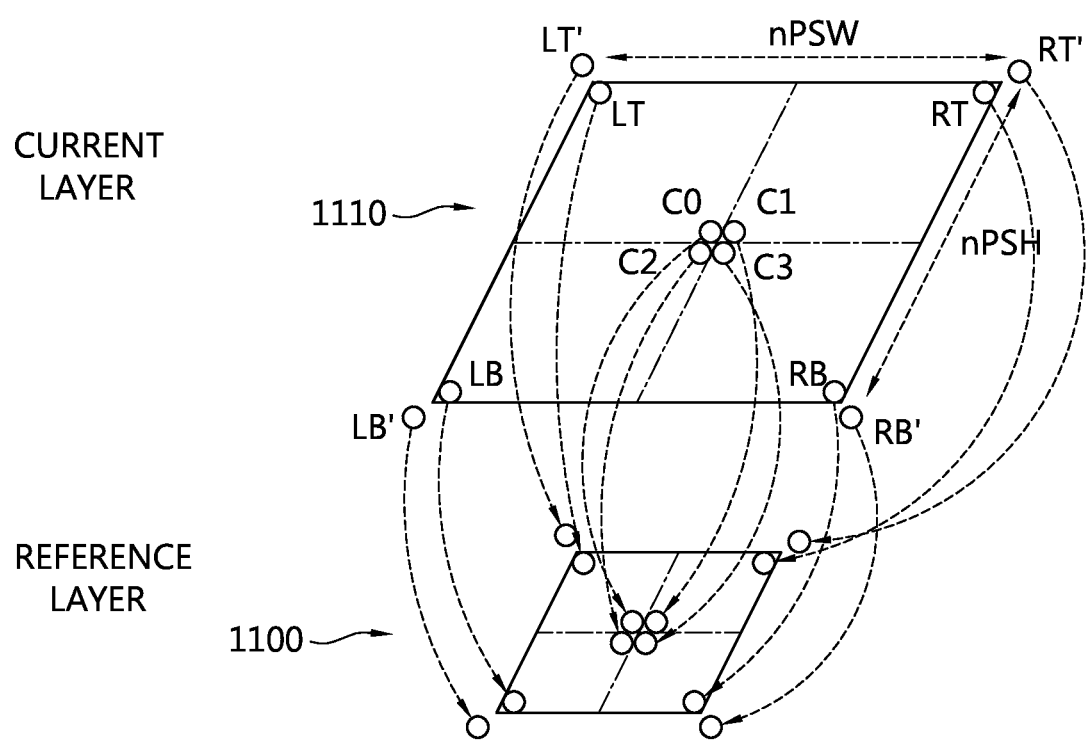
FIG. 11 is a diagram schematically illustrating a method of deriving motion information of a reference layer according to the invention.

FIG. 11 is a diagram schematically illustrating a method of deriving the motion information of the reference layer according to the invention. FIG. 11 illustrates an example where a current layer is an upper layer of a reference layer and the resolution of the current layer is higher than the resolution of the reference layer.

Referring to FIG. 11, a current PU may be specified on the basis of a PU 1100 (reference PU) of the reference layer corresponding to a PU 1110 (current PU) of the current layer.

It is assumed that the position for specifying the current PU is (xCurr, yCurr) and the position of the reference layer corresponding to the current PU, for example, the position for specifying the reference PU is (xRef, yRef).

It is assumed that an inter-layer motion vector to be derived from the motion vector of the reference layer is mvIL and the motion vector of the reference layer (for example, the motion vector of the reference PU) specified by (xRef, yRef) is mvRL.

In FIG. 11, nPSW is the width of the current PU 1110 and nPSH is the height of current PU 1110.

The prediction module may derive the motion information (for example the motion vector) of the reference PU by specifying the current PU and specifying the reference PU on the basis of the position of the current PU.

(1) Determination of Position (xCurr, yCurr) for Specifying Current PU

The position (xCurr, yCurr) for specifying the current PU may be determined to be any one of candidates ① to ⑫.

① LT=(xP, yP)
② RT=(xP+nPSW−1, yP)
③ LB=(xP, yP+nPSH−1)
④ RB=(xP+nPSW−1, yP+nPSH−1)
⑤ LT'=(xP−1, yP−1)
⑥ RT'=(xP+nPSW, yP−1)
⑦ LB'=(xP−1, yP+nPSH)
⑧ RB'=(xP+nPSW, yP+nPSH)
⑨ C0=(xP+(nPSW>>1)−1, yP+(nPSH−1)−1)
⑩ C1=(xP+(nPSW>>1), yP+(nPSH>>1)−1)
⑪ C2=(xP+(nPSW>>1)−1, yP+(nPSH>>1))
⑫ C3=(xP+(nPSW>>1), yP+(nPSH>>1))

The position (xCurr, yCurr) for specifying the current PU may be determined to be any one of ① to ⑫ and may be fixedly used, or may be determined through the RDO in the video encoder and then what position to use as (xCurr, yCurr) may be signaled.

Alternatively, the same position corresponding to the position for specifying a PU in the reference layer (base layer) may be determined to be the position for specifying a PU in the current layer (enhancement layer). For example, when the top-left corner in the PU of the reference layer is used as the position for specifying the PU, the top-left corner LT=(xP, yP) in the PU of the current layer may be determined as (xCurr, yCurr) for use.

(2) Target Position (xRef, yRef) in Reference Layer

The position (position of the reference PU) from which a motion vector is taken in the reference layer may be determined from the position of the current PU depending on the ratio between the current layer and the reference layer.

Expression 1 represents the method of determining the position from which the motion vector is taken in the reference layer according to the invention.

$$xRef = xCurr/scale$$

$$yRef = yCurr/scale \qquad \text{<Expression 1>}$$

At this time, the coefficient scale indicating the ratio of the current layer to the reference layer may be determined depending on the resolutions of the two layers. For example, when the resolution of the current layer is double the resolution of the reference layer, the value of scale to be applied is 2. When the resolution of the current layer is equal to the resolution of the reference layer, the value of scale to be applied is 1.

The value of scale is determined to be the resolution ratio of the current layer to the reference layer, but the invention is not limited to the resolution ratio. The coefficient scale may be determined depending on the scalability type to be applied between the current layer and the reference layer. For example, the coefficient scale may be a picture size ratio or a frame rate ratio between the current layer and the reference layer.

The prediction module may derive the motion vector at the position (xRef, yRef), that is, the motion vector of a PU (reference PU) covering the position (xRef, yRef), as mvRL.

The prediction module may derive the reference index of the PU (reference PU) covering the position (xRef, yRef) as a reference index refIdxIL to be used in the inter-layer motion prediction.

The prediction module may derive the motion vector mvIL to be used in the inter-layer motion prediction (inter-layer inter prediction) by scaling mvRL.

Expression 2 represents the method of deriving mvIL by scaling mvRL according to the invention.

$$mvIL = scale * mvRL \qquad \text{<Expression 2>}$$

The coefficient scale in Expression 2 represents the ratio of the current layer to the reference layer, similarly to Expression 1. For example, when the resolution of the current layer is double the resolution of the reference layer, the value of scale to be applied is 2.

When the resolution of the current layer is equal to the resolution of the reference layer, the value of scale to be applied is 1 and the prediction module may use mvRL as mvIL.

2. Inter-Layer Inter Prediction Using Motion Information Derived from Reference Layer The prediction module may perform the inter-layer inter prediction on the current block of the current layer (enhancement layer) using the motion information derived from the reference layer. The motion information derived from the reference layer includes a motion vector mvIL and a reference index refIdxIL.

For example, when the merge mode/skip mode is applied, the prediction module may add mvIL and refIdxIL as merge candidates to the merge candidate list for the current block.

When the AMVP mode is applied, the prediction module may add mvIL as an MVP candidate to the AMVP list for the current block.

(1) When Merge Mode is Applied

Table 5 shows an example of the merge candidate list constructed when another layer is not referred to in the inter prediction and the merge mode is used in a layer as described above.

TABLE 5

Merge candidate list of inter prediction $A_1$ when $A_1$ is avaliable
$B_1$ when $B_1$ is avaliable
$B_0$ when $B_0$ is avaliable
$A_0$ when $A_0$ is avaliable
$B_2$ when $A_1$, $B_1$, $B_0$, $A_0$ are not available but $B_2$ is avaliable
combined bi-prediction candidate when not greater than the maximum number of candidates
zero motion vector candidate when not greater than the maximum number of candidates In Table 5, $A_1$, $B_1$, $B_0$, $A_0$, $B_2$, and COL are equal to $A_1$, $B_1$, $B_0$, $A_0$, $B_2$, and COL in FIG. 9. The method of constructing the merge candidate list of the inter prediction in Table 5 is the same as in the merge mode of the inter prediction described above with reference to FIG. 9.

In Table 5, an index with the smallest value may be allocated to the candidate located at the uppermost position and an index with the greatest value may be allocated to the candidate located at the lowermost position.

On the contrary, when the inter-layer motion prediction is applied, the prediction module may construct the merge candidate list including the motion information derived from the reference layer unlike Table 5. Here, for the purpose of convenience of explanation, the motion information derived from the reference layer is referred to as reference layer candidate REF.

The REF includes mvIL and refIdxIL.

Table 6 shows an example of the merge candidate list constructed by the prediction module when the merge mode of the inter-layer motion prediction according to the invention is applied. Table 6 shows the order in which reference layer candidates are added to the merge candidate list according to the invention.

TABLE 6

Merge candidate list of inter-layer motion prediction

ⓐ
$A_1$ when $A_1$ is avaliable
$B_1$ when $B_1$ is avaliable
ⓑ
$B_0$ when $B_0$ is avaliable
$A_0$ when $A_0$ is avaliable
$B_2$ when $A_1$, $B_1$, $B_0$, $A_0$ are not available but $B_2$ is avaliable
ⓒ
COL
ⓓ
combined bi-prediction candidate when not greater than the maximum number of candidates
ⓔ
zero motion vector candidate when not greater than the maximum number of candidates
ⓕ

In Table 6, $A_1$, $B_1$, $B_0$, $A_0$, $B_2$, and COL are equal to $A_1$, $B_1$, $B_0$, $A_0$, $B_2$, and COL in FIG. 9. The method of constructing the merge candidate list using $A_1$, $B_1$, $B_0$, $A_0$, $B_2$, and COL in Table 6 is the same as in the merge mode of the inter prediction described above with reference to FIG. 9.

In Table 6, an index with the smallest value may be allocated to the candidate located at the uppermost position and an index with the greatest value may be allocated to the candidate located at the lowermost position.

Here, as described with reference to FIG. 9, the prediction module may consider the equality to a previous candidate whenever the availability of $A_1$, $B_1$, $B_0$, $A_0$, and $B_2$ is determined.

The prediction module may determine the equality of $A_1$, $B_1$, $B_0$, $A_0$, $B_2$, and COL at a time after constructing the list with the equality of $A_1$, $B_1$, $B_0$, $A_0$, and $B_2$ excluded. In this case, the operation of leaving one of the equal candidates may be performed after the availability of COL is determined.

When the merge mode of the inter-layer motion prediction is used, the prediction module may add the REF to any of ⓐ to ⓕ in the merge candidate list of Table 6.

For example, the prediction module may allocate the smallest index (for example, 0) to the REF and may add the REF to ⓐ in the merge candidate list. That is, the prediction module may add the REF to the head of the merge candidate list.

The prediction module may allocate the largest index (for example, the maximum number of candidates in the merge candidate list −1) to the REF and may add the REF to ⓕ in the merge candidate list. That is, the prediction module may add the REF to the tail of the merge candidate list.

The prediction module may add the REF to ⓒ subsequent to the spatial candidates. That is, the prediction module may add the REF to the merge candidate list after the availability of the spatial candidates is determined.

The prediction module may add the REF to ⓓ subsequent to the uni-prediction candidates and previous to the combined bi-prediction candidate out of the candidates in the current layer. That is, the prediction module may add the REF to the merge candidate list after determining the availability of the uni-prediction candidates out of the candidates in the current layer and before adding the combined bi-prediction candidate.

The prediction module may add the REF to ⓔ after considering all the candidates in the current layer. That is, the prediction module may add the REF to the merge candidate list after checking the availability of all the candidates in the current layer.

In addition, the prediction module may add the REF ⓑ after considering the left candidate and the upper candidate of the current block. That is, the prediction module may add the REF to the merge candidate list after sequentially checking the availability of the left candidate and the upper candidate of the current block.

The number of candidates included in the merge candidate list of the inter-layer motion prediction in Table 6, that is, the maximum number of candidates, may be the same as in Table 5. In this case, in order to satisfy the maximum number of candidates, the candidates of the current layer located subsequent to the REF may be excluded from the merge candidate list depending on the position of the REF. When the maximum number of candidates is satisfied by the candidates of the current layer located previous to the REF, the REF may be excluded from the merge candidate list.

The number of candidates included in the merge candidate list of the inter-layer motion prediction in Table 6, that is, the maximum number of candidates, may be different from that of Table 5. For example, the maximum number of candidates in Table 6 may be greater by one than that of Table 5 in consideration of the REF. In this case, the merge candidate list may be considered to be completed by adding the REF to a predetermined position or a predetermined order after the merge candidate list is constructed by the candidates of the current layer. In this case, the position or order of the REF in the merge candidate list may be determined in advance or may be instructed by the video encoder or may be derived by the video decoder.

Which candidate out of the candidates in the merge candidate list to use to perform the merge mode may be instructed by the video encoder. For example, the prediction module may select a candidate indicated by the information (for example, merge index merge_idx) received from the video encoder in the merge candidate list shown in Table 6 and may construct a predicted block of the current block on the basis of the block indicated by the selected motion information.

(2) When MVP (AMVP) Mode is Applied

Table 7 shows an example of a candidate list constructed when another layer is not referred to in the inter prediction and the MVP mode is applied to the current layer. In this description, the inter prediction mode using the MVP is referred to as an AMVP mode and a list including the candidate MVPs used at that time is referred to as an AMVP list

TABLE 7

AMVP list of inter prediction

A selected from $A_0$ and $A_1$
B selected from $B_0$, $B_1$, and $B_2$
COL when A or B is not avaliable
zero motion vector candidate when not greater than the maximum number of candidates In Table 7, $A_1$, $B_1$, $B_0$, $A_0$, $B_2$, COL, A, and B are equal to $A_1$, $B_1$, $B_0$, $A_0$, $B_2$, and COL in FIG. 9 and A and B in the MVP mode described with reference to FIG. 9. The method of constructing the MVP candidate list of the inter prediction in Table 7 is the same as in the MVP mode of the inter prediction described above with reference to FIG. 9.

In Table 7, an index with the smallest value may be allocated to the candidate located at the uppermost position and an index with the greatest value may be allocated to the candidate located at the lowermost position.

On the contrary, when the inter-layer motion prediction is applied, the prediction module may construct an MVP candidate list including the motion information derived from the reference layer unlike Table 7. Here, the motion vector derived from the reference layer is referred to as a reference layer candidate REF.

The REF includes mvIL.

Table 8 shows an example of the AMVP list constructed by the prediction module when the MVP mode of the inter-layer motion prediction according to the invention is applied. Table 8 shows the order of adding the reference layer candidates to the AMVP list according to the invention.

TABLE 8

AMVP list of inter-layer motion prediction

ⓐ
A selected from $A_0$ and $A_1$
ⓑ
B selected from $B_0$, $B_1$, and $B_2$
ⓒ
COL
ⓓ
zero motion vector candidate when not greater than the maximum number of candidates
ⓔ

In Table 8, $A_1$, $B_1$, $B_0$, $A_0$, $B_2$, COL, A, and B are equal to $A_1$, $B_1$, $B_0$, $A_0$, $B_2$, and COL in FIG. 9 and A and B in the MVP mode described with reference to FIG. 9. The method of constructing the AMVP list using A, B, and COL in Table 8 is the same as in the merge mode of the inter prediction described above with reference to FIG. 9.

In Table 8, an index with the smallest value may be allocated to the candidate located at the uppermost position and an index with the greatest value may be allocated to the candidate located at the lowermost position.

The prediction module may exclude one of A and B from the AMVP list when A and B are equal to each other as the equality determination result of A and B as described with reference to FIG. 9. This process may be performed at the time of determining the availability of B, may be performed after determining A and B, or may be performed when determining the availability of COL or after determining the availability of COL.

When the MVP mode of the inter-layer motion prediction is applied, the prediction module may add the REF to any of ⓐ to ⓔ in the AMVP list shown in Table 8.

For example, the prediction module may allocate the smallest index (for example, 0) to the REF and may add the REF to ⓐ in the AMVP list. That is, the prediction module may add the REF to the head of the AMVP list.

The prediction module may allocate the largest index (for example, the maximum number of candidates in the AMVP list −1) to the REF and may add the REF to ⓔ. That is, the prediction module may add the REF to the tail of the AMVP list.

The prediction module may add the REF to ⓓ which is the position after considering all the candidates of the current layer.

The prediction module may add the REF to ⓒ subsequent to the spatial candidates. The prediction module may add the REF to ⓑ which is the position after considering the left candidate of the current block and before considering the upper candidate.

The number of candidates included in the AMVP list of the inter-layer motion prediction in Table 8, that is, the maximum number of candidates, may be the same as in Table 7. In this case, in order to satisfy the maximum number of candidates, the candidates of the current layer located subsequent to the REF may be excluded from the AMVP list depending on the position of the REF. When the maximum number of candidates is satisfied by the candidates of the current layer located previous to the REF, the REF may be excluded from the AMVP list.

For example, when the maximum number of candidates is 2, the REF at the position of ⓒ may be excluded from the AMVP list.

The number of candidates included in the AMVP list of the inter-layer motion prediction in Table 8, that is, the maximum number of candidates, may be different from that of Table 7. For example, the maximum number of candidates in Table 8 may be greater by one than that of Table 7 (for example, 2) in consideration of the REF. In this case, the AMVP list may be considered to be completed by adding the REF to a predetermined position after the AMVP list is constructed by the candidates of the current layer. In this case, the position or order of the REF in the AMVP list may be determined in advance or may be instructed by the video encoder or may be derived by the video decoder.

Which candidate out of the candidates in the AMVP list to use to perform the MVP mode may be instructed by the video encoder. For example, the prediction module may select a candidate indicated by the information received from the video encoder in the AMVP list shown in Table 8 and may derive the motion vector of the current block using the selected motion vector and the mvd received from the video encoder. The prediction module may construct a predicted block of the current block on the basis of the derived motion vector and the reference picture indicated by the reference index received from the video encoder.

On the other hand, when a predetermined condition is satisfied, the prediction module may scale mvIL before adding the REF to the AMVP list.

For example, when the reference index of a current PU is different from the reference index (refIdxIL) of a reference PU, the mvIL can be scaled. In other words, when the POC of a picture (a reference picture of the current PU) indicated by the reference index of the current PU is different from the POC of a picture (a reference picture of the reference PU) indicated by the reference index of the reference PU, the mvIL can be scaled.

Figure 12:
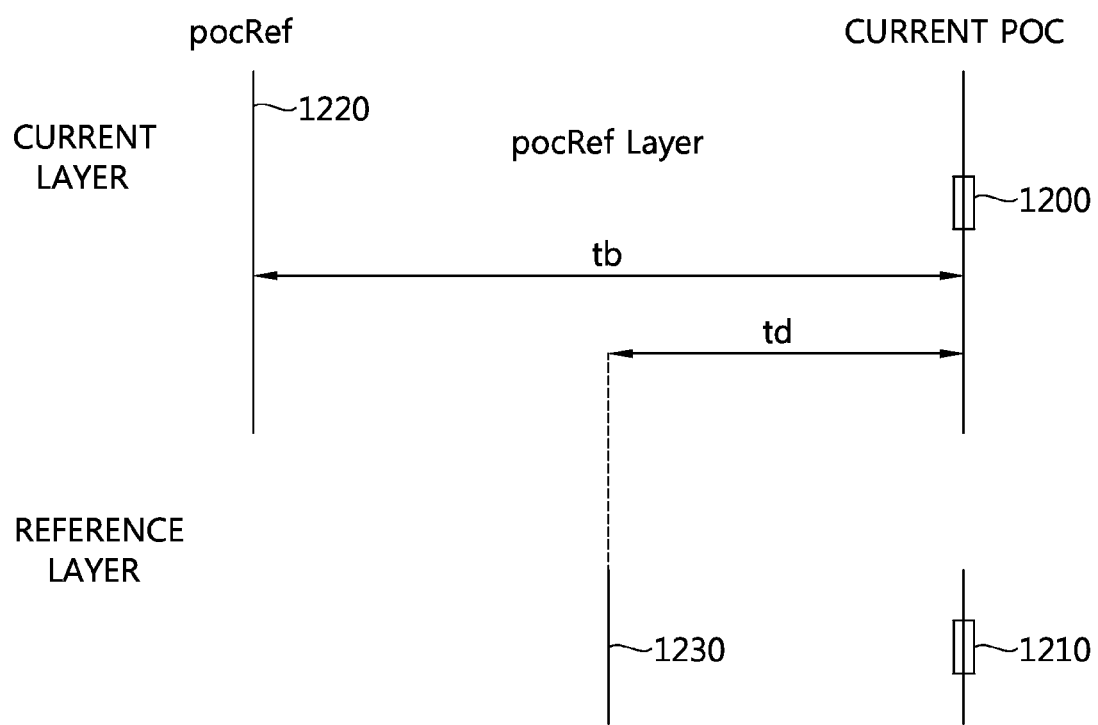
FIG. 12 is a diagram schematically illustrating a method of scaling mvIL according to the invention.

FIG. 12 is a diagram schematically illustrating the method of scaling mvIL according to the invention.

Referring to FIG. 12, the difference between the POC of a current picture in a current layer and the POC of a reference picture 1220 of a current PU 1200 is tb and the difference between the POC of the current picture in a reference layer and the POC of a reference picture 1230 of a reference PU 1210 is td.

When the POC pocRef of the reference picture 1220 of the current PU 1200 is different from the POC pocRefLayer of the reference picture 1230 of the reference PU 1210, the prediction module may scale the REF, that is, mvIL, and may add the scaled REF to the AMVP list.

Here, the mvIL may be scaled using a method expressed by Expression 3. The scaled mvIL is referred to as mvIL'.

$tx=(16384+(Abs(td)>>1))/td$ $DistScaleFactor=Clip3(-4096,4095,(tb*tx+32)>>6)$ $mvIL'=Clip3(-8192,8191.75,Sign(DistScaleFactor*mvIL)*((Abs(DistScaleFactor*mvIL)+127)>>8))$ $td=Clip3(-128,127,pocCurr-pocRefLayer)$ $tb=Clip3(-128,127,pocCurr-pocRef)$ <Expression 3>

In Expression 3, pocCurr represents the POC of the current picture, pocRef represents the POC of a picture indicated by the reference index of the current PU, and pocRefLayer represents the POC of a picture indicated by the reference index of the reference PU, that is, the reference index of (xRef, yRef).

Abs(x) is equal to −x when x is less than 0, and is equal to x when x is equal to or greater than 0. Clip3(x, y, z) is equal to x when z is less than x, is equal to y when z is greater than y, and is equal to z otherwise.

When pocRef and pocRefLayer are different from each other, the prediction module may scale the inter-layer motion vector on the basis of the distance to the reference picture in each layer as expressed by Expression 3 and may add the scaled motion vector candidate (that is, scaled mvIL or scaled REF) to the AMVP list.

At this time, the prediction module may add the scaled REF (that is, scaled mvIL) instead of the REF (that is, mvIL) to the AMVP list and may perform the inter-layer motion prediction using the AMVP mode in the same way as described above.

When the inter-layer motion prediction is performed, all CU partitions may be used regardless of the block size of the base layer from the viewpoint of the CU level. From the viewpoint of the PU level, the video encoder perform the RDO on the inter prediction and the inter-layer motion prediction, whereby it is possible to apply an optimal prediction mode.

Inter-Layer Syntax Prediction

In the inter-layer syntax prediction, a texture of a current block is predicted or generated using syntax information of a reference layer. At this time, the syntax information of the reference layer used to predict the current block may be information on the intra prediction mode or motion information.

For example, a reference layer may be a P slice or a B slice, but the reference block in the slice may be a block to which the intra prediction mode has been applied. In this case, the inter-layer prediction of generating/predicting the texture of the current layer using the intra mode out of the syntax information of the reference layer may be performed. Specifically, when the reference layer is a P slice or a B slice but the reference block in the slice is a block to which the intra prediction mode has been applied, the intra prediction may be performed (1) in the intra prediction mode of the reference block (2) using the neighboring reference pixels of the current block in the current layer by applying the inter-layer syntax prediction.

When the reference layer is a P slice or a B slice but the reference block in the slice is a block to which the inter prediction mode has been applied, the inter-layer prediction of generating/predicting the texture of the current layer by scaling the motion information out of the syntax information of the reference layer may be performed in the same way as in the inter-layer motion prediction described above.

Accordingly, the inter-layer syntax prediction may be a method of using the inter-layer motion prediction and the inter-layer texture prediction together.

As described above, the inter-layer motion prediction is a prediction method of generating a prediction signal (predicted block) in the enhancement layer using the motion information of the reference layer.

Here, the motion information of the reference layer may be scaled depending on the variation of resolution between layers.

When the intra prediction mode is applied to the reference layer and a block without motion information is a reference block, it is possible to generate the prediction signal by taking the intra prediction mode of the reference layer as described above and predicting the current block from the neighboring pixels of the enhancement layer.

In the inter-layer syntax prediction or the inter-layer motion information, the motion information of luma components may be taken in the units of 4×4 blocks from the reference layer. In this case, the motion information of luma components may be used as the motion information of chroma components.

When the inter-layer syntax prediction is performed, the inter-layer intra prediction and the inter-layer motion prediction may be adaptively applied depending on the prediction mode applied to the reference block in the reference layer by signaling what prediction mode to apply at an upper level without generating a new PU mode from the viewpoint of the PU level.

A flag indicating whether to apply the inter-layer syntax prediction may be transmitted in the form of a flag subsequently to a flag (for example, CU_split_flag) indicating the split of a CU.

Figure 13:
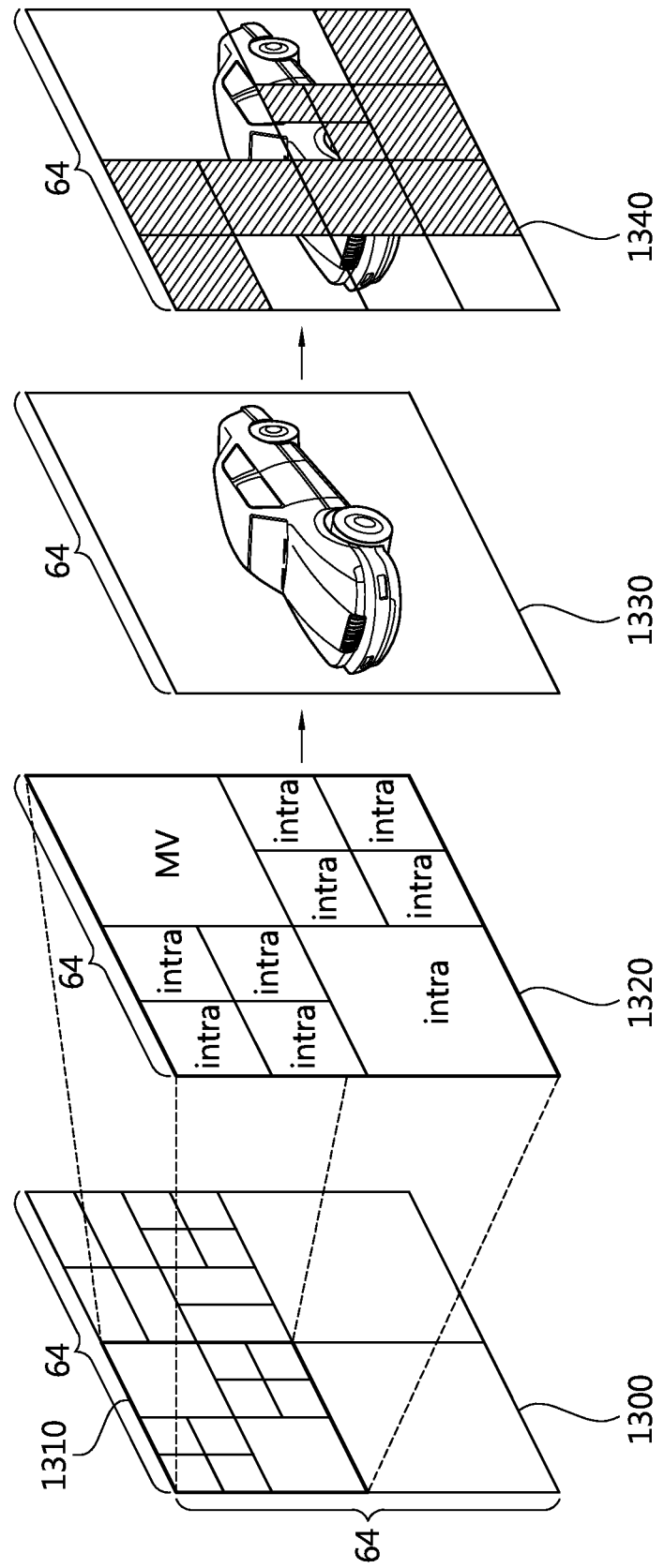
FIG. 13 is a diagram briefly illustrating an example of a method of performing inter-layer syntax prediction according to the invention.

FIG. 13 is a diagram briefly illustrating an example of the method of performing the inter-layer syntax prediction according to the invention.

Referring to FIG. 13, intra blocks and inter blocks are present in a reference block 1310 of a reference layer 1300.

When the inter-layer syntax prediction is applied to the example illustrated in FIG. 13, a reconstructed block may be constructed by constructing a picture 1320 upsampled to match to current layer and applying the inter-layer syntax prediction thereto (1330).

At this time, the inter-layer syntax prediction may be performed by referring to the intra prediction mode from the blocks (intra) to which the intra prediction mode is applied in the reference layer and referring to the motion information from the blocks (MV) to which the inter prediction mode is applied.

The inter-layer syntax prediction for a target picture of the current layer may be mixed with other prediction modes. The hatched regions in a current picture 1340 in FIG. 13 represent regions to which the other prediction modes may be applied.

Inter-Layer Residual Prediction

The inter-layer residual prediction is a method of generating a residual predicted video of an enhancement layer using a residual signal of a reference layer and encoding/decoding the residual video with reference to a residual predicted video in the enhancement layer.

The inter-layer residual prediction may be performed by the prediction module or the inter-layer prediction module in FIGS. 1 to 4. For the purpose of convenience of explanation, it is assumed that the inter-layer residual prediction is performed by the prediction module.

The prediction module may generate a residual predicted video of the enhancement layer by scaling the residual signal of the reference layer depending on a resolution difference or ratio between layers.

The video encoder may perform the RDO on the inter-layer residual prediction independently of the inter-layer syntax prediction and the inter-layer intra prediction. When it is determined through the RDO that the inter-layer residual prediction is performed, a flag for predicting a residual signal, that is, a flag indicating that the inter-layer residual prediction is performed, may be encoded and transmitted previous to the residual (transform coefficients) in the units of CU.

Figure 14:
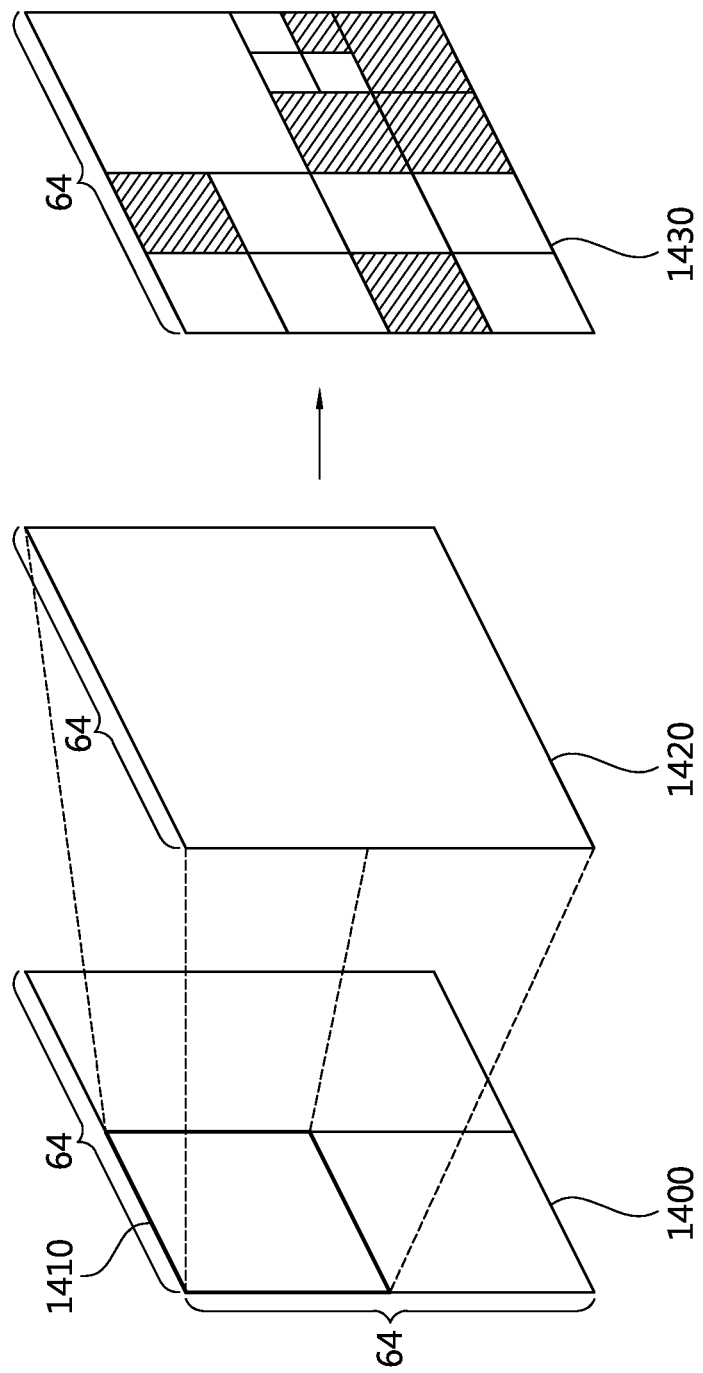
FIG. 14 is a diagram schematically illustrating an example of a method of applying inter-layer residual prediction according to the invention.

FIG. 14 is a diagram schematically illustrating a method of performing the inter-layer residual prediction according to the invention.

Referring to FIG. 14, a residual predicted video 1420 may be generated by scaling a reference block part 1410 to be referred in a residual signal 1400 of a reference layer for the inter-layer prediction depending on the resolution ratio between layers.

A residual video 1430 for the current block may be reconstructed on the basis of the residual predicted video 1420. At this time, the hatched regions represent regions to which the inter-layer residual prediction is not applied.

The video encoder may determine whether to apply the inter-layer residual prediction to the residual signals in all the prediction modes on the basis of the RDO. Information indicating whether to apply the inter-layer residual prediction may be transmitted in the form of a flag before transmitting the information on the coefficients (for example, the quantized transform coefficients of the residual).

Syntax Structure for Inter-Layer Prediction

The video encoder may signal information required for the above-mentioned inter-layer prediction. The video decoder may receive the signaled information and may perform the inter-layer prediction.

The method of performing the inter-layer prediction described above or to be described later and examples of syntax indicating necessary information will be described below.

Table 9 shows an example of NAL unit syntax according to the invention.

TABLE 9

| | Descriptor |
|---|---|
| nal_unit( NumBytesInNALunit ) { | |
|   forbidden_zero_bit | f(1) |
|   nal_ref_flag | u(1) |
|   nal_unit_type | u(6) |
|   NumBytesInRBSP = 0 | |
|   nalUnitHeaderBytes = 1 | |
|   if( nal_unit_type = = 1 ‖ nal_unit_type = = 4 ‖ nal_unit_type = = 5 | |
|         ‖ nal_unit_type == SVC_NAL ) | |
|     temporal_id | u(3) |
|     output_flag | u(1) |
|     reserved_one_4bits | u(4) |
|       if( nal_unit_type == SVC_NAL ) | |
|         nal_unit_header_svc_extension( ) | |
|     nalUnitHeaderBytes += 2 | |
|   } | |
|   for( i = nalUnitHeaderBytes, i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

Table 10 shows an example of NAL unit header SVC extension syntax according to the invention.

TABLE 10

| | Descriptor |
|---|---|
| nal_unit_header_svc_extension( ) { | |
|   idr_flag | u(1) |
|   dependency_id | u(3) |
|   quality_id | u(4) |
| } | |

Table 11 shows an example of sequence parameter set RBSP syntax according to the invention.

TABLE 11

| | Descriptor |
|---|---|
| seq_parameter_set_rbsp( ) { | |
|   profile_idc | u(8) |
|   reserved_zero_8bits /* equal to 0 */ | u(8) |
|   level_idc | u(8) |
|   seq_parameter_set_id | ue(v) |
|   chroma_format_idc | ue(v) |
| [Ed. (BB): Not in HM, further discuss separate_colour_plane_flag] | |
|   max_temporal_layers_minus1 | u(3) |
|   pic_width_in_luma_samples | ue(v) |
|   pic_height_in_luma_samples | ue(v) |

TABLE 11-continued

| | Descriptor |
|---|---|
| bit_depth_luma_minus8 | ue(v) |
| bit_depth_chroma_minus8 | ue(v) |
| [Ed. (BB): chroma bit depth present in HM software but not used further ] | |
| pcm_enabled_flag | u(1) |
| if ( pcm_enabled_flag ) { | |
|   pcm_bit_depth_luma_minus1 | u(4) |
|   pcm_bit_depth_chroma_minus1 | u(4) |
| } | |
| log2_max_pic_order_cnt_lsb_minus4 | ue(v) |
| max_num_ref_frames | ue(v) |
| num_reorder_frames | ue(v) |
| max_dec_frame_buffering | ue(v) |
| max_latency_increase | ue(v) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if ( pcm_enabled_flag ) { | |
|   log2_min_pcm_coding_block_size_minus3 | ue(v) |
|   log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | |
| chroma_pred_from_luma_enabled_flag | u(1) |
| deblocking_filter_in_APS_enabled_flag | u(1) |
| loop_filter_across_slice_flag | u(1) |
| sample_adaptive_offset_enabled_flag | u(1) |
| adaptive_loop_filter_enabled_flag | u(1) |
| if ( pcm_enabled_flag ) | |
|   pcm_loop_filter_disable_flag | u(1) |
| temporal_id_nesting_flag | u(1) |
| [Ed. (BB): x y padding syntax missing here, present in HM software ] | |
| if ( log2_min_coding_block_size_minus3 = = 0 ) | |
|   inter_4x4_enabled_flag | u(1) |
| num_tile_columns_minus1 | ue(v) |
| num_tile_rows_minus1 | ue(v) |
| if (num_tile_columns_minus1 !=0 \|\| num_tile_rows_minus1 != 0 ) { | |
|   uniform_spacing_flag | u(1) |
|   if ( !uniform_spacing_flag ) { | |
|     for ( i = 0; i < num_tile_columns_minus1; i++) | |
|       column_width[i] | ue(v) |
|     for ( i = 0; i < num_tile_rows_minus1; i++ ) | |
|       row_height[i] | ue(v) |
|   } | |
|   tile_boundary_independence_flag | u(1) |
|   if ( tile_boundary_independence_flag = = 1 ) | |
|     loop_filter_across_tile_flag | u(1) |
| } | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

Table 12 shows an example of sub-set sequence parameter RBSP syntax according to the invention.

TABLE 12

| | Descriptor |
|---|---|
| subset seq_parameter_set_rbsp( ) { | |
|   seq_parameter_set_rbsp( ) | |
|   if( profile_idc = = SVC_PROFILE ) { | |
|     seq_parameter_set_svc_extension( ) | |
|   } | |
| } | |

Table 13 shows an example of sequence parameter set SVC extension syntax according to the invention.

TABLE 13

| | Descriptor |
|---|---|
| seq_parameter_set_svc_extension( ) { | |
|   singleloop_decoding_flag | u(1) |
| } | |

Table 14 shows an example of picture parameter set RBSP syntax according to the invention.

TABLE 14

| | Descriptor |
|---|---|
| pic_parameter_set_rbsp( ) { | |
|   pic_parameter_set_id | ue(v) |
|   seq_parameter_set_id | ue(v) |
|   num_short_term_ref_pic_sets | ue(v) |
|   for(idx = 0; idx < num_short_term_ref_pic_sets; idx++) | |
|     short_term_ref_pic_set( idx ) | |
|   long_term_ref_pics_present_flag | u(1) |
|   entropy_coding_synchro | u(v) |
|   cabac_istate_reset_flag | u(1) |
|   if( entropy_coding_synchro ) | |
|     num_substreams_minus1 | ue(v) |
|   num_temporal_layer_switching_point_flags | ue(v) |
|   for(i = 0; i < num_temporal_layer_switching_point_flags; i++) | |
|     temporal_layer_switching_point_flag[ i ] | u(1) |
|   num_ref_idx_l0_default_active_minus1 | ue(v) |
|   num_ref_idx_l1_default_active_minus1 | ue(v) |
| [Ed. (BB): not present in HM software ] | |
|   pic_init_qp_minus26 | se(v) |
|   constrained_intra_pred_flag | u(1) |
|   enable_temporal_mvp_flag | u(1) |
|   slice_granularity | u(2) |
|   max_cu_qp_delta_depth | ue(v) |
|   chroma_cb_qp_offset | se(v) |
|   chroma_cr_qp_offset | se(v) |
|   weighted_pred_flag | u(1) |
|   weighted_bipred_idc | u(2) |
|   tile_info_present_flag | u(1) |
|   tile_control_present_flag | u(1) |
|   if( tile_info_present_flag = = 1 ) { | |
|     num_tile_columns_minus1 | ue(v) |
|     num_tile_rows_minus1 | ue(v) |
|     if(num_tile_columns_minus1 != 0 \|\| num_tile_rows_minus1 ! = 0) { | |
|       uniform_spacing_flag | u(1) |
|       if( !uniform_spacing_flag) { | |
|         for( i = 0; i < num_tile_columns_minus1; i++ ) | |
|           column_width[i] | ue(v) |
|         for( i = 0; i < num_tile_rows_minus1; i++ ) | |
|           row_height[i] | ue(v) |
|       } | |
|     } | |
|   } | |
|   if ( tile_control_present_flag ) { | |
|     if (num_tile_columns_minus1 != 0 \|\| num_tile_rows_minus1 != 0) | |
|   { | |
|       tile_boundary_independence_flag | u(1) |
|       if ( tile_boundary_independence_flag = = 1 ) | |
|         loop_filter_across_tile_flag | u(1) |
|     } | |
|   } | |
|   pps_extension_flag | u(1) |
|   if( pps_extension_flag ) | |
|     while(more_rbsp_data( ) ) | |
|       pps_extension_data_flag | u(1) |
|   rbsp_trailing_bits( ) | |
| } | |

Table 15 shows an example of scaling list data syntax according to the invention.

TABLE 15

| scaling_list_param( ) ( | Descriptor |
|---|---|
| scaling_list_present_flag | u(1) |
| if( scaling_list_present_flag ) | |
|   for( SizeID = 0; SizeID < 4; SizeID++ ) | |
|     for( MatrixID = 0; MatrixID < (SizeID = = 3) ? 2 : 6; MatrixID++ ) { | |
|       scaling_list_pred_mode_flag | u(1) |
|       if( !scaling_list_pred_mode_flag ) | |
|         scaling_list_pred_matrix_id_delta | ue(v) |
|       else | |
|         scaling_list( ScalingList[ SizeID ][ MatrixID ][ 0 ], ( 1 << ( 4 + ( sizeID << 1) ) ) ) | |
|     } | |
| } | |

Table 16 shows an example of scaling list syntax according to the invention.

TABLE 16

| scaling_list( ScalingList, coefNum ) { | Descriptor |
|---|---|
| nextcoef = 8 | u(1) |
| for( i=0; 1 < coefNum, i++) { | |
|   scaling_list_delta_coef | se(v) |
|   nextcoef = ( nextcoef + scaling_list_delta_coef + 256) % 256 | |
|   ScalingList[ i ] = nextcoef | |
| } | |
| } | |

Table 17 shows an example of adaptive parameter set RBSP syntax according to the invention.

TABLE 17

| aps_rbsp( ) { | Descriptor |
|---|---|
| aps_id | ue(v) |
| aps_scaling_list_data_present_flag | u(1) |
| if( aps_scaling_list_data_present_flag ) | |
|   scaling_list_param( ) | |
| aps_deblocking_filter_flag | u(1) |
| if (aps_deblocking_filter_flag) { | |
|   disable_deblocking_filter_flag | u(1) |
|   if ( !disable_deblocking_filter_flag ) { | |
|     beta_offset_div2 | se(v) |
|     tc_offset_div2 | se(v) |
|   } | |
| } | |
| aps_sample_adaptive_offset_flag | u(1) |
| if( aps_sample_adaptive_offset_flag ) | |
|   sao_param( ) | |
| aps_adaptive_loop_filter_flag | u(1) |
| if( aps_adaptive_loop_filter_flag ) | |
|   alf_param( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

Table 18 shows an example of supplemental enhancement information RBSP syntax according to the invention.

TABLE 18

| sei_rbsp( ) { | Descriptor |
|---|---|
| do | |
|   sei_message( ) | |
| while( more_rbsp_data( ) ) | |
| rbsp_trailing_bits( ) | |
| } | |

Table 19 shows supplemental enhancement information message syntax according to the invention.

TABLE 19

| sei_message( ) { | Descriptor |
|---|---|
| payloadType = 0 | |
| while( next_bits( 8 ) == 0xFF ) { | |
|   If_byte /* equal to 0xFF */ | f(8) |
|   payloadType += 255 | |
| } | |
| last_payload_type_byte | u(8) |
| payloadType += last_payload_type_byte | |
| payloadSize = 0 | |
| while( next_bits( 8 ) == 0xFF ) { | |
|   If_byte /* equal to 0xFF */ | f(8) |
|   payloadSize += 255 | |
| } | |
| last_payload_size_byte | u(8) |
| payloadSize += last_payload_size_byte | |
| sei_payload( payloadType, payloadSize ) | |
| } | |

Table 20 shows an example of access unit delimiter RBSP syntax according to the invention.

TABLE 20

| access_unit_delimiter_rbsp( ) { | Descriptor |
|---|---|
| primary_pic_type | u(3) |
| rbsp_trailing_bits( ) | |
| } | |

Table 21 shows an example of filler data RBSP syntax according to the invention.

TABLE 21

| filler_data_rbsp( ) { | Descriptor |
|---|---|
| while( next_bits( 8 ) == 0xFF ) | |
|   If_byte /* equal to 0xFF */ | f(8) |
| rbsp_trailing_bits( ) | |
| } | |

Table 22 shows an example of slice layer RBSP syntax according to the invention.

TABLE 22

| slice_layer_rbsp( ) { | Descriptor |
|---|---|
| slice_header( ) | |
| slice_data( ) | |
| rbsp_slice_trailing_bits( ) | |
| } | |

Table 23 shows an example of slice layer extension RBSP syntax according to the invention.

TABLE 23

| slice_layer_extension_rbsp( ) { | Descriptor |
|---|---|
| slice_header_in_scalable_extension( ) | |
| slice_data_in_scalable_extension( ) | |
| } | |

Table 24 shows an example of RBSP slice trailing bits syntax according to the invention.

TABLE 24

| rbsp_slice_trailing_bits( ) { | Descriptor |
|---|---|
| rbsp_trailing_bits( ) | |
| while( more_rbsp_trailing_data( ) ) | |
| cabac_zero_word /* equal to 0x0000 */ | f(16) |
| } | |

Table 25 shows an example of RBSP trailing bits syntax according to the invention.

TABLE 25

| rbsp_trailing_bits( ) { | Descriptor |
|---|---|
| rbsp_stop_one_bit /* equal to 1 */ | f(1) |
| while( !byte_aligned( ) ) | |
| rbsp_alignment_zero_bit /* equal to 0 */ | f(1) |
| } | |

Table 26 shows an example of RBSP byte alignment syntax according to the invention.

TABLE 26

| byte_align( ) { | Descriptor |
|---|---|
| while( !byte_aligned( ) ) | |
| bit_equal_to_one | f(1) |
| } | |

Table 27 shows an example of a slice header according to the invention.

TABLE 27

| slice_header( ) { | Descriptor |
|---|---|
| first_slice_in_pic_flag | u(1) |
| if( first_slice_in_pic_flag == 0 ) | |
| slice_address | u(v) |
| slice_type | ue(v) |
| entropy_slice_flag | u(1) |
| if( !entropy_slice_flag ) { | |
| pic_parameter_set_id | ue(v) |
| if( IdrPicFlag ) { | |
| idr_pic_id | ue(v) |
| no_output_of_prior_pics_flag | u(1) |
| } | |
| else { | |

TABLE 27-continued

| slice_header( ) { | Descriptor |
|---|---|
| pic_order_cnt_lsb | u(v) |
| short_term_ref_pic_set_pps_flag | u(1) |
| if( !short_term_ref_pic_set_pps_flag ) | |
| short_term_ref_pic_set | |
| ( num_short_term_ref_pic_sets ) | |
| else | |
| short_term_ref_pic_set_idx | u(v) |
| if( long_term_ref_pics_present_flag ) { | |
| num_long_term_pics | ue(v) |
| for( i = 0; i < num_long_term_pics; i++ ) { | |
| delta_poc_lsb_lt_minus1[ i ] | ue(v) |
| used_by_curr_pic_lt_flag[ i ] | u(1) |
| } | |
| } | |
| } | |
| if( scaling_list_enable_flag \|\| | |
| deblocking_filter_in_APS_enabled_flag \|\| | |
| sample_adaptive_offset_enabled_flag \|\| | |
| adaptive_loop_filter_enabled_flag ) { | |
| if( sample_adaptive_offset_enabled_flag ) | |
| slice_sample_adaptive_offset_flag | u(1) |
| if( adaptive_loop_filter_enabled_flag) | |
| slice_adaptive_loop_filter_flag | u(1) |
| aps_id | ue(v) |
| } | |
| if( slice_type == P \|\| slice_type == B ) { | |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| } | |
| ref_pic_list_modification( ) | |
| ref_pic_list_combination( ) | |
| } | |
| if( slice_type != I ) | |
| cabac_init_idc | ue(v) |
| if( !entropy_slice_flag ) { | |
| slice_qp_delta | se(v) |
| inherit_dbl_params_from_APS_flag | u(1) |
| if ( !inherit_dbl_params_from_APS_flag ) { | |
| disable_deblocking_filter_flag | u(1) |
| if ( !disable_deblocking_filter_flag ) { | |
| beta_offset_div2 | se(v) |
| tc_offset_div2 | se(v) |
| } | |
| } | |
| if( slice_type == B ) | |
| collocated_from_l0_flag | u(1) |
| if( ( weighted_pred_flag && slice_type == P ) \|\| ( weighted_bipred_idc == 1 && slice_type == B ) ) | |
| pred_weight_table( ) | |
| } | |
| if( slice_type == P \|\| slice_type == B ) | |
| 5_minus_max_num_merge_cand | ue(v) |
| if( adaptive_loop_filter_enabled_flag && aps_adaptive_loop_filter_flag ) | |
| alf_cu_control_param( ) | |
| for( i = 0; i < num_substreams_minus1 + 1; i++ ){ | |
| substream_length_mode | u(2) |
| substream_length[i] | u(v) |
| } | |
| } | |

Table 28 shows an example of slice header in scalable extension syntax according to the invention.

TABLE 28

| slice_header_in_scalable_extension( ) { | Descriptor |
|---|---|
| first_slice_in_pic_flag | u(1) |
| if( first_slice_in_pic_flag == 0 ) | |
| slice_address | u(v) |
| slice_type | ue(v) |

TABLE 28-continued

| slice_header_in_scalable_extension( ) { | Descriptor |
|---|---|
|   entropy_slice_flag | u(1) |
|   if( !entropy_slice_flag ) { | |
|     pic_parameter_set_id | ue(v) |
|     if( IdrPicFlag ) { | |
|       idr_pic_id | ue(v) |
|       no_output_of_prior_pics_flag | u(1) |
|     } | |
|     else { | |
|       pic_order_cnt_lsb | u(v) |
|       short_term_ref_pic_set_pps_flag | u(1) |
|       if( !short_term_ref_pics_set_pps_flag ) | |
|         short_term_ref_pic_set( num_short_term_ref_pic_sets ) | |
|       else | |
|         short_term_ref_pic_set_idx | u(v) |
|       if( long_term_ref_pics_present_flag ) { | |
|         num_long_term_pics | ue(v) |
|         for( i = 0; i < num_long_term_pics; i++ ) { | |
|           delta_poc_lsb_lt_minus1[ i ] | ue(v) |
|           used_by_curr_pic_lt_flag[ i ] | u(1) |
|         } | |
|       } | |
|     } | |
|     if ( scaling_list_enable_flag \|\| | |
|       deblocking_filter_in_APS_enabled_flag \|\| | |
|       sample_adaptive_offset_enabled_flag \|\| | |
|       adaptive_loop_filter_enabled_flag ) { | |
|       if( sample_adaptive_offset_enabled_flag ) | |
|         slice_sample_adaptive_offset_flag | u(1) |
|       if( adaptive_loop_filter_enabled_flag) | |
|         slice_adaptive_loop_filter_flag | u(1) |
|       aps_id | ue(v) |
|     } | |
|     if( slice_type = = EP \|\| slice_type = = EB ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = EB ) | |
|           num_ref_idx_l1_active_minus1 | ue(v) |
|       } | |
|     } | |
|     ref_pic_list_modification( ) | |
|     ref_pic_list_combination( ) | |
|   } | |
|   if (singleloop_decoding_flag ) { | |
|     if (slice_type == EI )  //Syntax related inter-layer prediction | |
|       inter_layer_intra_prediction_flag | u(1) |
|       inter_layer_differential_coding_flag | u(1) |
|     else { | |
|       inter_layer_syntax_prediction_flag | u(1) |
|       inter_layer_residual_prediction flag | u(1) |
|     } | |
|   } | |
|   else { | |
|     inter_layer_intra_prediction_flag | u(1) |
|     if ( slice_type != EI ) { | |
|       inter_layer_residual_prediction_flag | u(1) |
|     } | |
|     inter_layer_differential_coding_flag | u(1) |
|   } | |
|   if( slice_type != EI ) | |
|     cabac_init_idc | ue(v) |
|   if( !entropy_slice_flag ) { | |
|     slice_qp_delta | se(v) |
|     inherit_dbl_params_from_APS_flag | u(1) |
|     if ( !inherit_dbl_params_from_APS_flag ) { | |
|       disable_deblocking_filter_flag | u(1) |
|       if ( !disable_deblocking_filter_flag ) { | |
|         beta_offset_div2 | se(v) |
|         tc_offset_div2 | se(v) |
|       } | |
|     } | |
|     if( slice_type = = EB ) | |
|       collocated_from_l0_flag | u(1) |
|     if( ( weighted_pred_flag && slice_type = = EP) \|\| | |
|       ( weighted_bipred_idc = = 1 && slice_type = = EB ) ) | |
|       pred_weight_table( ) | |
|   } | |
|   if( slice_type = = EP \|\| slice_type = = EB ) | |

TABLE 28-continued

| slice_header_in_scalable_extension( ) { | Descriptor |
|---|---|
|     5_minus_max_num_merge_cand | ue(v) |
|     if( adaptive_loop_filter_enabled_flag && aps_adaptive_loop_filter_flag ) | |
|         alf_cu_control_param( ) | |
|     for( i = 0; i < num_substreams_minus1 + 1; i++ ){ | |
|         substream_length_mode | u(2) |
|         substream_length[i] | u(v) |
|     } | |
| } | |

Table 29 shows an example of short-term reference picture set syntax according to the invention.

TABLE 29

| short_term_ref_pic_set( idx ) { | Descriptor |
|---|---|
|     inter_ref_pic_set_prediction_flag | u(1) |
|     if( inter_ref_pic_set_prediction_flag ) { | |
|         delta_idx_minus1 | ue(v) |
|         delta_rps_sign | u(1) |
|         abs_delta_rps_minus1 | ue(v) |
|         for( j = 0; j <= NumDeltaPocs[ RIdx ]; j++ ) { | |
|             ref_idc0[ j ] | u(1) |
|             if( !ref_idc0[ j ] ) | |
|                 ref_idc1[ j ] | u(1) |
|         } | |
|     } | |
|     else { | |
|         num_negative_pics | ue(v) |
|         num_positive_pics | ue(v) |
|         for ( i = 0; i < num_negative_pics; i++ ) { | |
|             delta_poc_s0_minus1[ i ] | ue(v) |
|             used_by_curr_pic_s0_flag[ i ] | u(1) |
|         } | |
|         for ( i = 0; i < num_positive_pics; i++ ) { | |
|             delta_poc_s1_minus1[ i ] | ue(v) |
|             used_by_curr_pic_s1_flag[ i ] | u(1) |
|         } | |
|     } | |
| } | |

Table 30 shows an example of reference picture list modification syntax according to the invention.

TABLE 30

| | Descriptor |
|---|---|
| ref_pic_list_modification( ) { | |
|     if( slice_type == P || slice_type == B || slice_type == EP || slice_type ==EB ) { | |
|         ref_pic_list_modification_flag_l0 | u(1) |
|         if( ref_pic_list_modification_flag_l0 ) | |
|             do { | |
|                 ref_pic_list_modification_idc | ue(v) |
|                 if( ref_pic_list_modification_idc != 3) | |
|                     ref_pic_set_idx | ue(v) |
|             } while( ref_pic_list_modification_idc != 3 ) | |
|     } | |
|     if( slice_type == B || slice_type == EB ) { | |
|         ref_pic_list_modification_flag_l1 | u(1) |
|         if( ref_pic_list_modification_flag_l1 ) | |
|             do { | |
|                 ref_pic_list_modification_idc | ue(v) |
|                 if( ref_pic_list_modification_idc != 3 ) | |
|                     ref_pic_set_idx | ue(v) |
|             } while( ref_pic_list_modification_idc != 3 ) | |
|     } | |
| } | |

Table 31 shows an example of reference picture list combination syntax according to the invention.

TABLE 31

| | Descriptor |
|---|---|
| ref_pic_list_combination( ) { | |
|     if( slice_type == B || slice_type == EB ) { | |
|         ref_pic_list_combination_flag | u(1) |
|         if( ref_pic_list_combination_flag ) { | |
|             num_ref_idx_lc_active_minus1 | ue(v) |
|             ref_pic_list_modification_flag_lc | u(1) |
|             if( ref_pic_list_modification_flag_lc ) | |
|                 for ( i =0; i <= num_ref_idx_lc_active_minus1; i++ ) { | |
|                     pic_from_list_0_flag | u(1) |
|                     ref_idx_list_curr | ue(v) |
|                 } | |
|         } | |
|     } | |
| } | |

Table 32 shows an example of sample adaptive offset parameter syntax according to the invention.

TABLE 32

| | Descriptor |
|---|---|
| sao_param( ) { | |
|     sao_split_param( 0, 0, 0, 0 ) | |
|     sao_offset_param( 0, 0, 0, 0 ) | |
|     sao_flag_cb | u(1) |
|     if( sao_flag_cb ) { | |
|         sao_split_param( 0, 0, 0, 1 ) | |
|         sao_split_param( 0, 0, 0, 1 ) | |
|     } | |

TABLE 32-continued

| | Descriptor |
|---|---|
| sao_flag_cr | u(1) |
| if( sao_flag_cr ) { | |
|     sao_split_param( 0, 0, 0, 2 ) | |
|     sao_split_param( 0, 0, 0, 2 ) | |
| } | |
| } | |
| sao_split_param( rx, ry, saoDepth , cIdx ) { | |
|     if( saoDepth < SaoMaxDepth ) | |
|         sao_split_flag[ cIdx ][ saoDepth ][ rx ][ ry ] | u(1) |
|     else | |
|         sao_split_flag[ cIdx ][ saoDepth ][ rx ][ ry ] = 0 | |
|     if( sao_split_flag[ cIdx ][ saoDepth ][ rx ][ ry ] ) { | |
|         sao_split_param( 2*rx + 0, 2*ry + 0, saoDepth + 1 , cIdx ) | |
|         sao_split_param( 2*rx + 1, 2*ry + 0, saoDepth + 1 , cIdx ) | |
|         sao_split_param( 2*rx + 0, 2*ry + 1, saoDepth + 1 , cIdx ) | |
|         sao_split_param( 2*rx + 1, 2*ry + 1, saoDepth + 1 , cIdx ) | |
|     } | |
| } | |
| sao_offset_param( rx, ry, saoDepth , cIdx ) { | |
|     if( sao_split_flag[ cIdx ][ saoDepth ][ rx ][ ry ] ) { | |
|         sao_offset_param ( 2*rx + 0, 2*ry + 0, saoDepth + 1 , cIdx ) | |
|         sao_offset_param ( 2*rx + 1, 2*ry + 0, saoDepth + 1 , cIdx) | |
|         sao_offset_param ( 2*rx + 0, 2*ry + 1, saoDepth + 1 , cIdx ) | |
|         sao_offset_param ( 2*rx + 1, 2*ry + 1, saoDepth + 1 , cIdx) | |
|     } else { | |
|         sao_type_idx[ cIdx ][ saoDepth ] [ rx ][ ry ] | ue(v) |
|         if( sao_type_idx[ cIdx ][ saoDepth ][ rx ][ ry ] != 0 ) | |
|             for( i = 0, i < NumSaoClass[ sao_type_idx ]; i++ ) | |
|                 sao_offset[ cIdx ][ saoDepth ][ x0 ][ y0 ][ i ] | se(v) |
|     } | |
| } | |

Table 33 shows an example of adaptive loop filter parameter syntax according to the invention.

TABLE 33

| | Descriptor |
|---|---|
| alf_param( ) { | |
|     alf_region_adaptation_flag | u(1) |
|     alf_length_luma_minus_5_div2 | ue(v) |
|     alf_no_filters_minus1 | ue(v) |
|     if (alf_no_filters_minus1 == 1) | |
|         alf_start_second_filter | ue(v) |
|     else if (alf_no_filters_minus1 > 1) { | |
|         for (i=1; i< (alf_region_adaptation_flag ? 16 : 15); i++) | |
|             alf_filter_pattern[i] | u(1) |
|     } | |
|     if(AlfNumFilters > 1) | |
|         alf_pred_method | u(1) |
|     for (i=0; i< AlfNumFilters; i++ ) | |
|         alf_nb_pred_luma[i] | u(1) |
|     for (i=0; i< AlfNumFilters; i++) | |
|         for (j=0; j< AlfCodedLengthLuma, j++) | |
|             alf_coeff_luma[i][j] | ge(v) |
|     alf_chroma_idc | ue(v) |
|     if ( alf_chroma_idc ) { | |
|         alf_length_chroma_minus_5_div2 | ue(v) |
|         for ( i = 0; i< AlfCodedLengthChroma, i++ ) | |
|             alf_coeff_chroma[i] | se(v) |
|     } | |
| } | |

Table 34 shows an example of adaptive loop filter coding unit control parameter syntax according to the invention.

TABLE 34

| | Descriptor |
|---|---|
| alf_cu_control_param( ) { | |
|     alf_cu_control_flag | u(1) |
|     if( alf_cu_control_flag ) { | |
|         alf_cu_control_max_depth | ue(v) |
|         alf_length_cu_control_info | se(v) |
|         for( i = 0; i < NumAlfCuFlag; i++ ) | |
|             alf_cu_flag[ i ] | u(1) |
|     } | |
| } | |

Table 35 shows an example of prediction weight table syntax according to the invention.

TABLE 35

| | Descriptor |
|---|---|
| pred_weight_table( ) { | |
|   luma_log2_weight_denom | ue(v) |
|   if( chroma_format_idc != 0) | |
|     delta_chroma_log2_weight_denom | se(v) |
|   if ( slice_type == P \|\| | |
|     ( slice_type == B && | |
|     ref_pic_list_combination_flag == 0 ) ) { | |
|     for( i = 0; i <= num_ref_idx_l0_active_minus1; i++ ) { | |
|       luma_weight_l0_flag | u(1) |
|       if( luma_weight_l0_flag ) { | |
|         delta_luma_weight_l0[ i ] | se(v) |
|         luma_offset_l0[ i ] | se(v) |
|       } | |
|       if ( chroma_format_idc != 0 ) { | |
|         chroma_weight_l0_flag | u(1) |
|         if( chroma_weight_l0_flag ) | |
|           for( j =0; j < 2; j++ ) { | |

TABLE 35-continued

| | Descriptor |
|---|---|
|                 delta_chroma_weight_l0[ i ][ j ] | se(v) |
|                 delta_chroma_offset_l0[ i ][ j ] | se(v) |
|               } | |
|            } | |
|         } | |
|     } | |
| if( slice_type = = B ) { | |
|     if ( ref_pic_list_combination_flag = = 0 ) { | |
|         for( i = 0, i <= num_ref_idx_l1_active_minus1; i++ ) { | |
|             luma_weight_l1_flag | u(1) |
|             if( luma_weight_l1_flag ) { | |
|                 delta_luma_weight_l1[ i ] | se(v) |
|                 luma_offset_l1[ i ] | se(v) |
|             } | |
|             if ( chroma_format_idc != 0 ) { | |
|                 chroma_weight_l1_flag | u(1) |
|                 if( chroma_weight_l1_flag ) | |
|                     for( j = 0; j < 2; j++ ) { | |
|                         delta_chroma_weight_l1[ i ][ j ] | se(v) |
|                         delta_chroma_offset_l1[ i ][ j ] | se(v) |
|                     } | |
|             } | |
|         } | |
|     } else { | |
|         for( i = 0; i <= num_ref_idx_lc_active_minus1; i++ ) { | |
|             luma_weight_lc_flag | u(1) |
|             if( luma_weight_l1_flag ) { | |
|                 delta_luma_weight_lc[ i ] | se(v) |
|                 luma_offset_lc[ i ] | se(v) |
|             } | |
|             if(chroma_format_idc != 0 ) { | |
|                 chroma_weight_lc_flag | u(1) |
|                 if( chroma_weight_lc_flag) | |
|                     for( j = 0; j < 2, j++ ) { | |
|                         delta chroma weight lc[ i ][ j ] | se(v) |
|                         delta_chroma_offset_lc[ i ][ j ] | se(v) |
|                     } | |
|             } | |
|         } | |
|     } | |
| } | |

Table 36 shows an example of slice data syntax according to the invention.

TABLE 36

| | Descriptor |
|---|---|
| slice_data( ) { | |
|     CurrTbAddr = LCUAddress | |
|     moreDataFlag = 1 | |
|     if( adaptive_loop_filter_flag && | |
|         alf_cu_control_flag ) | |
|         AlfCuFlagIdx = −1 | |
|     do { | |
|         XLCU = HorLumaLocation( CurrTbAddr ) | |
|         YLCU = VerLumaLocation( CurrTbAddr ) | |
|         moreDataFlag = coding_tree( XLCU, YLCU, Log2TbSize, 0 ) | |
|         CurrTbAddr = NextTbAddress( CurrTbAddr ) | |
|         if( CurrTbAddr = = firstTbInTileAddr ) | |
|             rbsp_trailingbits( ) | |
|     } while( moreDataFlag ) | |
| } | |

Table 37 shows an example of slice data in scalable extension syntax according to the invention.

TABLE 37

| | Descriptor |
|---|---|
| slice_data_in_scalable_extension ( ) { | |
|     CurrTbAddr = LCUAddress | |
|     moreDataFlag = 1 | |
|     if( adaptive_loop_filter_flag && | |
|         alf_cu_control_flag ) | |
|         AlfCuFlagIdx = −1 | |
|     do { | |
|         XLCU = HorLumaLocation( CurrTbAddr ) | |
|         YLCU = VerLumaLocation( CurrTbAddr ) | |
|         moreDataFlag = coding_tree_in_scalale_extension ( XLCU, YLCU, Log2TbSize, 0 ) | |
|         CurrTbAddr = NextTbAddress( CurrTbAddr ) | |
|         if( CurrTbAddr = = firstTbInTileAddr ) | |
|             rbsp_trailingbits( ) | |
|     } while( moreDataFlag ) | |
| } | |

Table 38 shows an example of coding tree syntax according to the invention.

TABLE 38

| | Descriptor |
|---|---|
| coding_tree( x0, y0, log2CUSize, cuDepth) { | |
|     if( x0 + ( 1 << log2CUSize ) <= PicWidthInSamples$_L$ && | |
|         y0 + ( 1 << log2CUSize ) <= PicHeightInSamples$_L$ && | |
|         cuAddress( x0, y0 ) >= SliceAddress && | |
|         log2CUSize > Log2MinCUSize ) { | |
|         split_coding_unit_flag[ x0 ][ y0 ] | ae(v) |
|     } | |
|     if( adaptive_loop_filter_flag && alf_cu_control_flag ) { | |
|         if( cuDepth <= alf_cu_control_max_depth ) | |
|             if( cuDepth == alf_cu_control_max_depth \|\| | |
|                 split_coding_unit_flag[ x0 ][ y0 ] = 0 ) | |
|                 AlfCuFlagIdx++ | |
|     } | |
|     if( cu_qp_delta_enabled_flag && | |
|         log2CUSize >= log2MinCUDQPSize ) | |
|         IsCuQpDeltaCoded = 0 | |
|     if( split_coding_unit_flag[ x0 ][ y0 ] ) { | |
|         x1 = x0 + ( ( 1 << log2CUSize ) >> 1 ) | |
|         y1 = y0 + ( ( 1 << log2CUSize ) >> 1 ) | |
|         if( cuAddress( x1, y0 ) > SliceAddress ) | |
|             moreDataFlag = coding_tree( x0, y0, log2CUSize − 1, cuDepth + 1 ) | |
|         if( cuAddress( x0, y1 ) > SliceAddress && moreDataFlag && | |
|             x1 < PicWidthInSamples$_L$ ) | |
|             moreDataFlag = coding_tree( x1, y0, log2CUSize − 1, cuDepth + 1 ) |

TABLE 38-continued

| | Descriptor |
|---|---|
| ```
        if( cuAddress( x1, y1 ) > SliceAddress && moreDataFlag &&
            y1 < PicHeightInSamples_L )
            moreDataFlag = coding_tree( x0, y1, log2CUSize − 1, cuDepth + 1 )
        if( moreDataFlag &&
            x1 < PicWidthInSamples_L && y1 < PicHeightInSamples_L )
            moreDataFlag = coding_tree( x1, y1, log2CUSize − 1, cuDepth + 1 )
    } else {
        if(adaptive_loop_filter_flag && alf_cu_control_flag )
            AlfCuFlag[ x0 ][ y0 ] = alf_cu_flag[ AlfCuFlagIdx ]
        coding_unit( x0, y0, log2CUSize )
        if( granularity_block_boundary( x0, y0, log2CUSize ) ) {
            end_of_slice_flag
            moreDataFlag = !end_of_slice_flag
        } else
            moreDataFlag = 1
    }
    return moreDataFlag
}
``` | ae(v) |

Table 39 shows an example of coding tree in scalable extension syntax according to the invention Table 40 shows an example of coding unit syntax according to the invention.

TABLE 39

| | Descriptor |
|---|---|
| ```
coding_tree_in_scalable_extension ( x0, y0, log2CUSize, cuDepth ) {
    if( x0 + ( 1 << log2CUSize ) <= PicWidthInSamples_L &&
        y0 + ( 1 << log2CUSize ) <= PicHeightInSamples_L &&
        cuAddress( x0, y0 ) >= SliceAddress &&
        log2CUSize > Log2MinCUSize ) {
            split_coding_unit_flag[ x0 ][ y0 ]
    }
    if( adaptive_loop_filter_flag && alf_cu_control_flag ) {
        if( cuDepth <= alf_cu_control_max_depth )
            if( cuDepth == alf_cu_control_max_depth ||
                split_coding_unit_flag[ x0 ][ y0 ] == 0 )
                AlfCuFlagIdx++
    }
    if( cu_qp_delta_enabled_flag &&
        log2CUSize >= log2MinCUDQPSize )
        IsCuQpDeltaCoded = 0
    if( split_coding_unit_flag[ x0 ][ y0 ] ) {
        x1 = x0 + ( ( 1 << log2CUSize ) >> 1 )
        y1 = y0 + ( ( 1 << log2CUSize ) >> 1 )
        if( cuAddress( x1, y0 ) > SliceAddress )
            moreDataFlag = coding_tree_in_scalable_extension
( x0, y0, log2CUSize − 1, cuDepth + 1 )
        if( cuAddress( x0, y1 ) > SliceAddress && moreDataFlag &&
            x1 < PicWidthInSamples_L)
            moreDataFlag = coding_tree_in_scalable_extension
( x1, y0, log2CUSize − 1, cuDepth + 1 )
        if( cuAddress( x1, y1 ) > SliceAddress && moreDataFlag &&
            y1 < PicHeightInSamples_L)
            moreDataFlag = coding_tree_in_scalable_extension
( x0, y1, log2CUSize − 1, cuDepth + 1 )
        if( moreDataFlag &&
            x1 < PicWidthInSamples_L && y1 < PicHeightInSamples_L)
            moreDataFlag = coding_tree_in_scalable_extension
(x1, y1, log2CUSize − 1, cuDepth + 1 )
    } else {
        if(adaptive_loop_filter_flag && alf_cu_control_flag )
            AlfCuFlag[ x0 ][ y0 ] = alf_cu_flag[ AlfCuFlagIdx ]
        coding_unit_in_scalable_extension ( x0, y0, log2CUSize )
        if( granularity_block_boundary( x0, y0, log2CUSize ) ) {
            end_of_slice_flag
            moreDataFlag = ! end_of_slice_flag
        } else
            moreDataFlag = 1
    }
    return moreDataFlag
}
``` | ae(v) ... ae(v) |

TABLE 40

| | Descriptor |
|---|---|
| coding_unit( x0, y0, log2CUSize ) { | |
|     if( slice_type != I ) | |
|         skip_flag[ x0 ][ y0 ] | ae(v) |
|     if(skip_flag[ x0 ][ y0 ]) | |
|         prediction_unit( x0, y0 , log2CUSize ) | |
|     else if( slice_type != I \|\| log2CUSize = = Log2MinCUSize ) { | |
|         if( slice_type != I ) | |
|             pred_mode_flag | ae(v) |
|         if( PredMode !=MODE_INTRA \|\| log2CUSize = = Log2MinCUSize ) | |
|             part_mode | ae(v) |
|         x1 = x0 + ( ( 1 << log2CUSize ) >> 1 ) | |
|         y1 = y0 + ( ( 1 << log2CUSize ) >> 1 ) | |
|         x2 = x1 - ( ( 1 << log2CUSize ) >> 2 ) | |
|         y2 = y1 - ( ( 1 << log2CUSize ) >> 2 ) | |
|         x3 = x1 + ( ( 1 << log2CUSize ) >> 2 ) | |
|         y3 = y1 + ( ( 1 << log2CUSize ) >> 2 ) | |
|         if( PartMode == PART_2Nx2N ) { | |
|             prediction_unit( x0, y0 , log2CUSize ) | |
|         } else if( PartMode == PART_2NxN ) { | |
|             prediction_unit( x0, y0 , log2CUSize ) | |
|             prediction_unit( x0, y1 , log2CUSize ) | |
|         } else if( PartMode == PART_Nx2N ) { | |
|             prediction_unit( x0, y0 , log2CUSize ) | |
|             prediction_unit( x1, y0 , log2CUSize ) | |
|         } else if( PartMode == PART_2NxnU ) { | |
|             prediction_unit( x0, y0 , log2CUSize ) | |
|             prediction_unit( x0, y2 , log2CUSize ) | |
|         } else if( PartMode == PART_2NxnD ) { | |
|             prediction_unit( x0, y0 , log2CUSize ) | |
|             prediction_unit( x0, y3 , log2CUSize ) | |
|         } else if( PartMode == PART_nLx2N ) { | |
|             prediction_unit( x0, y0 , log2CUSize ) | |
|             prediction_unit( x2, y0 , log2CUSize ) | |
|         } else if( PartMode == PART_nRx2N ) { | |
|             prediction_unit( x0, y0 , log2CUSize ) | |
|             prediction_unit( x3, y0 , log2CUSize ) | |
|         } else { /* PART_NxN */ | |
|             prediction_unit( x0, y0 , log2CUSize ) | |
|             prediction_unit( x1, y0 , log2CUSize ) | |
|             prediction_unit( x0, y1 , log2CUSize ) | |
|             prediction_unit( x1, y1 , log2CUSize ) | |
|         { | |
|         if( !pcm_flag ) { | |
|             transform_tree( x0, y0, log2CUSize, log2CUSize, log2CUSize, 0, 0 ) | |
|             transform_coeff( x0, y0, x0, y0, log2CUSize, log2CUSize, 0, 0 ) | |
|         } | |
|     } | |
| } | |

Table 41 shows an example of coding unit in scalable extension syntax according to the invention.

TABLE 41

| | Descriptor |
|---|---|
| coding_unit_in_scalable_extension ( x0, y0, log2CUSize ) { | |
|     if( ILDiffCodingFlag ) | |
|         il_diff_mode[ x0 ][ y0 ] | |
|     if( slice_type != EI ) | |
|         skip_flag[ x0 ][ y0 ] | ae(v) |
|     if ( ( ILIntraPredFlag \|\| ILSyntaxPredFlag ) && !skip_flag[ x0 ][ y0 ] && !il_diff_mode[ x0 ][ y0 ] ) | |
|         il_mode[ x0 ][ y0 ] | ae(v) |
|     if( !il_mode[ x0 ][ y0 ]){ | |
|         if( skip_flag[ x0 ][ y0 ] ) | |
|             prediction_unit( x0, y0 , log2CUSize ) | |
|         else if( slice_type !=EI \|\| log2CUSize = = Log2MinCUSize ) { | |
|             if( slice_type !=EI ) | |

TABLE 41-continued

| | Descriptor |
|---|---|
|                 pred_mode_flag | ae(v) |
|             if( PredMode != MODE_INTRA \|\| log2CUSize = = Log2MinCUSize ) | |
|                 part_mode | ae(v) |
|             x1 = x0 + ( ( 1 << log2CUSize ) >> 1 ) | |
|             y1 = y0 + ( ( 1 << log2CUSize ) >> 1 ) | |
|             x2 = x1 - ( ( 1 << log2CUSize ) >> 2 ) | |
|             y2 = y1 - ( ( 1 << log2CUSize ) >> 2 ) | |
|             x3 = x1 + ( ( 1 << log2CUSize ) >> 2 ) | |
|             y3 = y1 + ( ( 1 << log2CUSize ) >> 2 ) | |
|             if( PartMode == PART_2Nx2N ) { | |
|                 prediction_unit( x0, y0 , log2CUSize ) | |
|             } else if( PartMode == PART_2NxN ) { | |
|                 prediction_unit( x0, y0 , log2CUSize ) | |
|                 prediction_unit( x0, y1 , log2CUSize ) | |
|             } else if( PartMode == PART_Nx2N ) { | |
|                 prediction_unit( x0, y0 , log2CUSize ) | |
|                 prediction_unit( x1, y0 , log2CUSize ) | |
|             } else if( PartMode == PART_2NxnU ) { | |
|                 prediction_unit( x0, y0 , log2CUSize ) | |
|                 prediction_unit( x0, y2 , log2CUSize ) | |
|             } else if( PartMode == PART_2NxnD ) { | |
|                 prediction_unit( x0, y0 , log2CUSize ) | |
|                 prediction_unit( x0, y3 , log2CUSize ) | |
|             } else if( PartMode == PART_nLx2N ) { | |
|                 prediction_unit( x0, y0 , log2CUSize ) | |
|                 prediction_unit( x2, y0 , log2CUSize ) | |
|             } else if( PartMode == PART_nRx2N ) { | |
|                 prediction_unit( x0, y0 , log2CUSize ) | |
|                 prediction_unit( x3, y0 , log2CUSize ) | |
|             } else { /* PART_NxN */ | |
|                 prediction_unit( x0, y0 , log2CUSize ) | |
|                 prediction_unit( x1, y0 , log2CUSize ) | |
|                 prediction_unit( x0, y1 , log2CUSize ) | |
|                 prediction_unit( x1, y1 , log2CUSize ) | |
|             } | |
|         } | |
|     } | |
|     if( ILResPredFlag && ULIntraPredFlag && !il_diff_mode[ x0 ][ y0 ] ) | |
|         il_res_mode[ x0 ][ y0 ] | ae(v) |
|     if( !pcm_flag && !skip_flag[ x0 ][ y0 ] ) { | |
|         transform_tree( x0, y0, log2CUSize, log2CUSize, log2CUSize, 0, 0 ) | |
|         transform_coeff( x0, y0, x0, y0, log2CUSize, log2CUSize, 0, 0 ) | |
| } | |

Table 42 shows an example of prediction unit syntax according to the invention.

TABLE 42

| | Descriptor |
|---|---|
| prediction_unit( x0, y0, log2CUSize ) { | |
|     if(skip_flag[ x0 ][ y0 ] ) { | |
|         if( MaxNumMergeCand > 1 ) | |
|             merge_idx[ x0 ] [ y0 ] | ae(v) |
|     } else if( PredMode = = MODE_INTRA ) { | |
|         if( PartMode == PART_2Nx2N && pcm_enabled_flag && log2CUSize >= Log2MinIPCMCUSize && log2CUSize <= Log2MaxIPCMCUSize ) | |
|             pcm_flag | ae(v) |
|         if( pcm_flag ) { | |
|             while ( !byte_aligned( ) ) | |
|                 pcm_alignment_zero_bit | u(v) |
|             for( i = 0; i < 1 << ( log2CUSize << 1 ); i++ ) | |
|                 pcm_sample_luma[ i ] | u(v) |
|             for( i = 0; i < ( 1 << ( log2CUSize << 1 ) )>> 1; i++ ) | |
|                 pcm_sample_chroma[ i ] | u(v) |
|         } else { | |
|             prev_intra_luma_pred_flag[ x0 ] [ y0 ] | ae(v) |
|             if( prev_intra_luma_pred_flag[ x0 ][ y0 ] ) | |

TABLE 42-continued

| | Descriptor |
|---|---|
|         mpm_flag[ x0 ][ y0 ] | ae(v) |
|       else | |
|         rem_intra_luma_pred_mode[ x0 ] [ y0 ] | ae(v) |
|       intra_chroma_pred_mode[ x0 ][ y0 ] | ae(v) |
|       SignaledAsChromaDC = | |
|       ( chroma_pred_from_luma_enabled_flag ? | |
|         intra_chroma_pred_mode[ x0 ][ y0 ] == 3 : | |
|         intra_chroma_pred_mode[ x0 ][ y0 ] == 2 ) | |
|     } | |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B \|\| slice_type == EB ) | |
|         inter_pred_flag[ x0 ][ y0 ] | ae(v) |
|       if( inter_pred_flag[ x0 ][ y0 ] == Pred_LC ) ( | |
|         if( num_ref_idx_lc_active_minus1 > 0) | |
|           ref_idx_lc[ x0 ][ y0 ] | ae(v) |
|         mvd_coding(mvd_lc[ x0 ][ y0 ][ 0 ], | |
|           mvd_lc[ x0 ][ y0 ][ 1 ]) | |
|         mvp_lc_flag[ x0 ][ y0 ] | ae(v) |
|       } | |
|       else { /* Pred_L0 or Pred_BI */ | |
|         if( num ref idx l0 active minus1 > 0 ) | |
|           ref_idx_l0[ x0 ][ y0 ] | ae(v) |
|         mvd_coding(mvd_l0[ x0 ][ y0 ][ 0 ], | |
|           mvd_l0[ x0 ][ y0 ][ 1 ]) | |
|         mvp_l0_flag[ x0 ][ y0 ] | ae(v) |
|       } | |
|       if( inter_pred_flag[ x0 ][ y0 ] == Pred_BI ) { | |
|         if( num_ref_idx_l1_active_minus1 > 0) | |
|           ref_idx_l1[ x0 ][ y0 ] | ae(v) |
|         mvd_coding(mvd_l1[ x0 ][ y0 ][ 0 ], | |
|           mvd_l1[ x0 ][ y0 ][ 1 ]) | |
|         mvp_l1_flag[ x0 ][ y0 ] | ae(v) |
|       } | |
|     } | |
|   } | |
| } | |

Table 43 shows an example of motion vector differential coding syntax according to the invention.

TABLE 43

| | Descriptor |
|---|---|
| mvd_coding(mvd_x, mvd_y ) { | |
|     abs_mvd_greater0_flag[ 0 ] | ae(v) |
|     abs_mvd_greater0_flag[ 1 ] | ae(v) |
|     if(abs_mvd_greater0_flag[ 0 ] ) | |
|         abs mvd_greater1_flag[ 0 ] | ae(v) |
|     if(abs_mvd_greater0_flag[ 1 ] ) | |
|         abs mvd_greater1_flag[ 1 ] | ae(v) |
|     if(abs_mvd_greater0_flag[ 0 ] ) { | |
|         if(abs_mvd_greater1_flag[ 0 ] ) | |
|             abs_mvd_minus2[ 0 ] | ae(v) |
|         mvd_sign_flag[ 0 ] | ae(v) |
|     } | |
|     if(abs_mvd_greater0_flag[ 1 ] ) { | |
|         if(abs_mvd_greater1_flag[ 1 ] ) | |
|             abs_mvd_minus2[ 1 ] | ae(v) |
|         mvd_sign_flag[ 1 ] | ae(v) |
|     } | |
|     mvd_x = abs_mvd_greater0_flag[ 0 ] * | |
|     ( abs_mvd_minus2[ 0 ] + 2 ) * | |
|                 ( 1 − 2 * mvd_sign_flag[ 0 ] ) | |
|     mvd_y = abs_mvd_greater0_flag[ 1 ] * | |
|     ( abs_mvd_minus2[ 1 ] + 2 ) * | |
|                 ( 1 − 2 * mvd_sign_flag[ 1 ] ) | |
| } | |

Table 44 shows an example of transform tree syntax according to the invention.

TABLE 44

| | Descriptor |
|---|---|
| transform_tree( x0, y0, log2CUSize, log2TrafoWidth, log2TrafoHeight, trafoDepth, blkIdx ) | |
| { | |
|     if( trafoDepth == 0 && IntraSplitFlag == 0 && PredMode != MODE_INTRA && | |
|         !(PartMode == PART_2Nx2N && merge_flag[x0][y0]) ) | |
|             no_residual_data_flag | ae(v) |
|     if( !no_residual_data_flag ) { | |
|         log2TrafoSize = ( log2TrafoWidth + log2TrafoHeight ) >> 1 | |
|         intraSplitFlag = ( IntraSplitFlag && trafoDepth == 0 ? 1 : 0 ) | |
|         interSplitFlag = ( max_transform_hierarchy_depth_inter == =0 && | |
|                       PredMode == MODE_INTER && PartMode != PART_2Nx2N && | |
|                       trafoDepth == 0 ) | |
|         maxDepth = ( PredMode == MODE_INTRA ? | |
|                       max_transform_hierarchy_depth_intra + IntraSplitFlag : | |
|                       max_transform_hierarchy_depth_inter + InterSplitFlag ) | |
|         xBase = x0 − ( x0 & ( 1 << log2TrafoWidth ) ) | |
|         yBase = y0 − ( y0 & ( 1 << log2TrafoHeight ) ) | |
|         if( log2TrafoSize <= Log2MaxTrafoSize && | |
|             log2TrafoSize > Log2MinTrafoSize && | |
|             trafoDepth < maxDepth && !intraSplitFlag && !interSplitFlag ) | |
|             split_transform_flag[ x0 ][ y0 ][ trafoDepth ] | ae(v) |
|         if( PredMode != MODE_INTRA && | |
|             log2TrafoSize <= Log2MaxTrafoSize ) { | |
|             firstChromaCbf = ( log2TrafoSize == Log2MaxTrafoSize \|\| | |
|                       trafoDepth == 0 ) ? 1 : 0 | |
|             if( firstChromaCbf \|\| log2TrafoSize > LogSMinTrafoSize ) { | |
|             [Ed. (WJ): Log2MinTrafoSize or 2?] | |
|                 if( firstChromaCbf \|\| cbf_cb[ xBase ][ yBase ][ trafoDepth − 1 ] ) { | |
|                     readCbf = true | |
|                     if( blkIdx == 3 && log2TrafoSize < Log2MaxTrafoSize ) | |

TABLE 44-continued

| | Descriptor |
|---|---|

```
                            readCbf = cbf_cb[ xBase ][ yBase ][ trafoDepth ] ||
                                      cbf_cb[ xBase + ( 1 << log2TrafoWidth ) ][ yBase ][ trafoDepth ]
||
                                      cbf_cb[ xBase ][ yBase + ( 1 << log2TrafoHeight) ][ trafoDepth ]
                        if ( !readCbf )
                            cbf_cb[ x0 ][ y0 ][ trafoDepth ] = 1
                        else
                            cbf_cb[ x0 ][ y0 ][ trafoDepth ]                                        ae(v)
                    }
                    if( firstChromaCbf || cbf_cr[ xBase ][ yBase ][ trafoDepth − 1 ] ) {
                        readCbf = true
                        if( blkIdx = = 3 && log2TrafoSize < Log2MaxTrafoSize )
                            readCbf = cbf_cr[ xBase ][ yBase ][ trafoDepth ] ||
                                      cbf_cr[ xBase + ( 1 << log2TrafoWidth ) ][ yBase ][ trafoDepth ]
||
                                      cbf_cr[ xBase ][ yBase + ( 1 << log2TrafoHeight ) ][ trafoDepth ]
                        if ( !readCbf )
                            cbf_cr[ x0 ][ y0 ][ trafoDepth ] = 1
                        else
                            cbf_cr[ x0 ][ y0 ][ trafoDepth ]                                        ae(v)
                    }
                }
            }
            if( split_transform_flag[ x0 ][ y0 ][ trafoDepth ] ) {
                if( InterTUSplitDirection = = 2 ) {
                    x1 = x0 + ( ( 1 << log2TrafoWidth ) >> 1 )
                    y1 = y0
                    x2 = x0
                    y2 = y0 + ( ( 1 << log2TrafoHeight ) >> 1 )
                    x3 = x1
                    y3 = y2
                } else {
                    x1 = x0 + ( ( 1 << log2TrafoWidth ) >> 2 ) * InterTUSplitDirection
                    y1 = y0 + ( ( 1 << log2TrafoHeight) >> 2 ) * ( 1 − InterTUSplitDirection )
                    x2 = x1 + ( ( 1 << log2TrafoWidth ) >> 2 ) * InterTUSplitDirection
                    y2 = y1 + ( ( 1 << log2TrafoHeight) >> 2 ) * ( 1 − InterTUSplitDirection )
                    x3 = x2 + ( ( 1 << log2TrafoWidth ) >> 2 ) * InterTUSplitDirection
                    y3 = y2 + ( ( 1 << log2TrafoHeight) >> 2 ) * ( 1 − InterTUSplitDirection )
                    log2TrafoHeight = log2TrafoHeight + 2 * InterTUSplitDirection − 1
                    log2TrafoWidth = log2TrafoWidth − 2 * InterTUSplitDirection + 1
                }
                transform_tree( x0, y0, log2CUSize, log2TrafoWidth − 1, log2TrafoHeight − 1,
                                trafoDepth + 1, 0 )
                transform_tree( x1, y1, log2CUSize, log2TrafoWidth − 1, log2TrafoHeight − 1,
                                trafoDepth + 1, 1 )
                transform_tree( x2, y2, log2CUSize, log2TrafoWidth − 1, log2TrafoHeight − 1,
                                trafoDepth + 1, 2 )
                transform_tree( x3, y3, log2CUSize, log2TrafoWidth − 1, log2TrafoHeight − 1,
                                trafoDepth + 1, 3 )
            } else {
                if( PredMode = = MODE_INTRA || trafoDepth != 0 ||
                    cbf_cb[ x0 ][ y0 ][ trafoDepth ] ||
                    cbf_cr[ x0 ][ y0 ][ trafoDepth ] ) {
                readCbf = true
                if( blkIdx = = 3 && PredMode != MODE_INTRA &&
                    ( ( log2CUSize <= Log2MaxTrafoSize+1 ) || ( log2TrafoSize <
Log2MaxTrafoSize ) )
                    readCbf = cbf_luma[ xBase ][ yBase ][ trafoDepth ] ||
                              cbf_luma[ xBase + ( 1 << log2TrafoWidth ) ][ yBase ][ trafoDepth ]
||
                              cbf_luma[ xBase ][ yBase + ( 1 << log2TrafoHeight ) ][ trafoDepth ]
||
                              cbf_cb[ xBase ][ yBase ][ trafoDepth − 1] ||
                              cbf_cr[ xBase ][ yBase ][ trafoDepth − 1]
                    if ( !readCbf )
                        cbf_luma[ x0 ][ y0 ][ trafoDepth ] = 1
                    else
                        cbf_luma[ x0 ][ y0 ][ trafoDepth ]                                          ae(v)
                }
                if(PredMode = = MODE_INTRA )
                    if( log2TrafoSize > Log2MinTrafoSize ) { [Ed. (WJ): Log2MinTrafoSize or
2?]
```

TABLE 44-continued

|  | Descriptor |
|---|---|
| cbf_cb[ x0 ][ y0 ][ trafoDepth ] | ae(v) |
| cbf_cr[ x0 ][ y0 ][ trafoDepth ] | ae(v) |
| } else if( blkIdx == 0 ) { | |
| cbf_cb[ x0 ][ y0 ][ trafoDepth − 1 ] | ae(v) |
| cbf_cr[ x0 ][ y0 ][ trafoDepth − 1 ] | ae(v) |
| } | |
| } | |
| } | |
| } | |

Table 45 shows an example of transform coefficient syntax according to the invention.

TABLE 45

|  | Descriptor |
|---|---|
| transform_coeff( x0, y0, xC, yC, log2TrafoWidth, log2TrafoHeight, trafoDepth, blkIdx ) { | |
|     if( cbf_luma[ x0 ][ y0 ][ trafoDepth ] \|\| cbf_cb[ x0 ][ y0 ][ trafoDepth ] \|\| | |
|         cbf_cr[ x0 ][ y0 ][ trafoDepth ] { | |
|         if( cu_qp_delta_enabled_flag && !IsCuQpDeltaCoded ) { | |
|             cu_qp_delta | ae(v) |
|             IsCuQpDeltaCoded = 1 | |
|         } | |
|         if( split_transform_flag[ x0 ][ y0 ][ trafoDepth ] ) { | |
|             if( InterTUSplitDirection == 2 ) { | |
|                 x1 = x0 + ( ( 1 << log2TrafoWidth ) >> 1 ) | |
|                 y1 = y0 | |
|                 x2 = x0 | |
|                 y2 = y0 + ( ( 1 << log2TrafoHeight ) >> 1 ) | |
|                 x3 = x1 | |
|                 y3 = y2 | |
|             } else < | |
|                 x1 = x0 + ( ( 1 << log2TrafoWidth ) >> 2) * InterTUSplitDirection | |
|                 y1 = y0 + ( ( 1 << log2TrafoHeight) >> 2 ) * ( 1 − InterTUSplitDirection ) | |
|                 x2 = x1 + ( ( 1 << log2TrafoWidth ) >> 2 ) * InterTUSplitDirection | |
|                 y2 = y1 + ( ( 1 << log2TrafoHeight) >> 2 ) * ( 1 − InterTUSplitDirection ) | |
|                 x3 = x2 + ( ( 1 << log2TrafoWidth ) >> 2 ) * InterTUSplitDirection | |
|                 y3 = y2 + ( ( 1 << log2TrafoHeight) >> 2 ) * ( 1 − InterTUSplitDirection ) | |
|                 log2TrafoHeight = log2TrafoHeight + 2 * InterTUSplitDirection − 1 | |
|                 log2TrafoWidth = log2TrafoWidth − 2 * InterTUSplitDirection + 1 | |
|             } | |
|         transform_coeff( x0, y0, x0, y0, log2TrafoWidth − 1, log2TrafoHeight − 1, trafoDepth + 1, 0) | |
|         transform_coeff( x1, y1, x0, y0, log2TrafoWidth − 1, log2TrafoHeight − 1, trafoDepth + 1, 1 ) | |
|         transform_coeff( x2, y2, x0, y0, log2TrafoWidth − 1, log2TrafoHeight − 1, trafoDepth + 1, 2) | |
|         transform_coeff( x3, y3, x0, y0, log2TrafoWidth − 1, log2TrafoHeight − 1, trafoDepth + 1, 3) | |
|         } else { | |
|             log2TrafoSize = ( ( log2TrafoWidth + log2TrafoHeight ) >> 1 ) | |
|             log2TrafoSizeC = ( ( log2TrafoSize == Log2MinTrafoSizeC ) ? | |
|                 log2TrafoSize : log2TrafoSize − 1 ) | |
|             if ( PredMode == MODE_INTRA ) { | |
|                 scanIdx = ScanType[ log2TrafoSize − 2 ][ IntraPredMode ] | |
|                 scanIdxC = ScanType[ log2TrafoSize − 2 ][ IntraPredModeC ] | |
|             } else { | |
|                 scanIdx = 0 | |
|                 scanIdxC = 0 | |
|             } | |
|             if ( cbf_luma[ x0 ][ y0 ][ trafoDepth ] ) | |
|                 residual_coding( x0, y0, log2TrafoWidth, log2TrafoHeight, scanIdx, 0 ) | |
|             if ( log2TrafoSize > Log2MinTrafoSize ) { [Ed. (WJ): Log2MinTrafoSize or 2?] | |
|                 if ( cbf_cb[ x0 ][ y0 ][ trafoDepth ] ) | |
|                     residual_coding( x0, y0, log2TrafoSizeC, trafoDepth, scanIdxC, 1 ) | |
|                 if ( cbf_cr[ x0 ][ y0 ][ trafoDepth ] ) | |
|                     residual_coding( x0, y0, log2TrafoSizeC, trafoDepth, scanIdxC, 2 ) | |

TABLE 45-continued

|  | Descriptor |
|---|---|
| ``` 
        } else if (blkIdx == 3 ) {
            if ( cbf_cb[ x0 ][ y0 ][ trafoDepth ] )
                residual_coding( xC, yC, log2TrafoSizeC, trafoDepth, scanIdxC, 1 )
            if ( cbf_cr[ x0 ][ y0 ][ trafoDepth ] )
                residual_coding( xC, yC, log2TrafoSizeC, trafoDepth, scanIdxC, 2 )
        }
      }
    }
}
``` | |

Table 46 shows an example of residual coding syntax according to the invention.

TABLE 46

|  | Descriptor |
|---|---|
| `residual_coding ( x0, y0, log2TrafoWidth, log2TrafoHeight, scanIdx, cIdx ) {` | |
|     `last_significant_coeff_x_prefix` | ae(v) |
|     `last_significant_coeff_y_prefix` | ae(v) |
|     `if ( last_significant_coeff_x_prefix > 3 )` | |
|         `last_significant_coeff_x_suffix` | ae(v) |
|     `if (last_significant_coeff_y_prefix > 3 )` | |
|         `last_significant_coeff_y_suffix` | ae(v) |
|     `numCoeff = 0` | |
|     `do {` | |
|         `xC = ScanOrder[ log2TrafoWidth ][ log2TrafoHeight ][ scanIdx ][ numCoeff ][ 0 ]` | |
|         `yC = ScanOrder[ log2TrafoWidth ][ log2TrafoHeight ][ scanIdx ][ numCoeff ][ 1 ]` | |
|         `numCoeff++` | |
|     `} while( ( xC != LastSignificantCoeffX ) || ( yC != LastSignificantCoeffY ) )` | |
|     `numLastSubset = (numCoeff − 1) >> 4` | |
|     `for( i = numLastSubset; i >= 0; i−− ) {` | |
|         `offset = i << 4` | |
|         `if( max( log2TrafoWidth, log2TrafoHeight ) > 3) {` | |
|             `xCG = ScanOrder[ log2TrafoWidth − 2 ][ log2TrafoHeight − 2 ][ scanIdx ][ i ][ 0 ]` | |
|             `yCG = ScanOrder[ log2TrafoWidth − 2 ][ log2TrafoHeight − 2 ][ scanIdx ][ i ][ 1 ]` | |
|             `rightCGFlag = (xCG = = (1<< (log2TrafoWidth − 2)) − 1) ? 0 :` | |
|                       `significant_coeff_group_flag[ xCG + 1 ][ yCG ]` | |
|             `bottomCGFlag = (yCG = = (1 << (log2TrafoHeight − 2)) − 1) ? 0 :` | |
|                       `significant_coeff_group_flag[ xCG ][ yCG + 1 ]` | |
|             `if( ( i < numLastSubset) && (rightCGFlag + bottomCGFlag < 2) && (i > 0))` | |
|                 `significant_coeff_group_flag[ xCG ][ yCG ]` | ae(v) |
|             `for( n = 15; n >= 0; n−− ) {` | |
|                 `xC = ScanOrder[ log2TrafoWidth ][ log2TrafoHeight ] [ scanIdx ][ n + offset ][ 0 ]` | |
|                 `yC = ScanOrder[ log2TrafoWidth ][ log2TrafoHeight ] [ scanIdx ][ n + offset ][ 1 ]` | |
|                 `if ( (n + offset) < (numCoeff − 1) &&` | |
| `significant_coeff_group_flag[ xCG ][ yCG ] ) {` | |
|                     `numNZInCG = (i = = numLastSubset) ? 1 : 0` | |
|                     `if ( ( (n > 0) || (rightCGFlag + bottomCGFlag = = 2) || (i = = 0) ||` | |
| `(numNZInCG > 0) ) ) {` | |
|                         `significant_coeff_flag[ xC ][ yC ]` | ae(v) |
|                         `numNZInCG += significant_coeff_flag[ xC ][ yC ]` | |
|                     `else` | |
|                         `significant_coeff_flag[ xC ][ yC ] = 1` | |
|                 `}` | |
|             `}` | |
|         `} else {` | |
|             `for( n = 15; n >= 0; n−− ) {` | |
|                 `xC = ScanOrder[ log2TrafoWidth ][ log2TrafoHeight ] [ scanIdx ][ n + offset ][ 0 ]` | |
|                 `yC = ScanOrder[ log2TrafoWidth ][ log2TrafoHeight ][ scanIdx ][ n + offset ][ 1 ]` | |
|                 `if( (n + offset) < (numCoeff − 1) )` | |
|                     `significant_coeff_flag[ xC ] [ yC ]` | ae(v) |
|             `}` | |
|         `}` | |
|         `for( n = 15; n >= 0; n−− ) {` | |
|             `xC = ScanOrder[ log2TrafoWidth ][ log2TrafoHeight ][ scanIdx ][ n + offset ][ 0 ]` | |
|             `yC = ScanOrder[ log2TrafoWidth ][ log2TrafoHeight ][ scanIdx ][ n + offset ][ 1 ]` | |
|             `if( significant_coeff_flag[ xC ][ yC ] )` | |
|                 `coeff_abs_level_greater1_flag[ n ]` | ae(v) |
|         `}` | |
|         `for( n = 15; n >= 0; n−− ) {` | |
|             `if( coeff_abs_level_greater1_flag[ n ])` | |
|                 `coeff_abs_level_greater2_flag[ n ]` | ae(v) |
|         `}` | |
|         `for( n = 15; n >= 0; n−− ) {` | |

TABLE 46-continued

| | Descriptor |
|---|---|
| xC = ScanOrder[ log2TrafoWidth ][ log2TrafoHeight ][ scanIdx ][ n + offset ][ 0 ]<br> yC = ScanOrder[ log2TrafoWidth ][ log2TrafoHeight ][ scanIdx ][ n + offset ][ 1 ]<br> if( significant_coeff_flag[ xC ][ yC ] ) {<br> coeff_sign_flag[ n ] | ae(v) |
| }<br> for( n = 15; n >= 0; n-- ) {<br> if( coeff_abs_level_greater2_flag[ n ] )<br> coeff_abs_level_minus3[ n ] | ae(v) |
| xC = ScanOrder[ log2TrafoWidth ][ log2TrafoHeight ][ scanIdx ][ n + offset ][ 0 ]<br> yC = ScanOrder[ log2TrafoWidth ][ log2TrafoHeight ][ scanIdx ][ n + offset ][ 1 ]<br> if( significant_coeff_flag[ xC ][ yC ] ) {<br> transCoeffLevel[ x0 ][ y0 ][ cIdx ][ xC ][ yC ] =<br> ( coeff_abs_level_minus3[ n ] + 3 ) * ( 1 − 2 * coeff_sign_flag[ n ] )<br> } else<br> transCoeffLevel[ x0 ][ y0 ][ cIdx ][ xC ][ yC ] = 0<br> }<br> }<br>} | |

In the above-mentioned syntax, nal_unit_type may be defined as in Table 47.

TABLE 47

| nal_unit_type | Content of NAL unit and RBSP syntax structure | NAL unit type class |
|---|---|---|
| 0 | Unspecified | non-VCL |
| 1 | Coded slice of a non-IDR and non-CRA picture slice_layer_rbsp( ) | VCL |
| 2-3 | Reserved | n/a |
| 4 | Coded slice of a CRA picture slice_layer_rbsp( ) | VCL |
| 5 | Coded slice of an IDR picture slice_layer_rbsp( ) | VCL |
| 6 | Supplemental enhancement information (SEI) sei_rbsp( ) | non-VCL |
| 7 | Sequence parameter set seq_parameter_set_rbsp( ) | non-VCL |
| 8 | Picture parameter set pic_parameter_set_rbsp( ) | non-VCL |
| 9 | Access unit delimiter access_unit_delimiter_rbsp( ) | non-VCL |
| 10-11 | Reserved | n/a |
| 12 | Filler data filler_data_rbsp( ) | non-VCL |
| 13 | Sequence parameter set extension seq_parameter_set_extension_rbsp( ) | non-VCL |
| 14 | Adaptation parameter set aps_rbsp( ) | non-VCL |
| 15 | Subset sequence parameter set subset_seq_parameter_set_rbsp( ) | non-VCL |
| 16-19 | Reserved | n/a |
| 20 or SVC_NAL | Coded slice extension slice_layer_extension_rbsp( ) | VCL |
| 21-23 | Reserved | n/a |
| 24 . . . 63 | Unspecified | non-VCL | dependency_id represents an identification (ID) number indicating a dependency relationship of each NAL unit.

quality_id represents an ID number transmitted to indicate the quality level of each NAL unit.

When the value of singleloop_decoding_flag is 1, motion compensation is performed in only the uppermost layer of a scalable bitstream. When the value of singleloop_decoding_flag is 0, the motion compensation is allowed in all layers.

slice_type specifies a coding type of a slice according to Table 48.

TABLE 48

| slice_type | Name of slice_type |
|---|---|
| 0, 5 | EP (P slice in scalable extension) |
| 1, 6 | EB (B slice in scalable extension) |
| 2, 7 | EI (I slice in scalable extension) |

When the value of inter_layer_intra_prediction_flag is 1, it specifies that the inter-layer intra prediction operation is adaptively used in the coding unit. Otherwise, the inter-layer intra prediction is not used. When inter_layer_intra_prediction_flag is not present, the value of inter_layer_intra_prediction_flag may be inferred to be 0. ILIntraPredFlag may be derived as follows.

When the value of singleloop_decoding_flag is 1 and when the value of inter_layer_intra_prediction_flag is 1 and slice_type is EI, the value of ILIntraPredFlag is set to 1. Otherwise, the value of ILIntraPredFlag is set to 0.

When the value of singleloop_decoding_flag is 0, the value of ILIntraPredFlag is set to the same as the value of inter_layer_intra_prediction_flag.

When the value of inter_layer_syntax_prediction_flag is 1, it specifies that the inter-layer syntax prediction operation is adaptively used in the coding unit. Otherwise, the inter-layer syntax prediction is not used. When inter_layer_syntax_prediction_flag is not present, the value of inter_layer_syntax_prediction_flag may be inferred to be 0. ILSyntaxPredFlag may be derived as follows.

When the value of inter_layer_syntax_prediction_flag is 1 and slice_type is not EI, the value of ILSyntaxPredFlag is set to 1. Otherwise, the value of ILSyntaxPredFlag is set to 0.

When the value of inter_layer_residual_prediction_flag is 1, it specifies that the inter-layer residual prediction operation is adaptively used in the coding unit. Otherwise, the inter-layer residual prediction is not used. When inter_layer_residual_prediction_flag is not present, the value of inter_layer_residual_prediction_flag may be inferred to be 0. ILResPredFlag may be derived as follows.

When the value of inter_layer_residual_prediction_flag is 1 and slice_type is not EI, the value of ILResPredFlag is set to 1. Otherwise, the value of ILResPredFlag is set to 0.

cabac_init_idc specifies an index for determining an initialization table used in an initialization process of a context variable. cabac_init_idc may have a value in a range of 0 to 2.

il_mode is syntax indicating whether to use information of a base layer. il_mode plays the following roles depending on the value of singleloop_decoding_flag.

When the value of singleloop_decoding_flag is 1 and slice_type is EI and when the value of il_mode is 1, a reconstructed base layer may be scaled on the basis of a resolution difference from the current layer and then may be used as prediction information of a current CU. When the value of il_mode is 0, the reconstruction information of the base layer is not used.

When the value of singleloop_decoding_flag is 1 and slice_type is not EI and when the value of il_mode is 1, the motion information and the intra prediction information of the base layer may be scaled and copied in consideration of the resolution difference from the corresponding current layer to generate a prediction signal and the value thereof may be used as a predictor. When the value of il_mode is 0, the reconstruction information of the base layer is not used.

When the value of singleloop_decoding_flag is 0 and the value of il_mode is 1, the reconstructed pixel information of the base layer may be scaled in consideration of the resolution and then may be used as prediction information.

When the value of il_res_mode is 1, the reconstructed residual data of the corresponding base layer may be scaled in consideration of the resolution and then may be used as a predictor for the residual of the current CU. When the value of il_res_mode is 0, the reconstructed residual data of the corresponding base layer is not used.

When the value of inter_layer_differential_coding_flag is 1, it specifies that the inter-layer differential coding operation is adaptively used in the coding unit. Otherwise, the inter-layer differential coding is not used. When inter_layer_differential_coding_flag is not present, the value of inter_layer_differential_coding_flag is inferred to be 0. ILDiffCodingFlag may be derived as follows.

When the value of singleloop_decoding_flag is 1, the value of inter_layer_differential_coding_flag is 1, and slice_type is EI, the value of ILDiffCodingFlag is set to 1. Otherwise, the value of ILDiffCodingFlag is set to 0.

When the value of singleloop_decoding_flag is not 1, the value of ILDiffCodingFlag is set to the same as the value of inter_layer_differential_coding_flag.

Inter-Layer Unit Prediction

An input signal used for the scalable coding may be different between layers in resolution, frame rate, bit depth, color format, aspect ratio, and the like.

By performing the inter-layer prediction in consideration of this point, it is possible to reduce redundancy and to enhance coding efficiency with respect to simulcast.

For example, a method of reducing an amount of information on process units, that is, CU, PU, and TU, transmitted in an enhancement layer using the information of a base layer may be used as a method of reducing the amount of redundant information.

The method of reducing unit information transmitted in the enhancement layer using the unit (CU, PU, and/or TU) information of the base layer is referred to as inter-layer unit prediction.

The inter-layer unit prediction may be performed by the prediction module or the inter-layer prediction module illustrated in FIGS. 1 to 4. Hereinafter, it is assumed for the purpose of convenience of explanation that the inter-layer unit prediction is performed by the prediction module.

For example, when the inter-layer unit prediction is performed and the prediction module acquires unit information of a base layer, partitioning of an enhancement layer may be performed on the basis of the acquired unit information.

Figure 15:
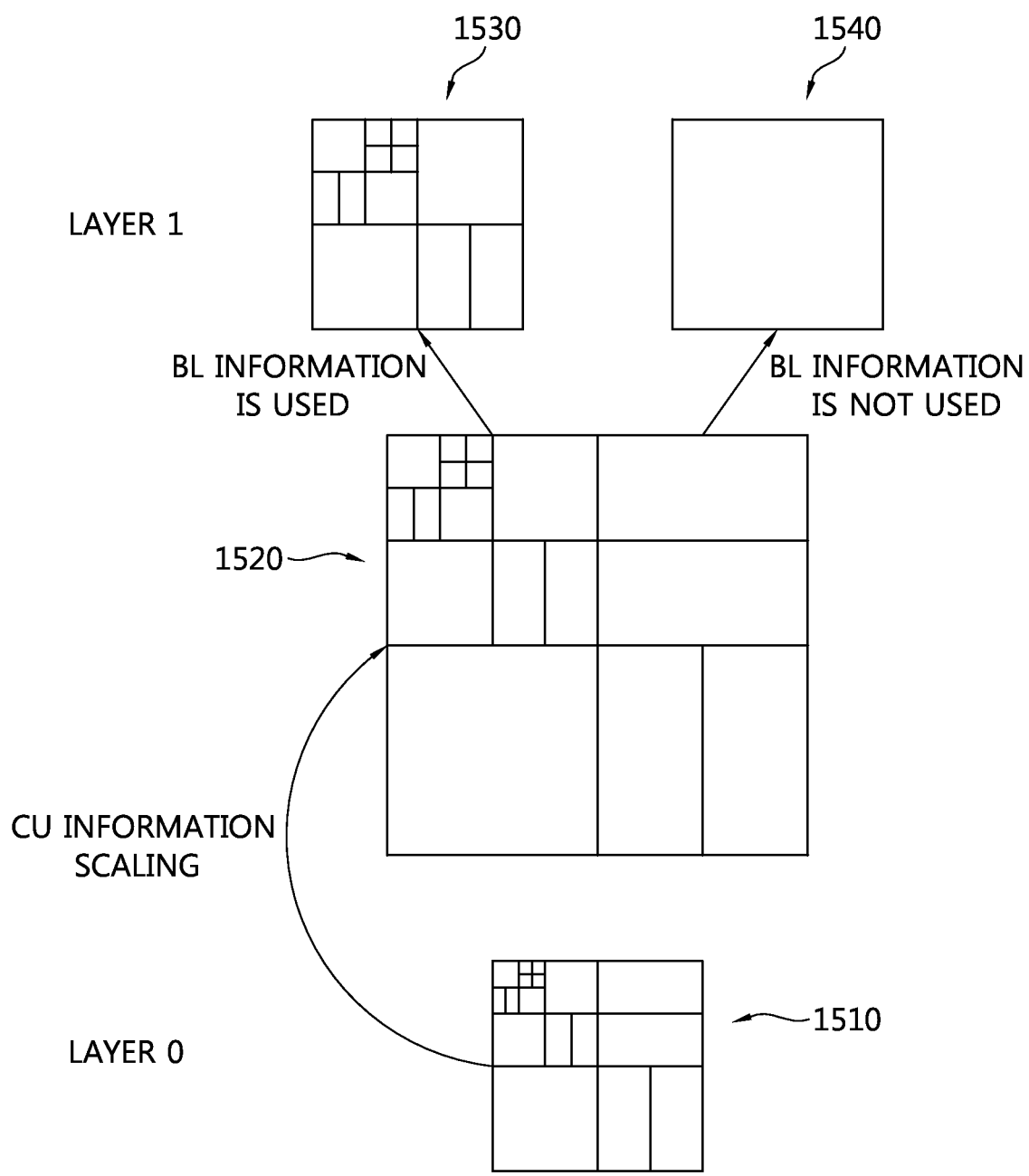
FIG. 15 is a diagram schematically illustrating an example of inter-layer unit information prediction according to the invention.

FIG. 15 is a diagram schematically illustrating an example of inter-layer unit information prediction according to the invention.

In the example illustrated in FIG. 15, it is assumed that the resolution of the enhancement layer doubles the resolution of the base layer.

In FIG. 15, layer 0 may be a base layer or a reference layer, and layer 1 may be an enhancement layer or a current layer.

Referring to FIG. 15, an LCU block 1510 of layer 0 is partitioned into various CUs, Pus, or TUs. Here, the partition information of CUs, Pus, and/or TUs is referred to as CU information or unit information for the purpose of convenience of explanation.

The prediction module may generate reference CU information 1520 which is information obtained by upscaling the CU information of the base layer. The prediction module may derive the CU information of layer 0 using the reference CU information 1520.

For example, when the CU information of the base layer is derived from the reference CU information 1520 and is applied to layer 1, a unit structure such as LCU0 1530 may be used as an LCU structure of layer 1. When the reference CU information 1520 is not used, that is, when the CU information of the base layer is not used, a unit structure such as LCU1 1540 may be used as the LCU structure of layer 1.

The use of the CU information (unit information) of layer 0 may or may not be helpful to enhance coding efficiency. Accordingly, the video encoder may adaptively signal whether to use the CU information of layer 0.

It has been described for the purpose of convenience of explanation that the unit information is partition information of CU, PU, and TU, but the unit information may include information on CU, PU, and TU in addition to the partitioning structure of CU, PU, and TU. In other words, the CU information of the base layer may be a tree structure or partition information, or may be PU information (information of whether to use a skip mode or a non-skip mode, prediction direction, motion vector, reference index, and the like), or may include both.

For example, when the inter-layer unit prediction is associated with prediction of the tree/partition information, the following syntax may be used.

Table 49 shows an example of slice data syntax for a scalable extension layer.

TABLE 49

| | Descriptor |
|---|---|
| slice_data( ) { | |
|   CurrTbAddr = first_tb_in_slice | |
|   moreDataFlag = 1 | |
|   if( | |
|   adaptive_loop_filter_flag && alf_cu_control_flag ) | |
|     AlfCuFlagIdx = −1 | |
|   do { | |
|     xCU = HorLumaLocation( CurrTbAddr ) | |
|     yCU = VerLumaLocation( CurrTbAddr ) | |
|     IsCuQpDeltaCoded = 0 | |
|     bl_tree_info_skip_flag | ae(v) |
|     coding_tree( xCU, yCU, Log2TbSize ) | |
|     if( !entropy_coding_mode_flag ) | |
|       moreDataFlag = more_rbsp_data( ) | |

TABLE 49-continued

| | Descriptor |
|---|---|
|     else { <br>       end_of_slice_flag <br>       moreDataFlag = !end_of_slice_flag <br>     } <br>     CurrTbAddr = NextTbAddres( CurrTbAddr ) <br>   } while( moreDataFlag ) <br> } | ae(v) |

Table 50 shows an example of coding tree syntax for a scalable extension layer.

TABLE 50

| | Descriptor |
|---|---|
| coding_tree( x0, y0, log2CUSize ) { <br>   if( x0 + ( 1 << log2CUSize ) <= <br>   PicWidthInSamples$_L$ && <br>     y0 + ( 1 << log2CUSize ) <= <br>     PicHeightInSamples$_L$ && <br>     log2CUSize > Log2MinCUSize ) <br>   if( !bl_tree_info_skip_flag && <br>   BLSplitInfo[x0][y0] ) <br>     split_coding_unit_flag[ x0 ][ y0 ] <br>   if( adaptive_loop_filter_flag && <br>   alf_cu_control_flag ) { <br>     cuDepth = Log2MaxCUSize – log2CUSize <br>     if( cuDepth <= alf_cu_control_max_depth ) <br>       if( cuDepth == <br>       alf_cu_control_max_depth \|\| <br>         split_coding_unit_flag[ x0 ][ y0 ] == 0 ) <br>         AlfCuFlagIdx++ <br>   } <br>   if( split_coding_unit_flag[ x0 ][ y0 ] ) { <br>     x1 = x0 + ( ( 1 << log2CUSize ) >> 1 ) <br> .... | <br><br><br><br><br><br>u(1) \| ae(v) |

When the value of bl_tree_info_skip_flag is 1, it indicates that the tree information of the base layer (reference layer or layer 0) is used without any change. When the value of bl_tree_info_skip_flag is 0, it indicates that the tree information of the base layer is not used.

FIG. 5 may be referred to in order to help understanding of bl_tree_info_skip_flag. When the value of bl_tree_info_skip_flag is 1, the tree information of the base layer is upscaled to match the resolution of the enhancement layer (the current layer or layer 1) by CU information upscaling. Accordingly, the values of split_coding_unit_flag of the current largest coding unit (LCU) may be derived to be the same values as the upscaled partition information of the base layer.

BLSplitInfo[x0][y0] has a value of 1 when partition information is present in the upscaled CU information, and has a value of 0 when the partition information is not present in the upscaled CU information.

For example, when the resolution of the enhancement layer doubles the resolution of the base layer and the enhancement layer and the base layer have the same CU depth, the upscaled spilt information of the base layer has a depth lower by one step than that of the partition information of the enhancement layer.

When the partition information is not present in the base layer, the further-split partition information than the partition information when the splint information is predicted from the upscaled base layer may be signaled by setting BLSplitInfo set to 0 and transmitting additional information (for example, split_coding_unit_flag) for only the enhancement layer.

The similar method may be applied to TUs. For example, TU partition information for the current layer may be processed using predetermined flag information.

Table 51 shows an example of coding unit syntax in scalable extension according to the invention. In the example shown in Table 51, transmission of the TU partition information for the current layer may be skipped using a flag bl_tu_info_skip_flag.

TABLE 51

| | Descriptor |
|---|---|
| coding_unit( x0, y0, log2CUSize ) { <br>   if( entropy_coding_mode_flag && slice_type != I ) <br>     skip_flag[ x0 ][ y0 ] <br> ... <br>       prediction_unit( x1, y1, log2CUSize – 1, <br>       log2CUSize – 1, 3 ) <br>     } <br>   } <br>   if( !pcm_flag ) { <br>     bl_tu_info_skip_flag <br>     transform_tree( x0, y0, log2CUSize, 0, 0 ) <br>     transform_coeff( x0, y0, log2CUSize, 0, 0 ) <br>     transform_coeff( x0, y0, log2CUSize, 0, 1 ) <br>     transform_coeff( x0, y0, log2CUSize, 0, 2 ) <br>   } <br> } | <br>u(1) \| ae(v)<br><br><br><br><br>u(1) \| ae(v) |

Table 52 shows an example of transform tree syntax in scalable extension according to the invention.

TABLE 52

| | Descriptor |
|---|---|
| transform_tree( x0, y0, log2TrafoSize, trafoDepth, blkIdx ) { <br>   if( entropy_coding_mode_flag && trafoDepth == 0 && IntraSplitFlag == 0) <br> { <br>     if( PredMode != MODE_INTRA ) <br>       no_residual_data_flag <br>     residualDataPresentFlag = !no_residual_data_flag <br>   } else { <br> ..... <br>       if(log2TrafoSize <= Log2MaxTrafoSize && !intraSplitFlag && <br>       log2TrafoSize > Log2MinTrafoSize && trafoDepth < maxDepth <br>       && bl_tu_info_skip_flag ) <br>         split_transform_flag[ x0 ][ y0 ] [ trafoDepth ] <br>     } else <br>       cbp_and_split_transform | <br><br><br><br>u(1) \| ae(v)<br><br><br><br><br><br>u(1)<br><br>vlc(n, v) |

TABLE 52-continued

| | Descriptor |
|---|---|
| ```
        }
        if( log2TrafoSize <= Log2MaxTrafoSize &&
            log2TrafoSize > Log2MinTrafoSize &&
            trafoDepth < maxDepth && !intraSplitFlag &&
entropy_coding_mode_flag && bl_tu_info_skip_flag )
            split_transform_flag[ x0 ][ y0 ][ trafoDepth ]
        if( PredMode != MODE_INTRA &&
            log2TrafoSize <= Log2MaxTrafoSize &&
            entropy_coding_mode_flag ) {
            firstChromaCbf = ( log2TrafoSize = = Log2MaxTrafoSize ||
                    trafoDepth = = 0 ? 1 : 0)
            if( firstChromaCbf || log2TrafoSize > Log2MinTrafoSize ) {
                xBase = x0 − ( x0 & ( ( 1 << log2TrafoSize ) − 1 ) )
....
        }
}
``` | u(1) \| ae(v) |

As described above, in Tables 51 and 52, when the value of bl_tu_info_skip_flag is 1, the upscaled TU partition information of the base layer may be used in the current layer without any change. When the value of bl_tu_info_skip_flag is 0, the TU partition information for the current layer may be independently transmitted from the video encoder.

On the other hand, CU/PU/TU information pieces may be combined for use in application of the inter-layer unit prediction. For the purpose of understanding of the invention, an example where a spatial ratio of the base layer and the enhancement layer is 2, that is, an example where the resolution difference between two layers is two times, will be described below.

Figure 16:
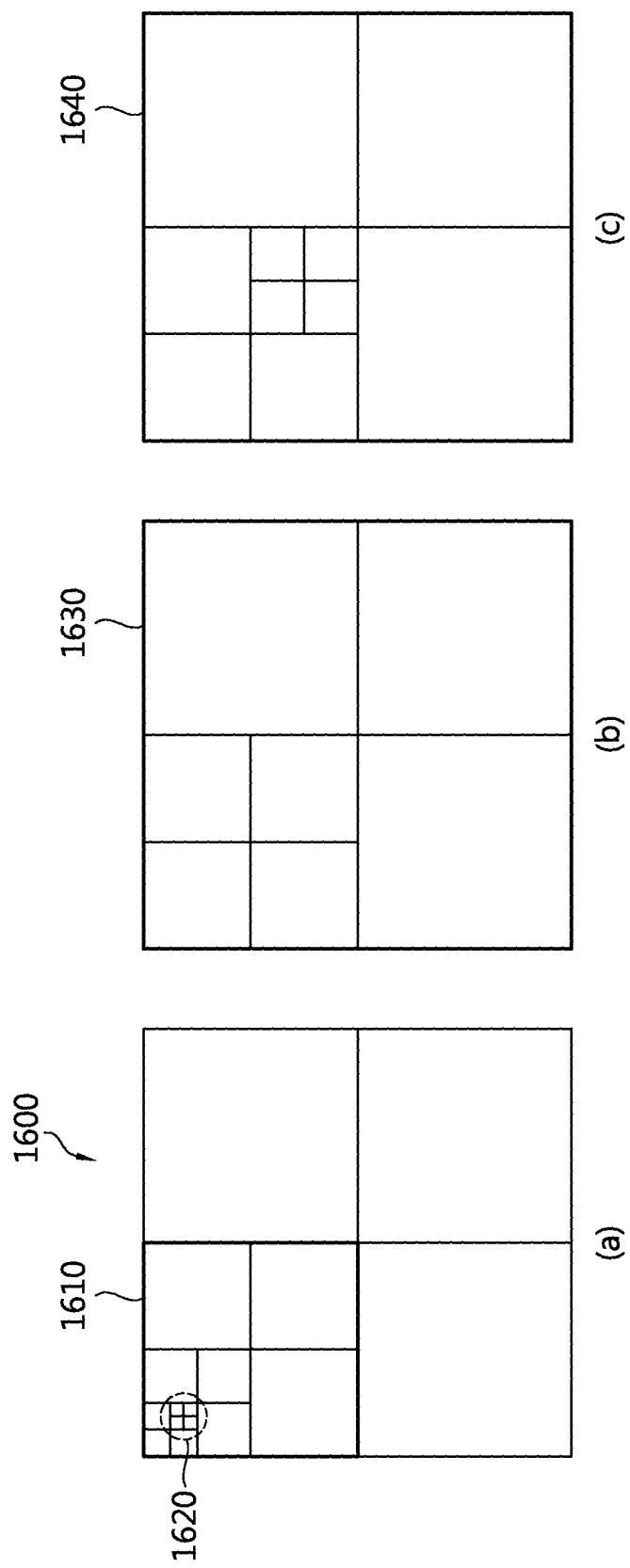
FIG. 16 is a diagram illustrating an application example of inter-layer unit prediction according to the invention.

FIG. 16 is a diagram schematically illustrating an example where the inter-layer unit prediction is applied according to the invention.

A method of resampling a base layer structure at the time of application of the inter-layer unit prediction will be described below with reference to FIG. 16.

FIG. 16(a) illustrates a CU and PU structure of a base layer.

In FIG. 16(a), it is assumed that a base layer block 1600 is an intra-coded block, a split region 1620 is an N×N partition, and the other region is a 2N×2N partition.

In FIG. 16(a), when double upsampling is performed on CU/PU information of a reference block 1610 for use in an enhancement layer, the partition structure like a block 1630 illustrated in FIG. 16(b) or a partition structure like a block 1640 illustrated in FIG. 16(c) may be obtained depending on the level (for example, a CU level or a PU level) of the partition structure of the base layer to be used.

At this time, when only the CU information of the base layer is used for the enhancement layer, the CU partition structure of the enhancement layer may be constructed like the partition structure of the block 1630. In this case, a case in which a video of the enhancement layer has a further-split partition structure than the block 1630 cannot be covered.

On the contrary, when the PU information in addition to the CU information of the base layer is reflected in the CU partition structure of the enhancement layer, the region of the enhancement layer corresponding to a part having a further-split partition (for example, N×N partition) other than the 2N×2N partition in the base layer like a block 1640 illustrated in FIG. 16(c) may be additionally partitioned in CUs. Accordingly, the video of the enhancement layer may have a further-split partition structure.

On the other hand, FIG. 16 illustrates an example where the base layer is an intra-coded block, but the same method may be applied to a case where the base layer is an inter-coded block.

Figure 17:
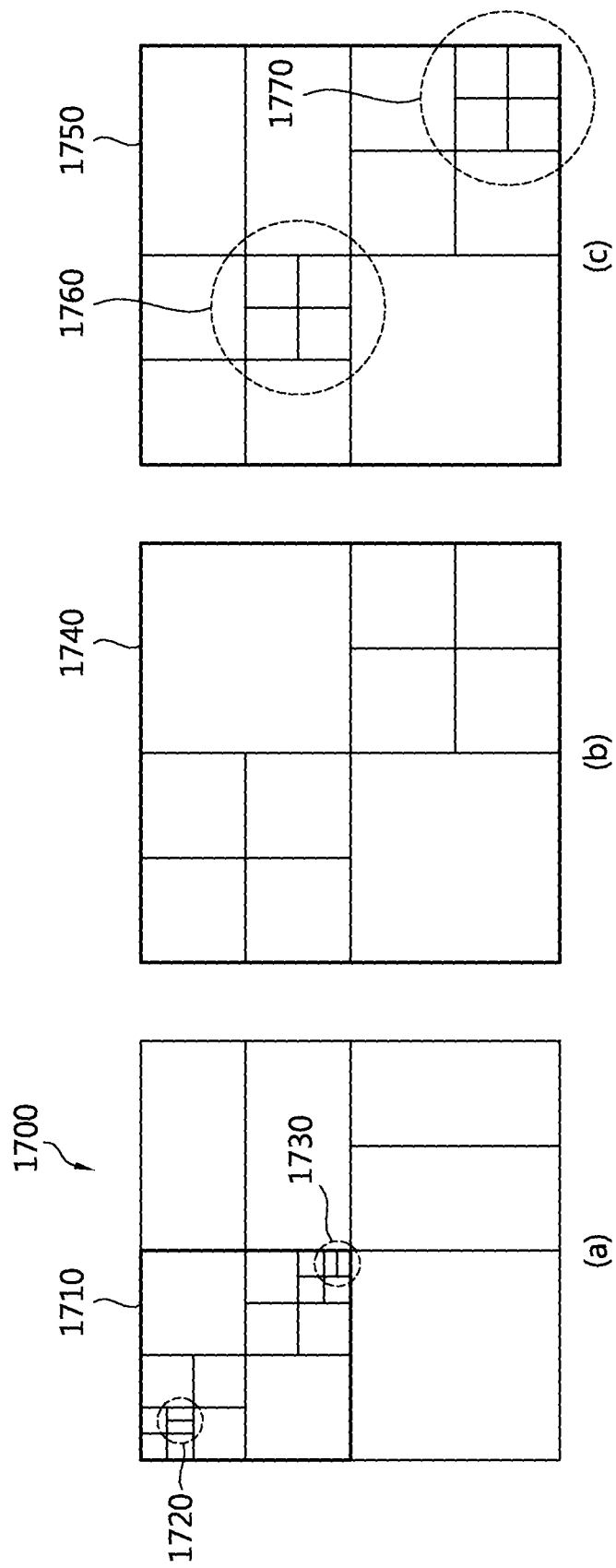
FIG. 17 is a diagram schematically illustrating another example of the inter-layer unit prediction according to the invention.

FIG. 17 is a diagram schematically illustrating another example where the inter-layer unit prediction is applied according to the invention.

In FIG. 17, it is assumed that a block 1700 of a base layer is an inter-coded block, a region 1720 is an N×2N partition, and a region 1730 is a 2N×N partition.

In case of the inter-coded block, various partition types such as a 2N×N partition, an N×2N partition a 2N×nU partition, a 2N×nD partition, an nL×2N partition, and an nR×2N partition may be used in addition to the 2N×2N partition and the N×N partition.

When double upsampling is performed on CU/PU information of a reference block 1710 of a base layer for use in an enhancement layer, the partition structure like a block 1740 illustrated in FIG. 17(b) or a partition structure like a block 1750 illustrated in FIG. 17(c) may be obtained depending on the level (for example, a CU level or a PU level) of the partition structure of the base layer to be used.

When only the CU information of the base layer is used for the enhancement layer, the CU partition structure of the enhancement layer may be constructed like the partition structure of the block 1740 illustrated in FIG. 17(b) by upsampling only the CU partition structure except for the structures of the region 1720 and the region 1730 in the reference block 1710.

When the PU information of the base layer is reflected in the CU partition structure of the enhancement layer, the region of the enhancement layer corresponding to a part having a partition (for example, the partition of the region 1720 or the region 1730) other than the 2N×2N partition in the base layer may be additionally partitioned in CUs as illustrated in FIG. 17(c).

In other words, when the PU information of the base layer is reflected in the CU partition structure of the enhancement layer in FIGS. 16 and 17, the region of the enhancement layer corresponding to the region including the PU partition in the base layer may be partitioned in CUs.

On the other hand, a method of selectively using the partition structure of the base layer may be applied to the enhancement layer.

Figure 18:
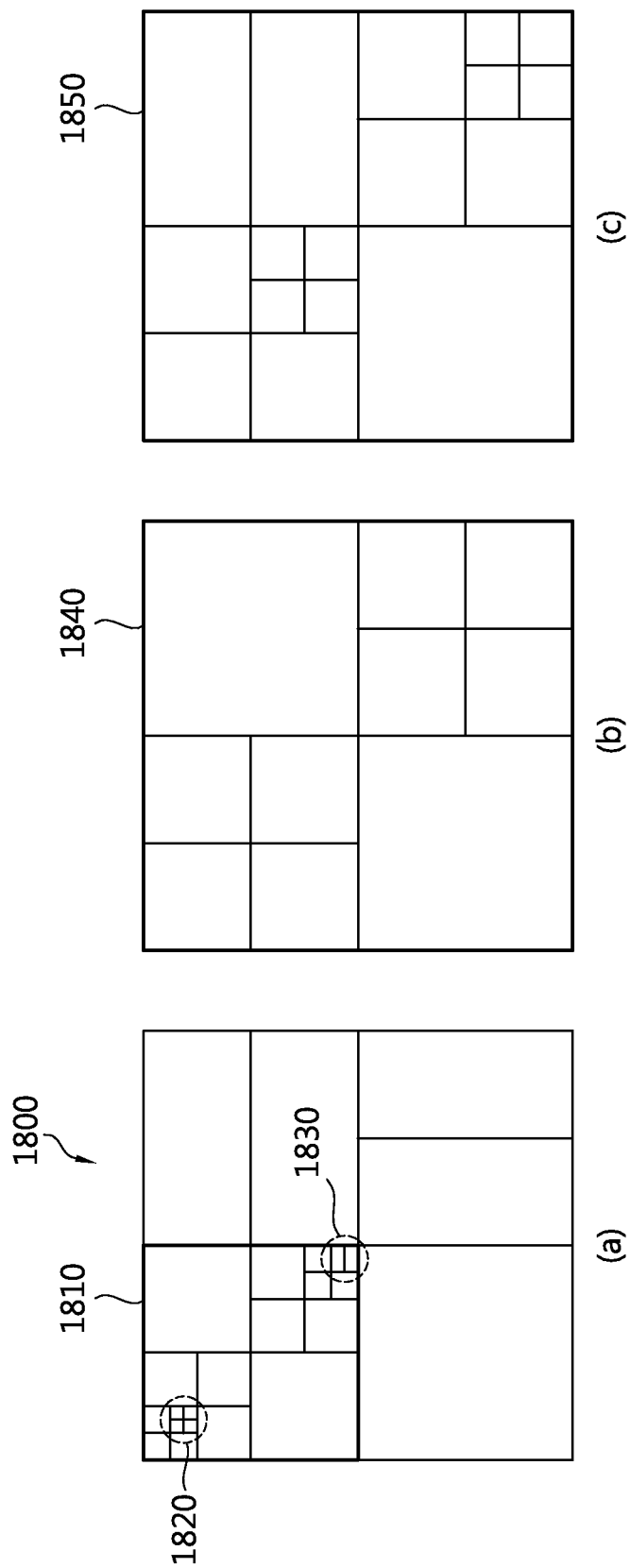
FIG. 18 is a diagram schematically illustrating still another example of the inter-layer unit prediction according to the invention.

FIG. 18 is a diagram schematically illustrating still another example where the inter-layer unit prediction is applied according to the invention.

A method of reusing the partition structure of the base layer in the enhancement layer will be described with reference to FIG. 18.

As illustrated in FIG. 18(a), it is assumed that a block 1800 of a base layer has square partitions such as 2N×2N or N×N and rectangular partitions such as 2N×nU, 2N×nD, nL×2N, or nR×2N.

In this case, since a CU is split in the form of only a square (2N×2N or N×N), the method of selectively using the partition structure of the base layer in the enhancement layer may be considered.

For example, as illustrated in FIG. 18(b), the partition structure of a reference block 1810 may be reflected as the partition structure of a block 1840 of the enhancement layer.

As illustrated in FIG. 18(c), the square partitions 1820 in the PU partition structure of a reference block may be reflected in the CU partition structure of the enhancement layer and the rectangular partitions 1830 in the PU partition structure of the reference block may not be reflected in the CU partition structure of the enhancement layer.

In this way, the method of combining and using CU/PU/TU information pieces may be selectively used by arbitrary units. That is, it may be determined whether to select the method of combining and using the CU/PU/TU information pieces of the base layer for use in the enhancement layer on the basis of arbitrary units such as a sequence, a picture group, a single picture, plural slices, a single slice, plural LCUs, and a signal LCU.

Adaptive Inter-Layer Texture Prediction

It is possible to improve quality of a reference picture by applying a filter to the inter-layer prediction. For example, when the inter-layer intra prediction is performed, a filter may be applied to a reference picture so as to improve the quality of the reference picture.

In case of spatial scalability, an upsampling filter may be applied to texture information of a lower layer to adjust the resolution between layers to be equal and then the adjusted texture information of the lower layer may be used as a reference picture.

At this time, the texture information of the lower layer to which the upsampling filter has been applied may be subjected to additional filtering and then may be used as a reference picture for predicting an upper layer. In this description, this prediction method is referred to as adaptive inter-layer texture prediction.

Figure 19:
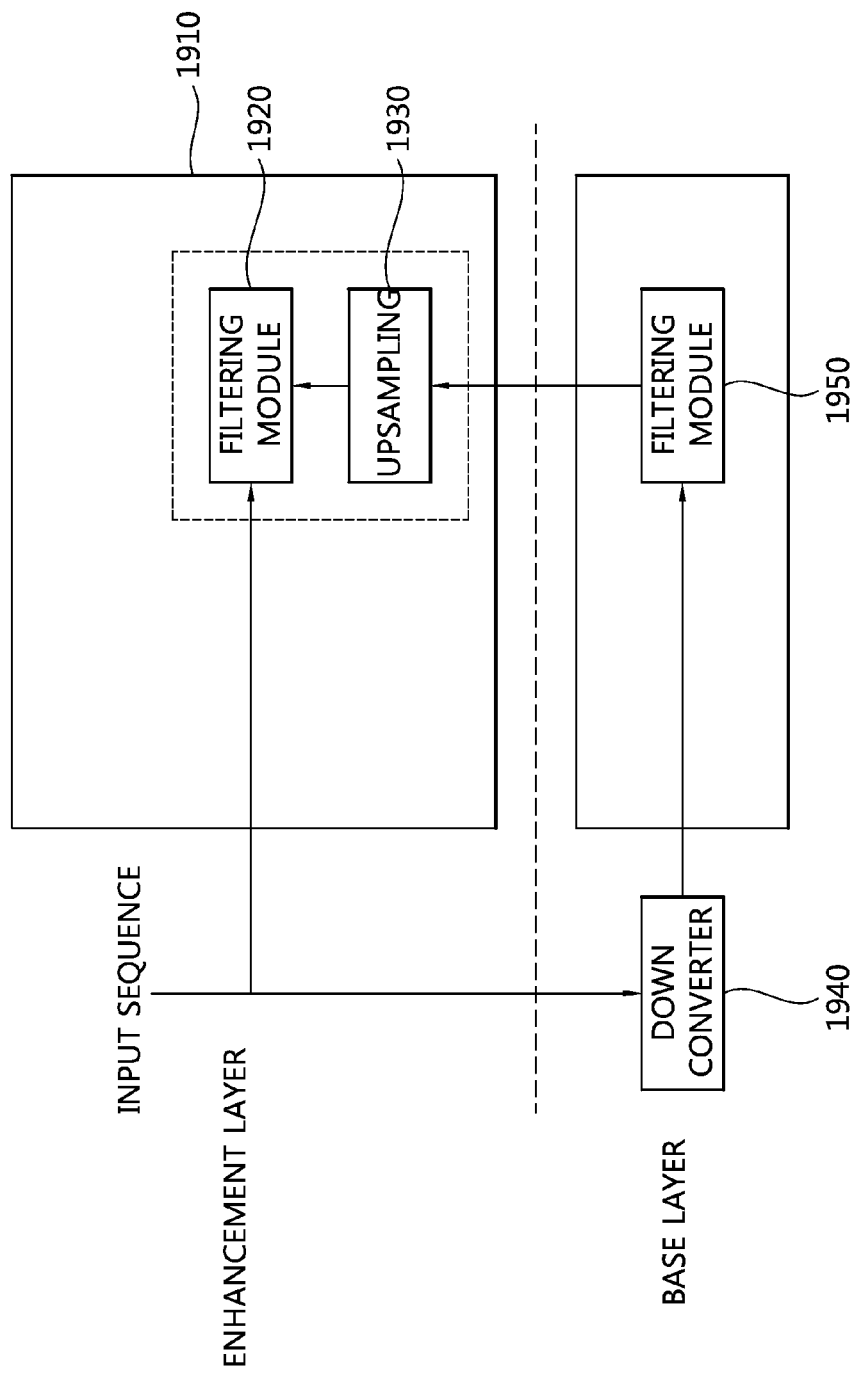
FIG. 19 is a diagram briefly illustrating an example of a method of performing inter-layer texture prediction according to the invention.

FIG. 19 is a diagram schematically illustrating an example of a method of performing the adaptive inter-layer texture prediction according to the invention.

Referring to FIG. 19, a texture predicting module 1910 corresponds to the texture predicting module of FIG. 1. Accordingly, the texture predicting module may perform rescaling along with the texture prediction if necessary.

The filtering applied in the base layer by a filtering module 1950 serves to reduce a difference from an input sequence down-converted by a down-converter 1940.

The filtering of the texture, which has been upsampled by the upsampling module 1930, in the enhancement layer by the filtering module 1920 serves to reduce an error between the upsampled texture of the base layer and the input sequence.

The applied filter only has to be a filter capable of achieving the above-mentioned services. For example, the filter applied by the filtering module 1920 may be a filter specified in a predetermined tap size and predetermined coefficients in advance by the video encoder/decoder or may be a filter of which filter parameters (such as the tap size and the coefficients) is adaptively signaled.

When the adaptive inter-layer texture prediction is used, it is possible to improve coding efficiency due to the improvement in quality of a reference picture.

When the adaptive inter-layer texture prediction is used, the quality of the reference picture is improved, but the complexity increases and it is necessary to additionally encode/decode the filter parameters. Accordingly, whether to use the adaptive inter-layer texture prediction may be determined depending on the situations (for example, performance of the video encoder and the video decoder and an error between an input sequence and an upsampled texture of a base layer).

Therefore, the filter used by the filtering module 1920 may be a filter adaptively used in an encoding/decoding loop. For the purpose of convenience of explanation, in this description, it is assumed that the filter used by the filtering module 1920 is an inter-layer ALF. When the video encoder/decoder uses the ALF as an in-loop filter, an adaptive loop filter (ALF) as an in-loop filter may be used as the inter-layer ALF.

A flag indicating whether to use the inter-layer ALF is required for using the adaptive inter-layer texture prediction. It is assumed that the flag indicating whether to use the inter-layer ALF is inter_layer_adaptive_loop_filter_enabled_flag.

When the value of inter_layer_adaptive_loop_filter_enabled_flag is 0, it indicates that the inter-layer ALF is not used. When the value of inter_layer_adaptive_loop_filter_enabled_flag is 1, it indicates that the inter-layer ALF is used.

The flag inter_layer_adaptive_loop_filter_enabled_flag may be defined in a sequence parameter set.

Table 53 shows an example of the sequence parameter set for applying the adaptive inter-layer texture prediction according to the invention.

TABLE 53

| | Descriptor |
|---|---|
| seq_parameter_set_rbsp( ) { | |
|     profile_idc | u(8) |
|     reserved_zero_8bits /* equal to 0 */ | u(8) |
|     level_idc | u(8) |
|     ... | |
|     adaptive_loop_filter_enabled_flag | u(1) |
|     Inter_layer_adaptive_loop_filter_enabled_flag | u(1) |
|     pcm_loop_filter_disable_flag | u(1) |
|     cu_qp_delta_enabled_flag | u(1) |
|     temporal_id_nesting_flag | u(1) |
|     rbsp_trailing_bits( ) | |
| } | |

The flag inter_layer_adaptive_loop_filter_enabled_flag may be defined in a slice header other than the sequence parameter set.

Table 54 shows an example of the slice header for applying the adaptive inter-layer texture prediction according to the invention.

TABLE 54

| | Descriptor |
|---|---|
| slice_header( ) { | |
|     ... | |
|     Inter_layer_adaptive_loop_filter_enabled_flag | u(1) |
|       if( adaptive_loop_filter_enabled_flag ) { | |
|         if( !shared_pps_info_enabled_flag ) | |
|           alf_param( ) | |

TABLE 54-continued

| | Descriptor |
|---|---|
|    alf_cu_control_param( ) | |
| } | |
| if( inter_layer_adaptive_loop_filter_enabled_flag ){ | |
|    alf_param( ) | |
|    alf_cu_control_param( ) | |
| } | |
| ... | |

When the video encoder and the video decoder use the ALF as an in-loop filter, syntax used to use the ALF in a picture parameter set may be similarly applied as the inter-layer ALF.

Table 55 shows an example of the picture parameter set for applying the adaptive inter-layer texture prediction according to the invention.

TABLE 55

| | Descriptor |
|---|---|
| pic_parameter_set_rbsp( ) { | |
|   pic_parameter_set_id | ue(v) |
|   seq_parameter_set_id | ue(v) |
|   entropy_coding_mode_flag | u(1) |
|   shared_pps_info_enabled_flag | u(1) |
|   if( shared_pps_info_enabled_flag ){ | |
|     if( adaptive_loop_filter_enabled_flag ) | |
|       alf_param( ) | |
|     if( Inter_layer_adaptive_loop_filter_enabled_flag ) | |
|       alf_param( ) | |
|   } | |
|   if( cu_qp_delta_enabled_flag ) | |
|     max_cu_qp_delta_depth | u(4) |
|   rbsp_trailing_bits( ) | |
| } | |

In Table 55, when the value of shared_pps_info_enabled_flag is 1, the parameter set of the inter-layer ALF may be used. Unlike Table 55, a method of using a flag for applying the inter-layer ALF independently of the ALF as an in-loop filter may be used.

Table 56 shows an example of slice data syntax when shared_pps_info_enabled_flag is applied to the inter-layer ALF according to the invention.

TABLE 56

| | Descriptor |
|---|---|
| slice_header( ) { | |
| ... | |
|   if( adaptive_loop_filter_enabled_flag ) { | |

TABLE 56-continued

| | Descriptor |
|---|---|
|     if( !shared_pps_info_enabled_flag ) | |
|       alf_param( ) | |
|     alf_cu_control_param( ) | |
|   } | |
|   if( inter_layer_adaptive_loop_filter_enabled_flag ){ | |
|   if( !shared_pps_info_enabled_flag ) | |
|     alf_param( ) | |
|     alf_cu_control_param( ) | |
|   } | |
| ... | |

Inter-Layer Filter Parameter Prediction

Three filters of a deblocking filter, a sample adaptive offset (SAO), and an adaptive loop filter (ALF) may be used as the filter usable in a loop filtering process.

Three filters may be used as the loop filter or only a part thereof may be used. For example, only the deblocking filter may be used or only the deblocking filter and the SAO may be used.

The video encoder may determine the filter parameters so as to cause a reconstructed picture to get closest to an input picture and may transmit the determined filter parameters to the video decoder. Accordingly, since the pictures in the base layer and the enhancement layer are very similar to each other in characteristics of the scalable coding, there is a high possibility that the filter parameters in two arrays are similar to each other.

Therefore, a method of reusing the parameters, which have been used in the base layer, in the enhancement layer may be considered. This is referred to as inter-layer filter parameter prediction.

The inter-layer filter parameter prediction may be performed by the prediction module or the inter-layer prediction module illustrated in FIG. 1 to 4 or may be performed by the filtering module for the enhancement layer.

Figure 20:
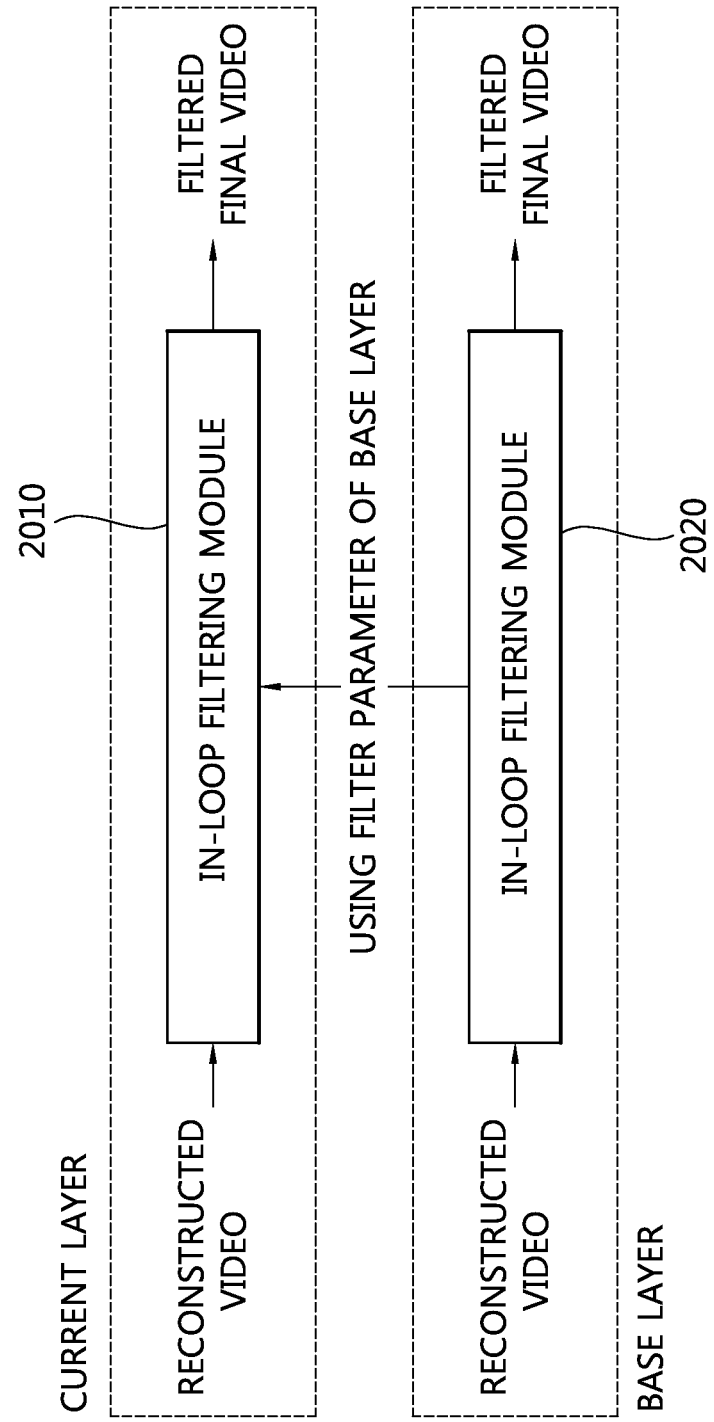
FIG. 20 is a diagram schematically illustrating an example of inter-layer filter parameter prediction according to the invention.

FIG. 20 is a diagram schematically illustrating the inter-layer filter parameter prediction according to the invention.

Referring to FIG. 20, the filter parameters used in an in-loop filtering module 2020 for the base layer may be reused in an in-loop filtering module 2010 for a current layer.

The SAO parameters may be transmitted through the use of an adaptive parameter set. The ALF parameters may also be transmitted through the use of the adaptive parameter set.

Table 57 shows an example of the adaptive parameter set in scalable extension according to the invention.

TABLE 57

| | Descriptor |
|---|---|
| aps_rbsp_in_scalable_extension ( ) { | |
|   aps_id | ue(v) |
|   aps_sample_adaptive_offset_flag | u(1) |
|   aps_adaptive_loop_filter_flag | u(1) |
|   if( aps_sample_adaptive_offset_flag \|\| aps_adaptive_loop_filter_flag ) { | |
|     aps_cabac_use_flag | u(1) |
|     if( aps_cabac_use_flag ) { | |
|       aps_cabac_init_idc | ue(v) |
|       aps_cabac_init_qp_minus26 | se(v) |
|     } | |
|   } | |
| /* Insert non-CABAC stuff above this line */ | |
|   base_pred_alf_param_flag | u(1) |
|   if( aps_adaptive_loop_filter_flag && ! base_pred_alf_param_flag) { | |

TABLE 57-continued

| | Descriptor |
|---|---|
| ```
        alf_data_byte_count /* to enable skipping past data without parsing it */
/*      byte_align( ) this byte align to happen between the non-CABAC and
CABAC parts of the alf_param( ) Once there is an all CABAC alf_param( ),
enable this byte_align( ) */
        alf_param( )
        byte_align( )
    }
/* insert CABAC stuff below this line; make sure its byte-aligned */
    base_pred_sao_param_flag
    if( aps_sample_adaptive_offset_flag && ! base_pred_sao_param_flag) {
        sao_data_byte_count /* to enable skipping past data without parsing it */
        byte_align ( )
        sao_param( )
/*      byte_align( ) this final byte align unnecessary as being taken care of by
rbsp_trailing_bits( ) */
    rbsp_trailing_bits( )
}
``` | u(8)<br><br><br><br><br><br><br><br><br>u(1)<br><br>u(8) |

Here, aps_id is an identifier for identifying the adaptive parameter set referred to in a slice header. The value of aps_id ranges from 0 to TBD and depends on level/profiling.

When the value of aps_sample_adaptive_offset_flag is 1, it indicates that the SAO is ON for a slice currently referred to in the adaptive parameter set. When the value of aps_sample_adaptive_offset_flag is 0, it indicates that the SAO is OFF for a slice currently referred to in the adaptive parameter set. When an activated adaptive parameter set is not present, the value of aps_sample_adaptive_offset_flag is inferred to be 0.

When the value of aps_adaptive_loop_filter_flag is 1, it indicates that the ALF is ON for a slice currently referred to in the adaptive parameter set. When the value of aps_adaptive_loop_filter_flag is 0, it indicates that the ALF is OFF for a slice currently referred to in the adaptive parameter set. When an activated adaptive parameter set is not present, the value of aps_adaptive_loop_filter_flag is inferred to be 0.

The CABAC decoding process is applied to sao_param( ) and alf_param( ) when the value of aps_cabac_use_flag is 1, and the CAVLC decoding process is applied to sao_param( ) and alf_param( ) when the value of aps_cabac_use_flag is 0.

aps_cabac_init_idc specifies an index for determining an initialization table used in the initialization process for context variables of the SAO and the ALF. The value of aps_cabac_init_idc ranges from 0 to 2.

aps_cabac_init_qp_minus26 specifies the value of quantization parameter-26. Here, the quantization parameter is used for the initialization process for the context variables of the SAO and the ALF.

alf_data_byte_count and sao_data_byte_point specifies the number of bytes.

When the value of base_pred_alf_param_flag is 1, it indicates that the ALF parameter used in the base layer is used in a current layer. When the value of base_pred_alf_param_flag is 0, it indicates that the ALF parameter for the current layer is used in the current layer.

When the value of base_pred_sao_param_flag is 1, it indicates that the SAO parameter used in the base layer is used in a current layer. When the value of base_pred_sao_param_flag is 0, it indicates that the SAO parameter for the current layer is not used in the current layer.

Inter-Layer Differential Picture Coding

It is assumed that a reconstructed picture of a base layer is $R_{BL}$ and a picture obtained by upsampling $R_{BL}$ depending on the resolution of an enhancement layer is $UR_{BL}$. It is also assumed that a reconstructed picture of the enhancement layer is $R_{EL}$.

The reconstructed picture may be a picture before applying in-loop filtering thereto. The reconstructed picture may be a picture after applying a part of in-loop filters (the deblocking filter, the sample adaptive offset filter, and/or the adaptive loop filter) thereto. In addition, the reconstructed picture may be a picture after applying all the in-loop filters thereto.

Here, when a differential picture obtained by subtracting the value of $UR_{BL}$ from the value of $R_{EL}$ is defined as D, independent encoding/decoding may be performed in the domain of D pictures. In this description, this method is referred to as inter-layer differential picture coding or inter-layer differential mode (IL-Diff mode).

The inter-layer differential mode may be applied to the units of sequence, picture, slice, largest CU (LCU), coding unit (CU), or prediction unit (PU). In the process unit to which the inter-layer differential mode is applied, a flag indicating whether to use the inter-layer differential mode may be transmitted from the video encoder to the video decoder.

coding (encoding/decoding) using different scalabilities is not performed on the process unit to which the inter-layer differential mode is applied, but only single layer coding (encoding/decoding) may be used. In this case, it is possible to save bits for indicating whether to perform coding using different scalabilities.

The inter-layer differential mode may be performed by the prediction module or the inter-layer prediction module illustrated in FIGS. 1 to 4. For the purpose of convenience of explanation, it is assumed that the inter-layer differential mode is performed by the prediction module.

(1) Intra Prediction for IL-Diff Mode

Figure 21:
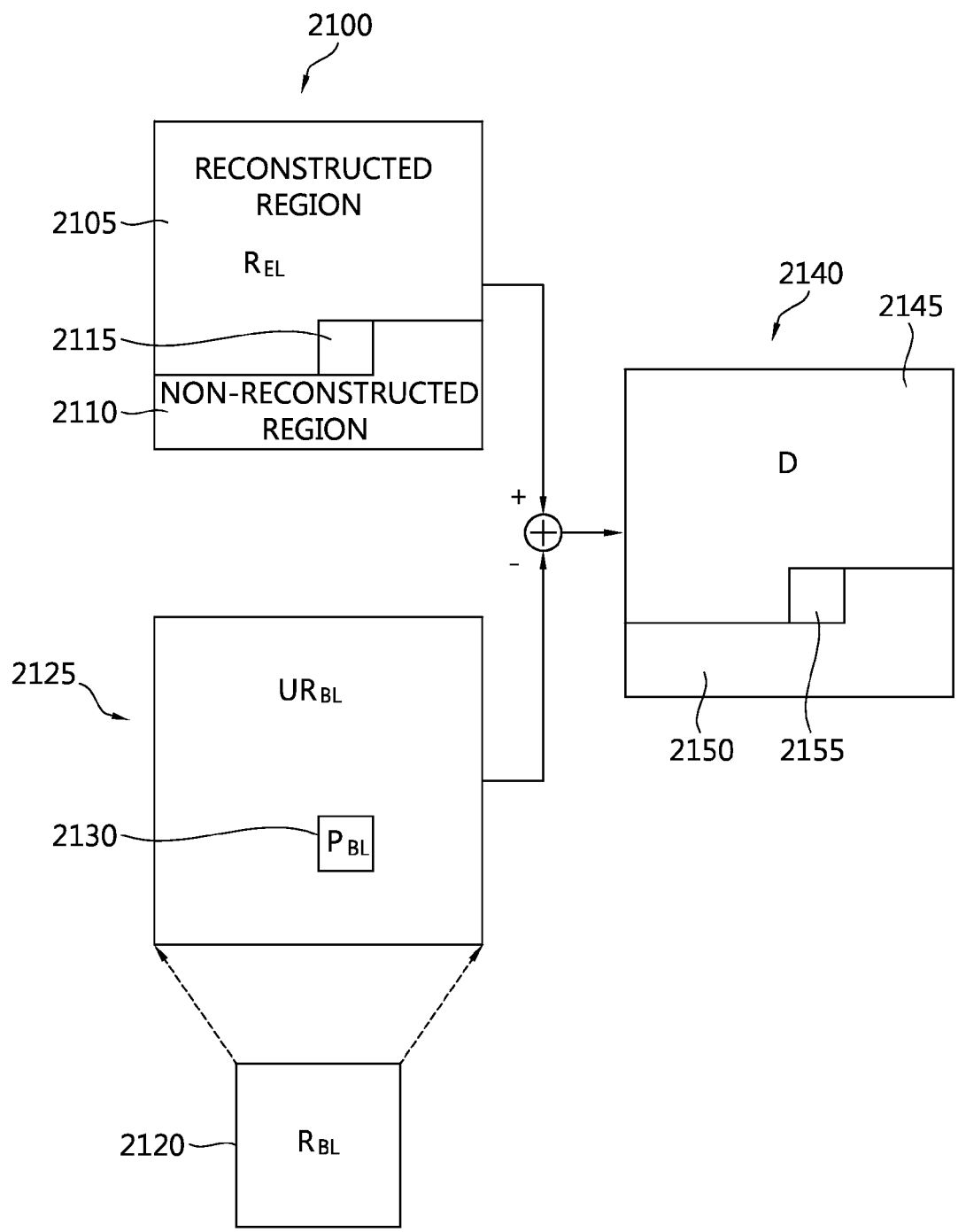
FIG. 21 is a diagram schematically illustrating a method of performing intra prediction when an inter-layer differential mode is applied according to the invention.

FIG. 21 is a diagram schematically illustrating a method of performing intra prediction when the inter-layer differential mode is used according to the invention.

Referring to FIG. 21, a picture 2100 of an enhancement layer includes a reconstructed region 2105 and a non-reconstructed region 2110 before and after a current block 2115. A reconstructed picture $R_{EL}$ may be obtained from the reconstructed region 2105. When the picture 2100 of the enhancement layer is reconstructed, the picture 2100 may be the reconstructed picture $R_{EL}$.

On the other hand, a picture $UR_{BL}$ 2125 obtained by upsampling a reconstructed picture $R_{BL}$ 2120 of a base layer includes a block $P_{BL}$ 2130 corresponding to the current block 2115.

In the encoding process, the prediction module (the prediction module of the video encoder) may derive the difference D between the reconstructed picture of the base layer and the reconstructed picture of the enhancement layer as expressed by Expression 4.

$$D = R_{EL} - UR_{BL} \qquad \text{<Expression 4>}$$

In Expression 4, a picture to which an in-loop filter such as the deblocking filter, the SAO, or the ALF is not applied may be used as $R_{EL}$ due to presence of the non-reconstructed region 2110.

Since all regions of the picture 2120 of the base layer are reconstructed, $R_{BL}$ may be a reconstructed picture to which all or a part of the in-loop filters is applied or may be a reconstructed picture to which the in-loop filters are not applied.

The prediction module may perform the intra prediction on a current block 2155 with reference to pixel values of the reconstructed region 2145 except for the non-reconstructed region 2150 in the difference picture D 2140.

In the decoding process, the prediction module (the prediction module of the video decoder) may reconstruct a current block using block values $P_{BL}$ of $UR_{BL}$ present at the same position as the current block as expressed by Expression 5.

$$R_{EL} = P_D + P_{BL} + RES \qquad \text{<Expression 5>}$$

In Expression 5, $P_D$ represents a predicted block constructed by performing the intra prediction on the reconstructed region of the differential picture D and RES represents a residual block.

(2) Inter Prediction for IL-Diff Mode

In order to perform the inter prediction on a current block at the time of applying the inter-layer differential mode, the prediction module generates a differential picture $D_R$ for a reference picture of the current picture. For example, the prediction module generates the differential picture $D_R$ for the reference picture of the current picture using the reconstructed picture for an enhancement layer picture of the reference picture and the reconstructed picture for a base layer picture of the reference picture.

The prediction module may generate a predicted block $P_D$ in the differential picture domain of the current block on the basis of the differential picture $D_R$ of the reference picture.

The prediction module may reconstruct the current block using the predicted block as expressed by Expression 6.

$$R_{EL} = P_D + P_{BL} + RES \qquad \text{<Expression 6>}$$

In Expression 6, $R_{EL}$ represents a current block reconstructed in the enhancement layer. $P_{BL}$ represents a block present at the same position as the current block in $UR_{BL}$ and RES represents a residual block.

The differential picture $D_R$ of the reference picture may be generated in advance and stored in a decoded picture buffer (DPB). The DPB may correspond to the memory described with reference to FIGS. 1 to 3.

The differential picture $D_R$ of the reference picture may be calculated for a block specified at a position required for reconstructing the current block by the motion information of the current block whenever generating $R_{EL}$.

In the inter prediction in the inter-layer differential mode, unlike the intra prediction in the inter-layer differential mode, a reconstructed picture to which a part or all of the in-loop filters are applied as well as a reconstructed picture to which the in-loop filters are not applied may be used as the reference picture reconstructed in the enhancement layer at the time of generating the differential picture of the reference picture.

In this description, for the purpose of convenience of explanation, an array of samples reconstructed at a specific time point (for example, picture order count (POC) or access unit (AU)) by layers in a multi-layer structure supporting the scalable video coding is referred to as a "picture".

In this regard, an array of samples reconstructed or to be reconstructed at a specific time point in a layer (current layer) decoded and output may be defined as a picture so as to be distinguished from a sample array reconstructed or to be reconstructed in a reference layer. The sample array reconstructed or to be reconstructed in the reference layer may be referred to as a representation, a reference layer picture, a reference layer sample array, a reference layer texture, and the like. In this case, one decoded (encoded) picture reconstructed in the current layer may be output from each AU.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. An inter-layer prediction method comprising:
receiving, by a decoding apparatus, prediction mode information and merge index information for a current block in a current layer through a bitstream;
deriving, by the decoding apparatus, inter-layer motion information from a reference layer;
determining, by the decoding apparatus, a prediction mode of the current block based on the prediction mode information;
constructing, by the decoding apparatus, a merge candidate list for the current block, wherein the merge candidate list includes spatial merge candidates and an inter-layer candidate corresponding to the inter-layer motion information;
selecting, by the decoding apparatus, the inter-layer candidate among the merge candidate list based on the merge index information; and
predicting, by the decoding apparatus, the current block in the current layer using the inter-layer motion information,
wherein the inter-layer motion information includes an inter-layer motion vector derived from the reference layer, and
wherein the inter-layer motion vector is derived by scaling a motion vector of the reference layer on the basis of a resolution ratio of the reference layer and the current layer,
wherein the inter-layer candidate is represented by an index value greater than index values of the spatial merge candidates among the merge candidate list.

2. The inter-layer prediction method according to claim 1, wherein the motion vector of the reference layer is a motion vector at a reference position, which corresponds to a position for specifying the current block in the reference layer.

3. The inter-layer prediction method according to claim 2, wherein the position for specifying the current block is a top-left position of the current block.

4. The inter-layer prediction method according to claim 2, wherein the reference position is derived by scaling coordinates of the position for specifying the current block on the basis of the resolution ratio of the reference layer and the current layer.

5. The inter-layer prediction method according to claim 2, wherein the motion vector of the reference position is a motion vector of a prediction block including the reference position.

6. The inter-layer prediction method according to claim 1, wherein the merge candidate list further includes a temporal merge candidate, and
wherein an index value of the inter-layer candidate is less than an index value of the temporal merge candidate among the merge candidate list.

7. The inter-layer prediction method according to claim 1, wherein the motion vector of the reference layer is a motion vector of a reference block including the reference position, which corresponds to the position for specifying the current block, in the reference layer,
wherein the inter-layer motion vector is derived by further scaling the scaled motion vector when the reference picture of the current block is different from the reference picture of the reference block.

8. The inter-layer prediction method according to claim 7, wherein the further scaling is performed based on:
a POC (Picture Order Count) difference between the current picture and a reference picture of the current picture; and
a POC difference between a reference picture of an inter-layer picture from which the inter-layer motion information is derived in the reference layer and the inter-layer picture.

9. A scalable video decoder comprising:
a entropy-decoding module to receive merge index information for a current block in a current layer through a bitstream;
a first prediction module to predict a reference layer; and
a second prediction module to derive inter-layer motion information from the reference layer based on the prediction of the first prediction module, determine a prediction mode of the current block based on a prediction mode of a corresponding block in the reference layer, construct a merge candidate list for the current block, wherein the merge candidate list includes spatial merge candidates and an inter-layer candidate corresponding to the inter-layer motion information, select the inter-layer candidate among the merge candidate list based on the merge index information and predict the current block in the current layer using inter-layer motion information,
wherein the inter-layer motion information includes an inter-layer motion vector derived from the reference layer, and
wherein the second prediction module scales a motion vector of the reference layer to derive the inter-layer motion information on the basis of a resolution ratio between the reference layer and the current layer,
wherein the inter-layer candidate is represented by an index value greater than index values of the spatial merge candidates among the merge candidate list.

* * * * *